US010004978B2

(12) United States Patent
Carlow et al.

(10) Patent No.: US 10,004,978 B2
(45) Date of Patent: *Jun. 26, 2018

(54) DEVICE WITH MULTI-DIRECTIONAL MOVING MEMBERS

(71) Applicants: Richard Andrew Carlow, Pasadena, CA (US); Eugenia Chen Carlow, Pasadena, CA (US)

(72) Inventors: Richard Andrew Carlow, Pasadena, CA (US); Eugenia Chen Carlow, Pasadena, CA (US)

(*) Notice: Subject to any disclaimer, the term of this patent is extended or adjusted under 35 U.S.C. 154(b) by 57 days.

This patent is subject to a terminal disclaimer.

(21) Appl. No.: 15/209,659

(22) Filed: Jul. 13, 2016

(65) Prior Publication Data

US 2016/0317911 A1    Nov. 3, 2016

Related U.S. Application Data

(63) Continuation of application No. 13/784,772, filed on Mar. 4, 2013, now Pat. No. 9,421,452.

(60) Provisional application No. 61/623,526, filed on Apr. 12, 2012.

(51) Int. Cl.
| | | |
|---|---|---|
| *A63F 9/08* | (2006.01) | |
| *A63F 11/00* | (2006.01) | |
| *A63F 9/20* | (2006.01) | |
| *G09B 1/00* | (2006.01) | |
| *G09B 19/00* | (2006.01) | |
| *G09B 1/22* | (2006.01) | |
| *A63F 3/00* | (2006.01) | |
| *A63F 9/00* | (2006.01) | |
| *A63F 9/24* | (2006.01) | |

(52) U.S. Cl.
CPC .......... *A63F 11/00* (2013.01); *A63F 3/00697* (2013.01); *A63F 9/0811* (2013.01); *A63F 9/0826* (2013.01); *A63F 9/0838* (2013.01); *A63F 9/0842* (2013.01); *A63F 9/0873* (2013.01); *A63F 9/20* (2013.01); *A63F 11/0011* (2013.01); *G09B 1/00* (2013.01); *G09B 19/00* (2013.01); *A63F 9/08* (2013.01); *A63F 2003/00826* (2013.01); *A63F 2009/0089* (2013.01); *A63F 2009/2489* (2013.01); *G09B 1/22* (2013.01)

(58) Field of Classification Search
CPC .... A63F 9/0842; A63F 9/0826; A63F 9/0838; A63F 9/0873; A63F 9/08; A63F 9/0811; G09B 1/22
USPC ...... 273/142 R, 142 H, 142 HA, 139, 138.1, 273/146, 459, 153 S, 153 R, 241; 434/403, 402; 446/236, 129
See application file for complete search history.

(56) References Cited

U.S. PATENT DOCUMENTS

| | | | | |
|---|---|---|---|---|
| 1,561,402 A | * | 11/1925 | Bernwall | ............ A63F 3/00176 273/141 R |
| 1,579,341 A | * | 4/1926 | Allen | ........................ A63F 9/16 273/142 HA |
| 3,596,380 A | * | 8/1971 | Williams | ........... A44C 17/0258 273/155 |

(Continued)

*Primary Examiner* — Benjamin Layno
(74) *Attorney, Agent, or Firm* — Peter Ganjian; Patent Law Agency, LLC

(57) ABSTRACT

A game piece, comprising members that are associated with one another with pivot axes, where a member provides a pivot support that allows independent rotation and or translation motions of a next member in different directions.

20 Claims, 58 Drawing Sheets

(56) References Cited

U.S. PATENT DOCUMENTS

| | | | | |
|---|---|---|---|---|
| 3,633,916 A * | 1/1972 | Thomas | ............... | A63F 5/04 |
| | | | | 273/142 HA |
| 5,154,420 A * | 10/1992 | Gutknecht | ............ | A63F 5/04 |
| | | | | 463/17 |
| 5,286,026 A * | 2/1994 | Schnapp | ............ | A63F 9/0811 |
| | | | | 273/155 |
| 9,421,452 B2 * | 8/2016 | Carlow | ............ | A63F 9/0842 |
| 2006/0275562 A1 * | 12/2006 | Kleinsasser | ............ | B44C 5/00 |
| | | | | 428/11 |
| 2011/0310002 A1 * | 12/2011 | Tidemand | ............ | A63F 13/06 |
| | | | | 345/156 |
| 2013/0255530 A1 * | 10/2013 | Willcox | ............ | A63G 1/08 |
| | | | | 104/75 |

\* cited by examiner

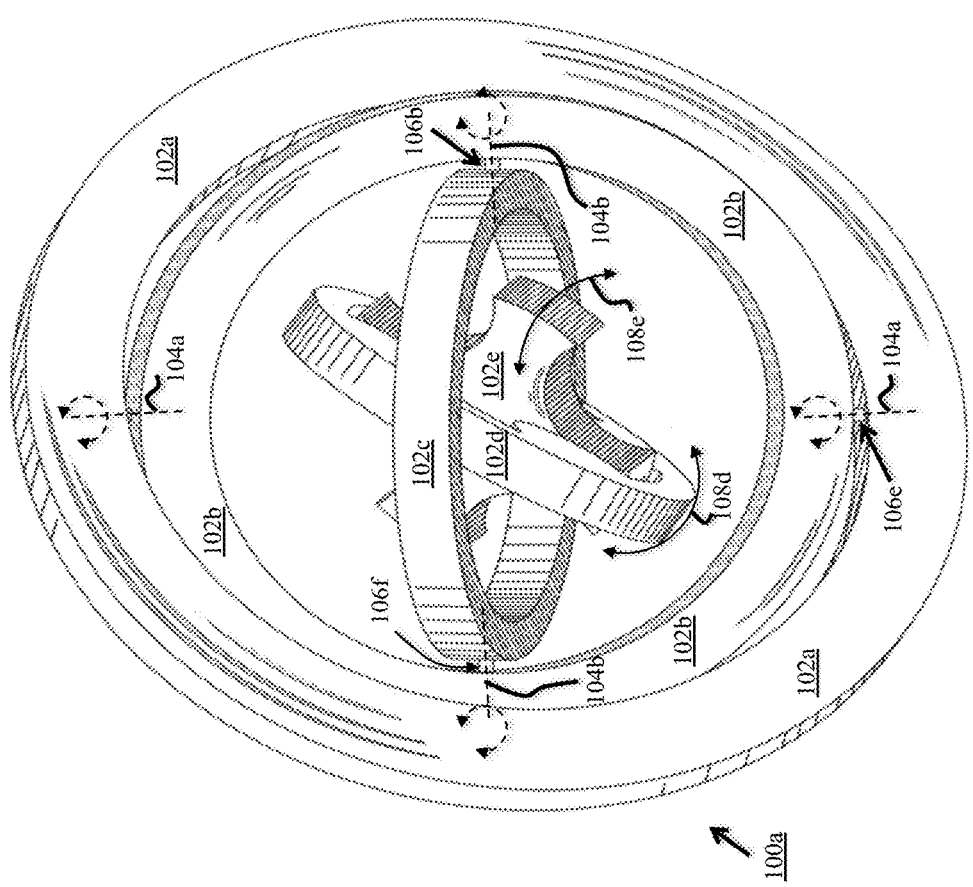

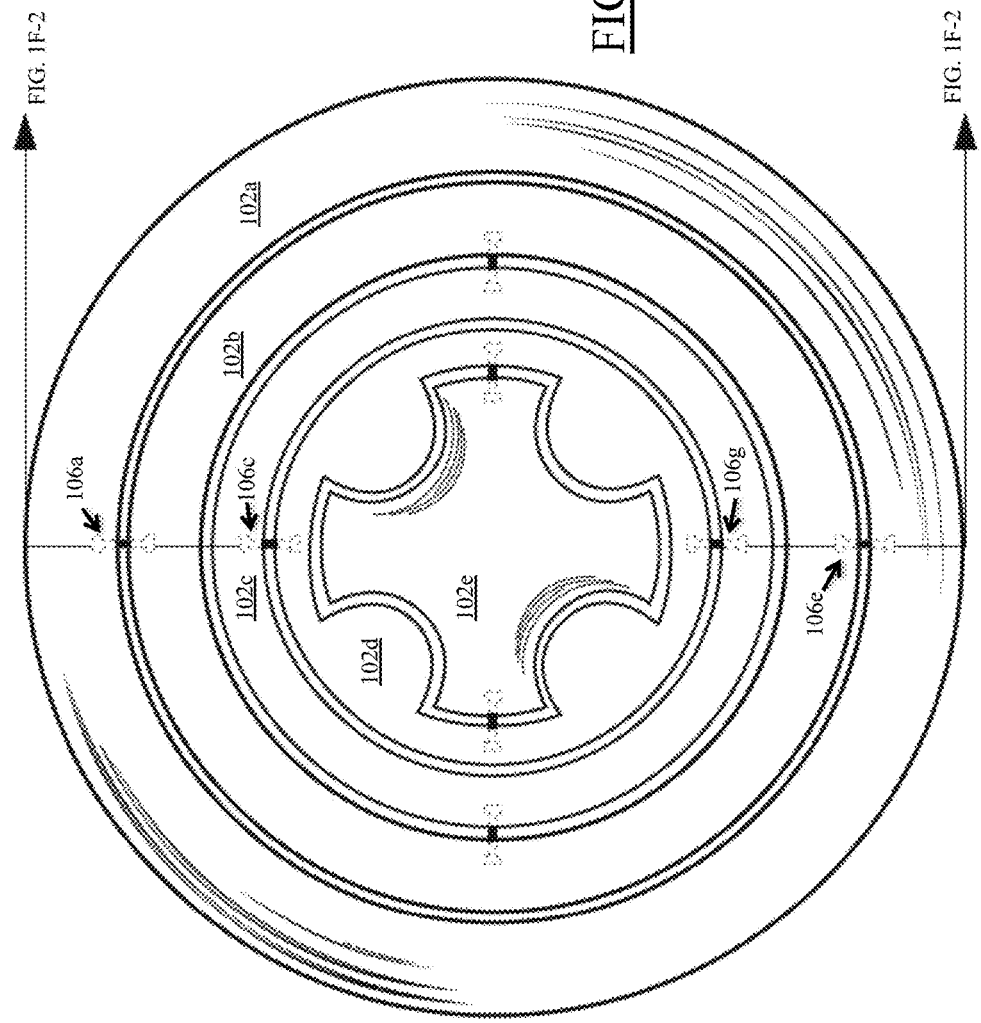

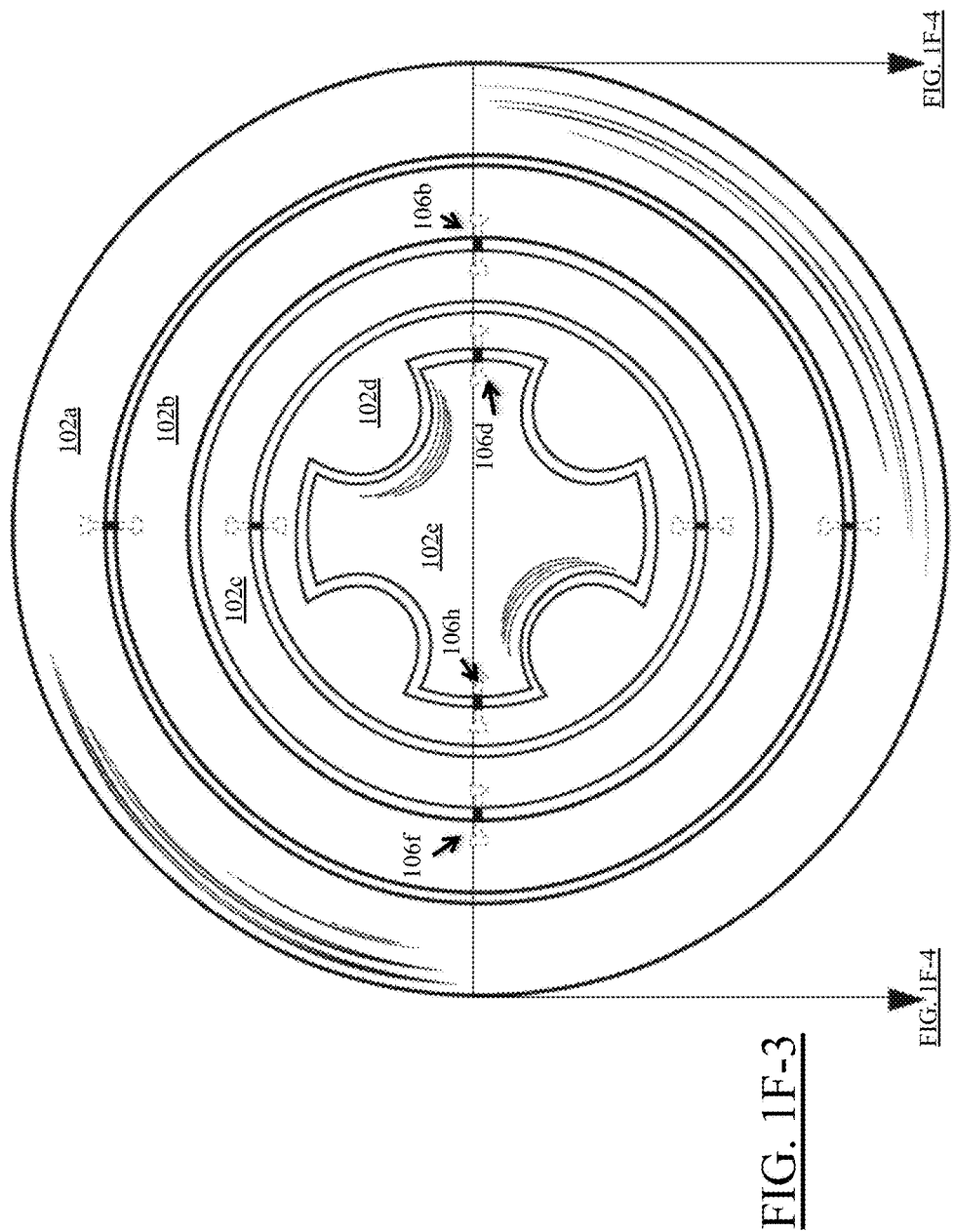

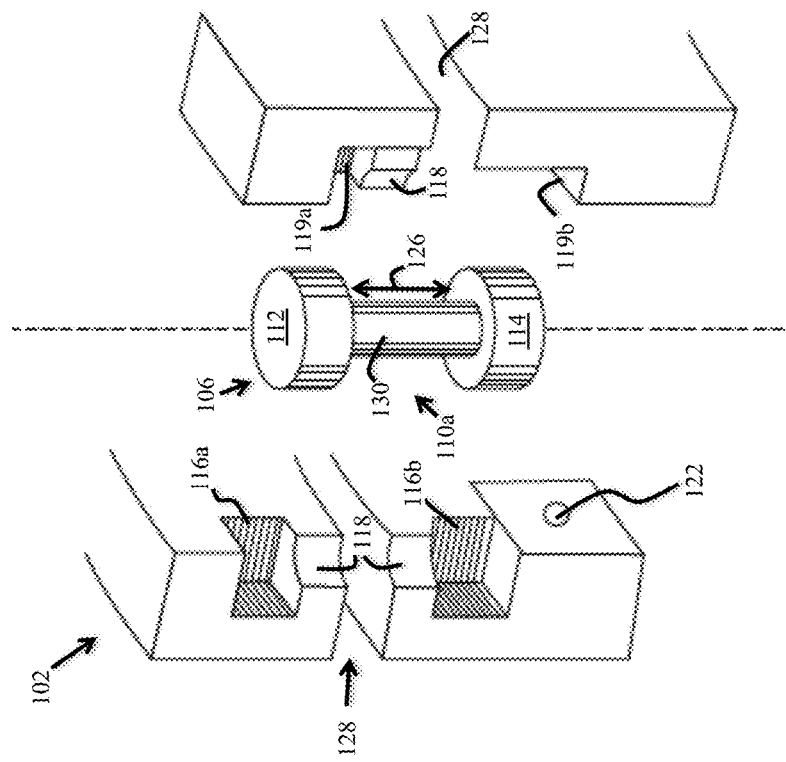
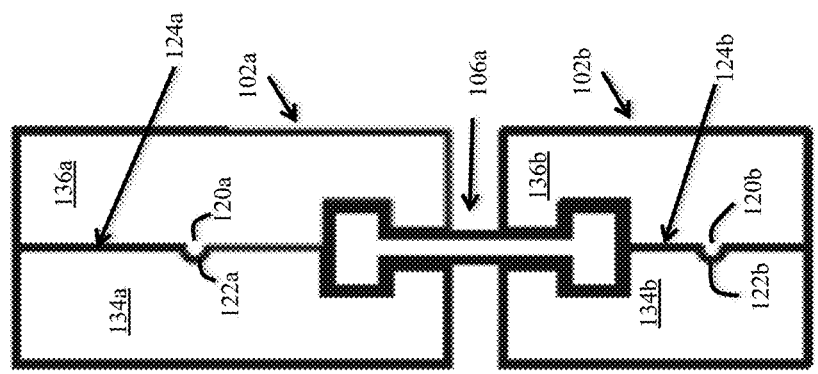

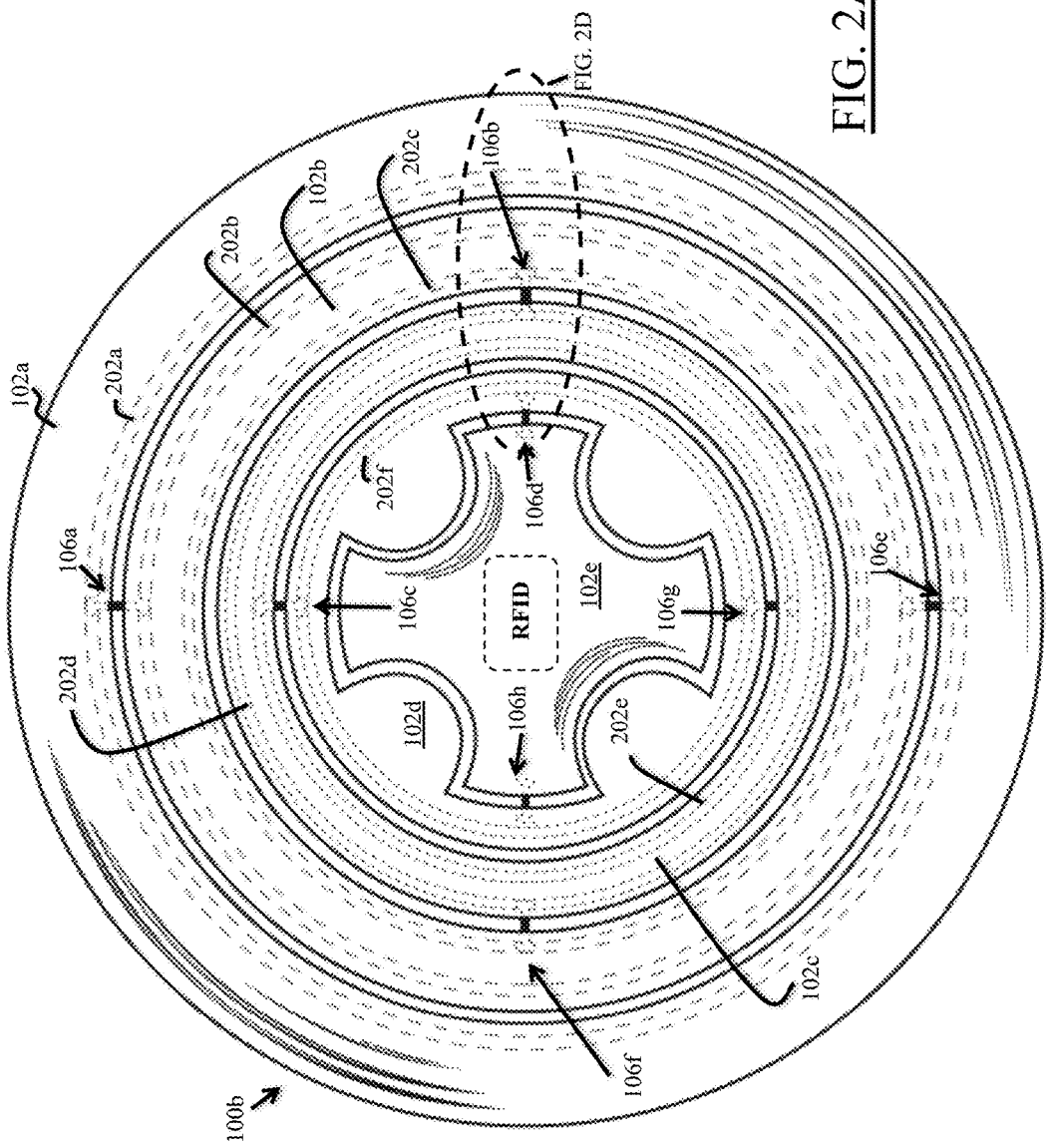

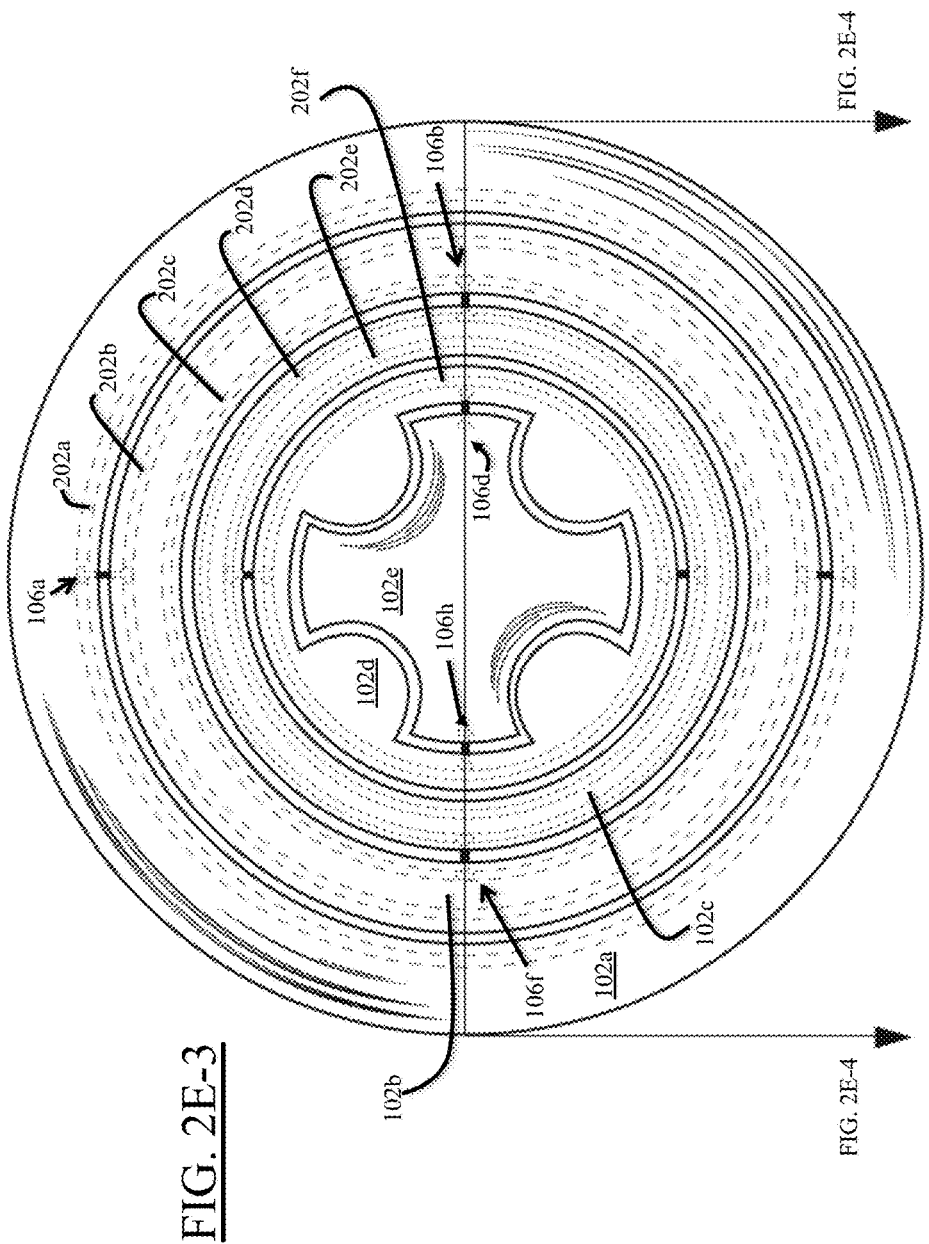

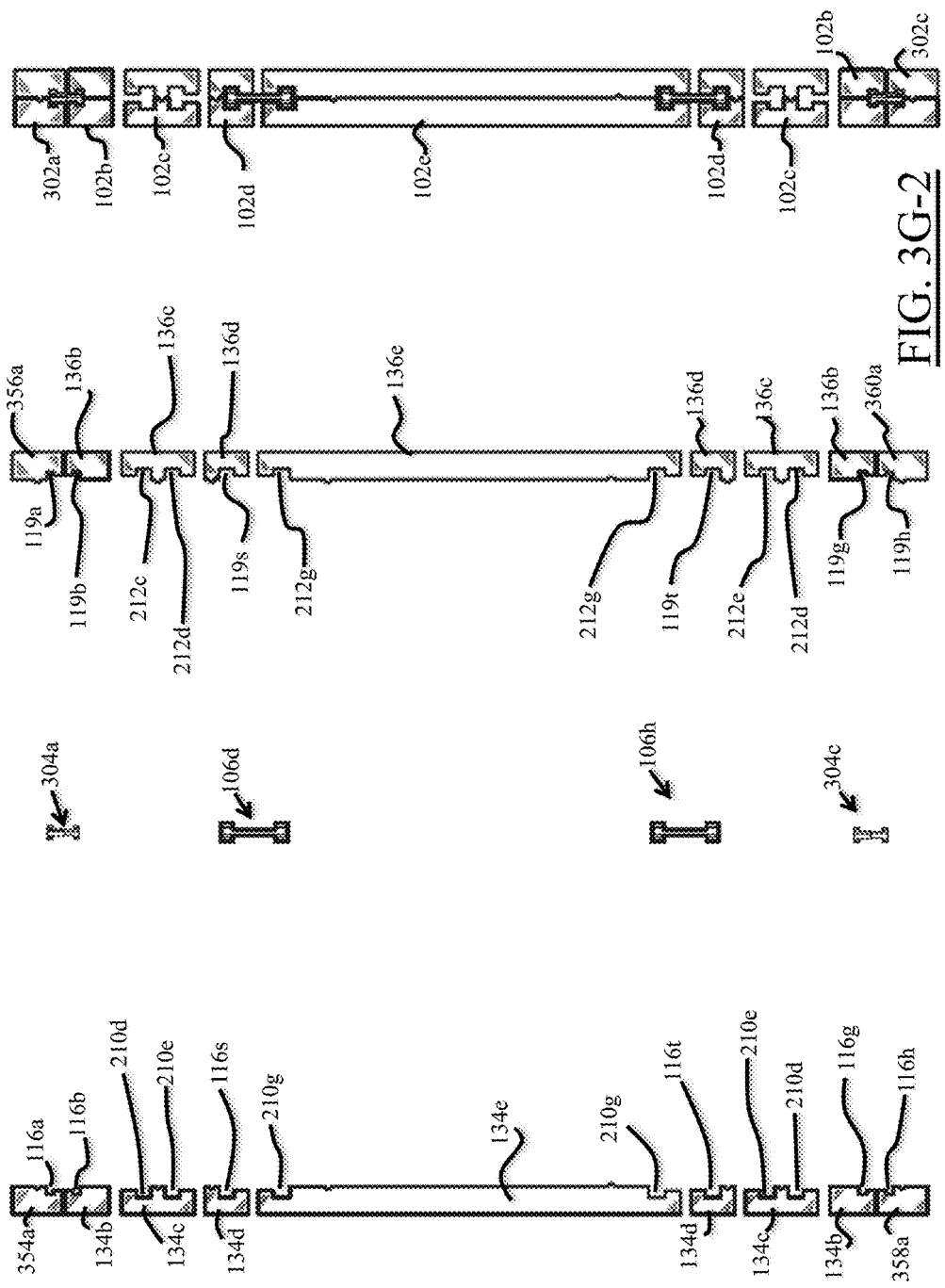

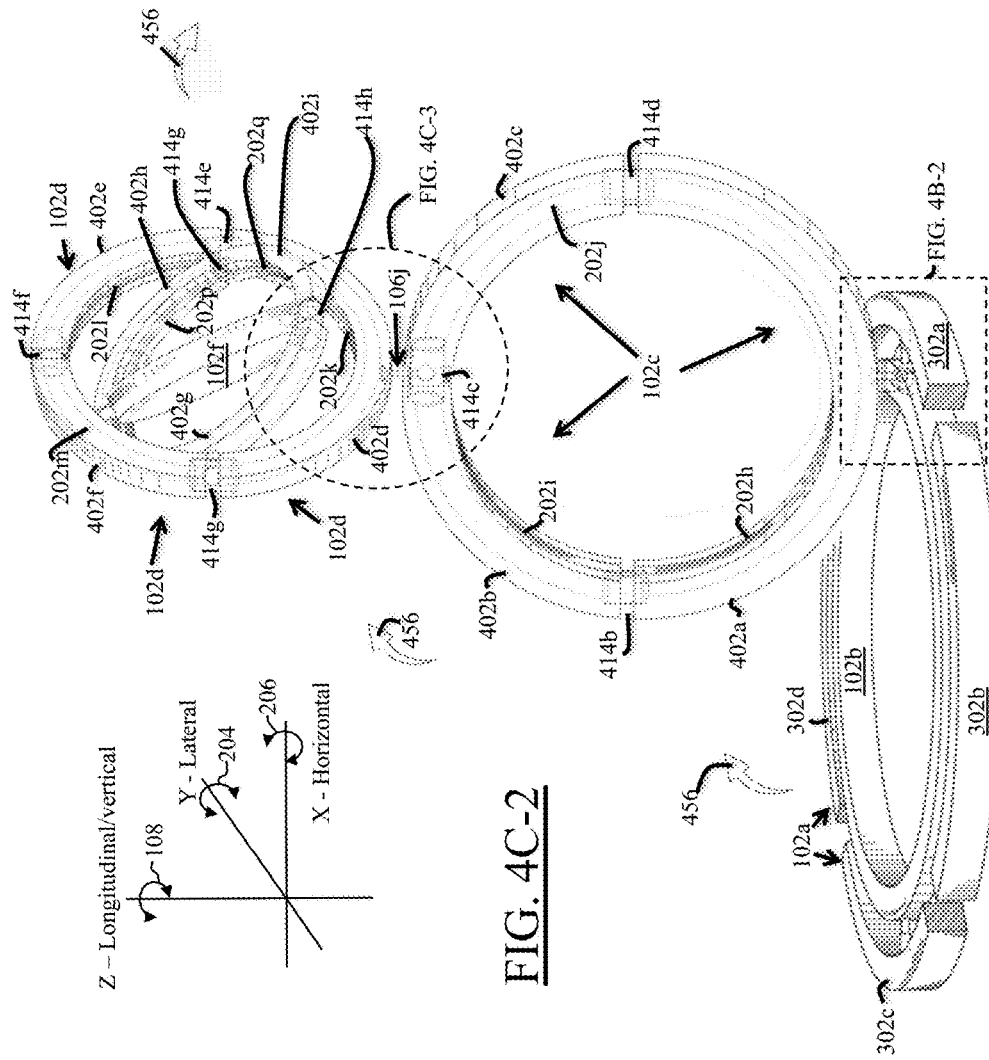

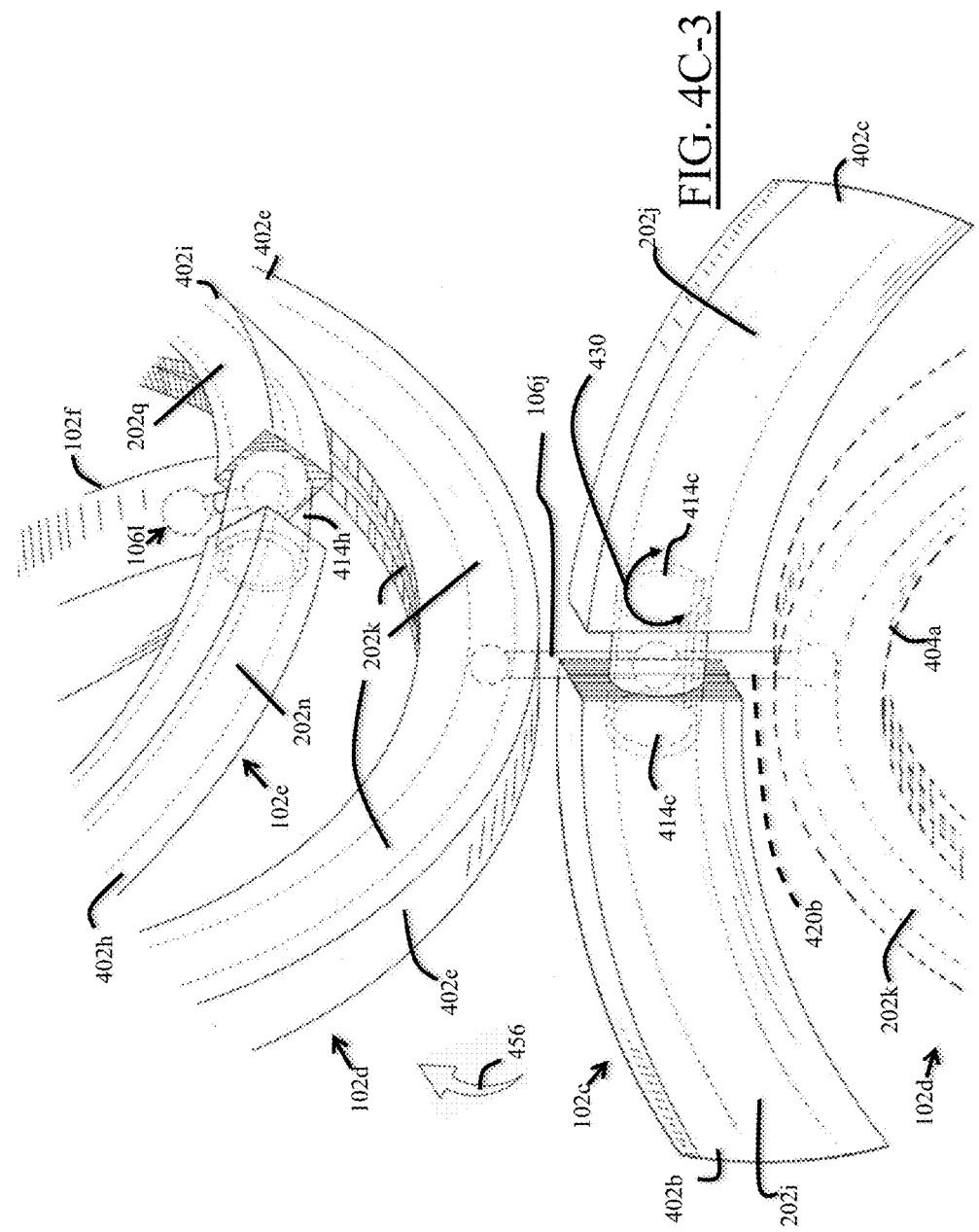

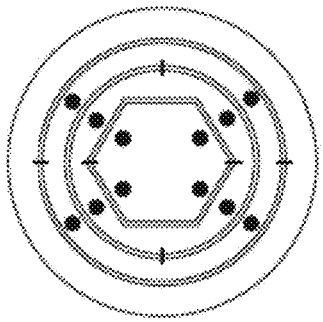
FIG. 6A
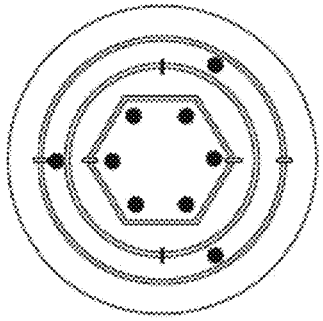
FIG. 6B
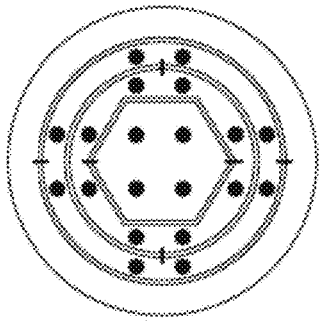
FIG. 6C
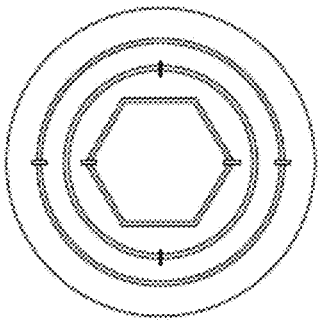
FIG. 6D
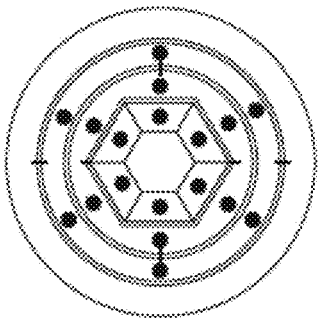
FIG. 6E
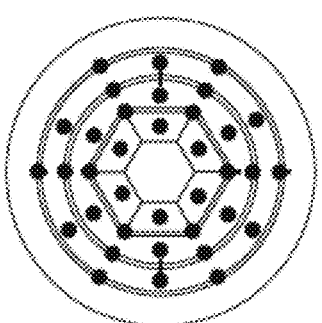
FIG. 6F
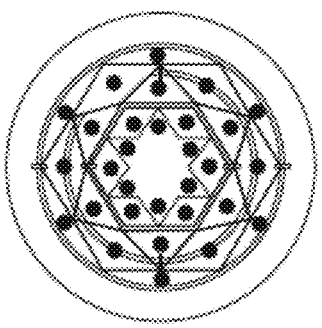
FIG. 6G
FIG. 6H

DEVICE WITH MULTI-DIRECTIONAL MOVING MEMBERS

CROSS-REFERENCE TO RELATED APPLICATIONS

This Application is a CONTINUATION application claiming the benefit of priority of the co-pending U.S. Non-Provisional Utility patent application Ser. No. 13/784,772 with a filing date 4 Mar. 2013, which claims the benefits of priority of the U.S. Provisional Utility Patent Application No. 61/623,526, filed 12 Apr. 2012, the entire disclosures of all of which are expressly incorporated by reference in their entirety herein.

Where a definition or use of a term in the incorporated document(s) is inconsistent or contrary to the definition of that term provided herein, the definition of that term provided herein applies and the definition of that term in the incorporated document(s) does not apply.

BACKGROUND OF THE INVENTION

Field of the Invention

This invention relates to a device with multi-directional moving members that may be implemented in a non-limiting, exemplary form of a token or a chip.

Description of Related Art

Conventional devices such as a gaming coin, dice, domino chips, poker chips, etc. are well known and have been in use for a number of years for skill-based and or chance-based games such as for example, various gaming system (e.g., casino games, domino, etc.) or board games (real or virtual).

Most conventional devices (such as a coin, dice, domino chip, etc.) can generate a limited number of probable outcomes due to their small, limited number of fixed (non-moving) surfaces. Other conventional devices exist where the number of sides or surfaces of the device (such as a cube dice) is increased from the well-known six sides to polygonal structures with more than six sides to increase the number of outcomes, but they are still limited by fixed (non-moving) surfaces, which limits the number of outcomes. In fact, some games may require two devices (such as the use of two dice) instead of one to enhance the game experience by increasing the number of outcomes. Accordingly, the conventional game pieces (such as a coin, domino piece, dice, etc.) used to inject or introduce chance into a gaming system have an inherently limiting affect in terms of probable outcomes for a game due to their fixed surfaces.

As for purely conventional skill-based game elements such as the pieces of a jigsaw puzzle or educational cards, most use paper or card products or objects (polygonal objects, balls, etc.) that have fixed surfaces with printed material thereon, with some objects having limited motion. For example, a children's block cube with six sides may have two of the six sides that flip on a hinge, with each of the two sides having one printed character. In addition to limited motion, which limits motor skills, the fixed surfaces of the conventional skill-based gaming elements limit the overall number of outcomes that is generally insufficient for an enhanced (or challenging) skill-based gaming system.

Accordingly, in light of the current state of the art and the drawbacks to current devices mentioned above, a need exists for a device that would be small, compact, and portable, easy to use, and provide an increased number of permutations and combinations of outcomes for a game or learning system to thereby enhance chance-based and skill-based real and or virtual game or learning experiences. Further, a need exists for a device that would be usable in both new game and learning systems and most conventional established game and learning systems, easily replacing most other devices or other game pieces such as dice, domino chips, etc.

BRIEF SUMMARY OF THE INVENTION

A non-limiting, exemplary aspect of an embodiment of the present invention provides a game piece, comprising:

members that are associated with one another with pivot axes, where a member provides a pivot support that allows rotation of a next member about an axis;

at least one member includes at least one mark on at least one side, with the mark defined within a context of one of a game and a learning system, providing an increased number of permutations and combinations of outcomes of the one of the game and the learning system for an enhance experience.

Another non-limiting, exemplary aspect of an embodiment of the present invention provides a device, comprising:

members that are associated with one another with pivot axes, where a member provides a pivot support that allows spatial rotations of a next member along principal rotations.

Yet another non-limiting, exemplary aspect of an embodiment of the present invention provides a device, comprising:

members that are associated with one another with pivot axes, where a member provides a pivot support that allows spatial rotations of a next member along principal rotations, with at least one member having a translational motion.

A further, non-limiting, exemplary aspect of an embodiment of the present invention provides a device, comprising:

members that are associated with one another with pivot axes, where a member provides a pivot support that allows spatial rotations of a next member along principal rotations, with at least one member having a translational motion; and where a next member is movable to a position next to an outer boundary of the member.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding part(s) throughout:

FIGS. 1A to 1H are non-limiting, exemplary illustrations of an embodiment of a device in accordance with the present invention;

FIGS. 2A to 2F are non-limiting, exemplary illustrations of another embodiment of a device in accordance with the present invention;

DETAILED DESCRIPTION OF THE INVENTION

Figure 1A:
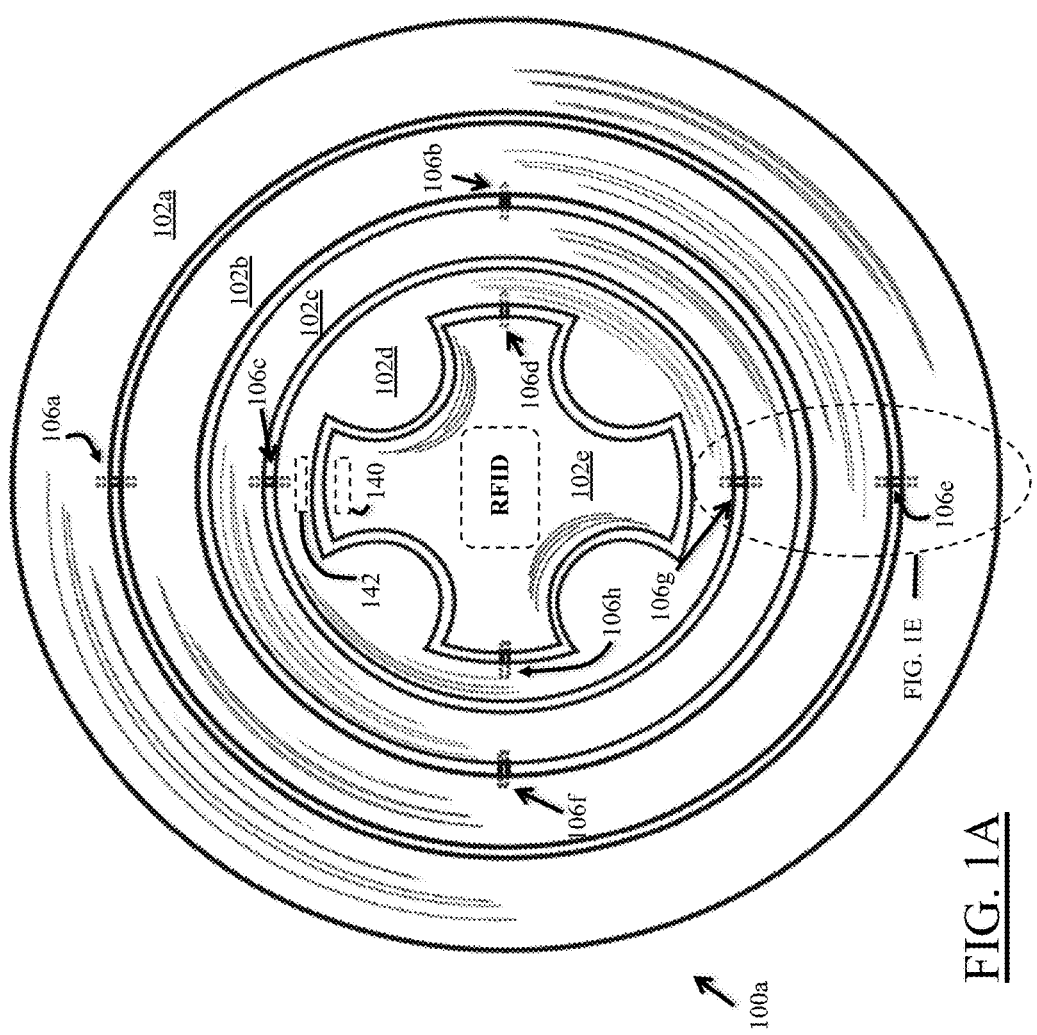
Figure 1B:
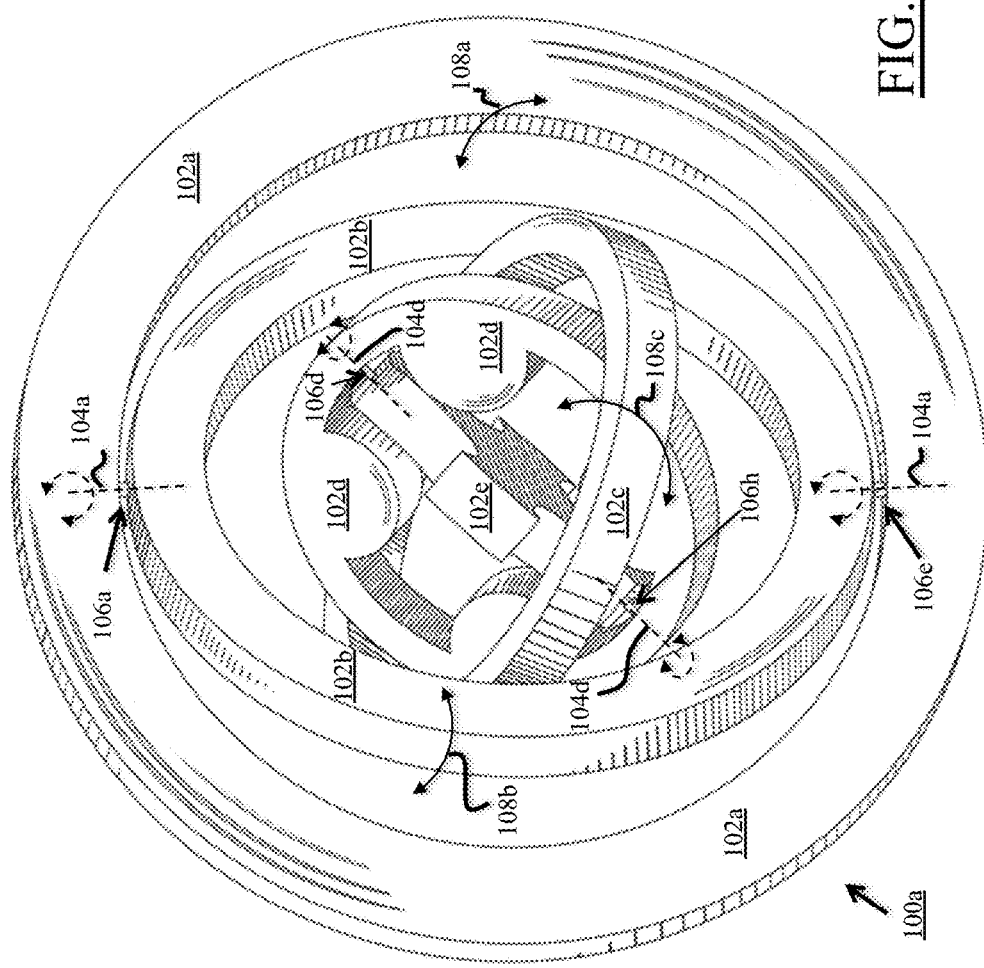
Figure 1E:
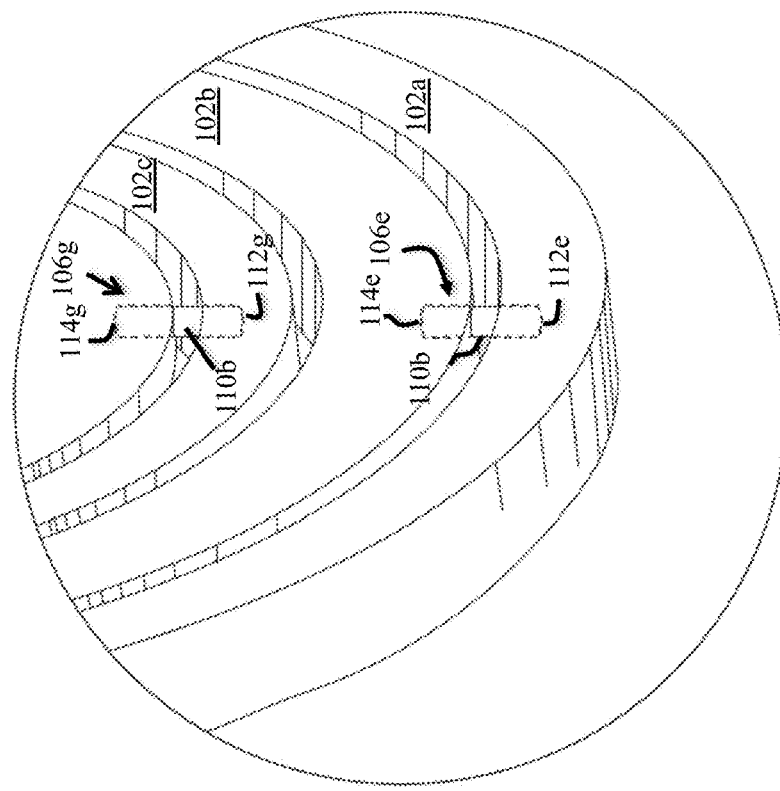
Figure 1D:
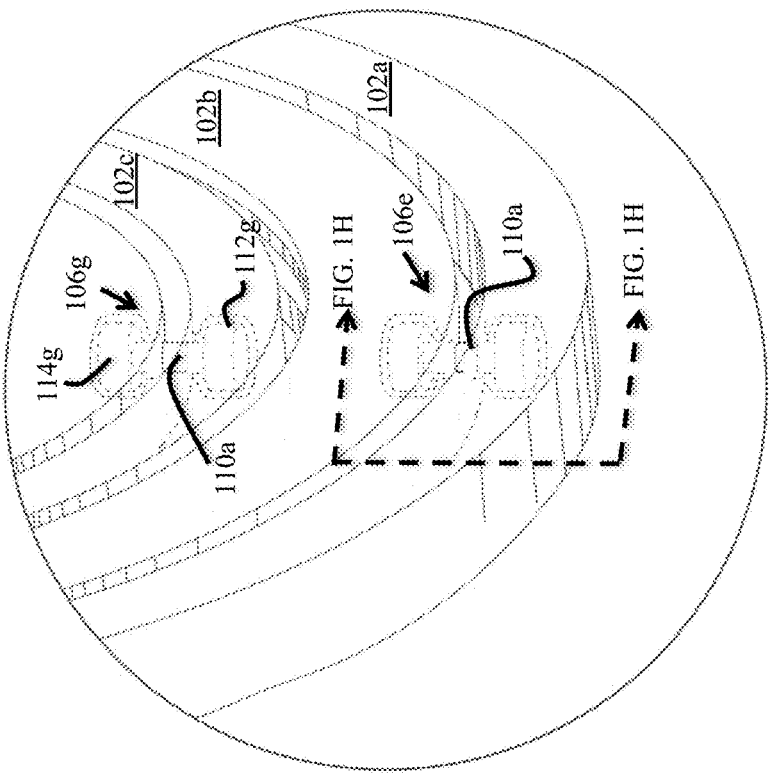

The detailed description set forth below in connection with the appended drawings is intended as a description of presently preferred embodiments of the invention and is not intended to represent the only forms in which the present invention may be constructed and or utilized.

In the description given below, when it is necessary to distinguish the various members, elements, sections/portions, components, or any other aspect or feature of a device from each other, the description will follow reference numbers with a small alphabet character such as (for example) "members 102a, 102b, 102c, etc." If the description is common to all of the various members, elements, sections/portions, components, or any other aspect or feature of a device such as (for example) to all members 102a, 102b, 102c, etc, then they are simply referred to with reference number only and with no alphabet character such as (for example) "member 102."

Throughout the disclosure, references to any exemplary game or learning system are equally applicable to any and all games or learning systems that may require the use of a device, whether the game or learning system is skill-based, chance-based, real or virtual (e.g., computer generated), with any specified game or learning system meant as illustrative of one, non-limiting exemplary embodiment and for convenience of example only. Additionally, references to a "skill" based system for any specific embodiment throughout the disclosure versus "chance" based system for other specified embodiments are meant as illustrative of one, non-limiting exemplary embodiment and for convenience of example only. Those skilled in the art would appreciate that the present invention is equally applicable to both "chance" and or "skill" based game or learning systems (virtual or real).

The present invention provides a scalable (e.g., size, number of members, etc.) device that is small, compact and portable, easy to use, and includes members with independent multi-directional motion that when marked (for exampled, with printed subject or pattern) and or when associated with a game or learning system, increases the number of permutations and combinations of outcomes for the game or learning system for an enhanced chance-based and skill-based real and or virtual game or learning experiences. Further, the present invention provides a device that is usable in both new game and learning systems and most conventional established game and learning systems, easily replacing most other devices such as dice, domino chips, etc.

The present invention provides a device that is comprised of a plurality of members and one or more pivot supports (adjustable or otherwise), with the plurality of members coupled by the one or more pivot supports that enable the members to move independently in multiple directions. At least one pair of adjacent members may optionally include a stop mechanism to slow and stop a motion of the members, which may optionally be implemented by an embedded pair of opposing pole magnets.

FIGS. 1A to 1H are non-limiting, exemplary illustrations of a device with multi-directional moving members in accordance with the present invention. As illustrated, the device 100a in accordance with an embodiment of the present invention provides members 102 (e.g., 102a, 102b, etc.) that are associated with one another with pivot axes 104 (FIG. 1B), where a member 102 provides one or more pivot support 106 that allows independent rotation of a next member 102 about an axis 104. For example, member 102b provides one or more pivot support 106a/e that allows independent rotation (along reciprocating path 108a) of a next member 102a about the pivot axis 104a. Alternatively, the member 102a provides one or more pivot support 106a/e that allows independent rotation 108a of the next member 102b about the pivot support 106a/e. Accordingly, the member 102a independently rotates along the reciprocating path 108a (FIG. 1B), member 102b independently rotates along the reciprocating path 108b, member 102c independently rotates along the reciprocating path 108c, member 102d independently rotates along the reciprocating path 108d (FIG. 1C), and member 102e independently rotates along the reciprocating path 108e.

It should be noted that in this and all of the below embodiments adjacent members (e.g., member 102e and member 102d) may optionally be provided with magnets 140 and 142 (FIG. 1A) with opposing polarity that facilitate aligning of the entire body of the members within a single, common plane (or the alignment plane). That is, the magnets optionally positioned within each member are attracted due to their magnetic force, compelling the body of the adjacent members to align within the alignment plane. Further, in this and below embodiments, all devices may include conventional Radio Frequency Identification (RFID) or other electronic components that enables association of the device with external devices. Non-limiting examples of "association" may include communication, transmission/receipt of signals, etc. Non-limiting examples of external devices may include any device capable of receiving or transmitting signals, including mobile devices, alarm system, gaming devices, computers, etc.

As best illustrated in FIGS. 1D to 1H, the pivot support 106 is in a form of a coupler with an end 112 that is coupled with a member 102 and a next end 114 that is coupled with a next member. It should be noted that numerous different types of pivot supports 106 with different configurations may be used in this and other below described embodiments, including pivot supports in a form of a coupler 110a (FIG. 1D) illustrated as a "dumbbell" type and the coupler 110b (FIG. 1E) illustrated as a straight pin. The exemplarily illustrated dumbbell configured pivot supports need not be limited to the respective first and second ends 112 and 114 having disc like (disc right-cylinder) configurations but may comprise of spherical configurations (FIG. 3F-2), or may comprise of any other configurations with sharp or rounded edges. In fact, as detailed below with respect to this and other embodiments, the pivot supports 106 (couplers) may easily be replaced by adjustable pivot supports 304 that are exemplarily illustrated in detail in FIGS. 3F-1 and 3F-2.

Therefore, any combinations of pivot supports (adjustable or otherwise), including any combinations of various configurations of pivot support ends shapes may be used for any of the embodiments illustrated and described throughout the disclosure.

In the particular, non-limiting, exemplary instance illustrated in FIGS. 1A to 1H, one or more pivot support 106a/e is provided with the first end 112a/e secured within the member 102a, and the second end 114a/e secured within the next member 102b. In addition, one or more pivot support 106b/f is provided with the first end 112b/f secured within the member 102b, and the second end 114b/f secured within the next member 102c. Further, one or more pivot support 106c/g is provided with the first end 112c/g secured within the member 102c, and the second end 114c/g secured within the next member 102d. Finally, one or more pivot support 106d/h is provided with the first end 112d/h secured within the member 102d, and the second end 114d/h secured within the next member 102e.

Figures 1, 1F, 2:
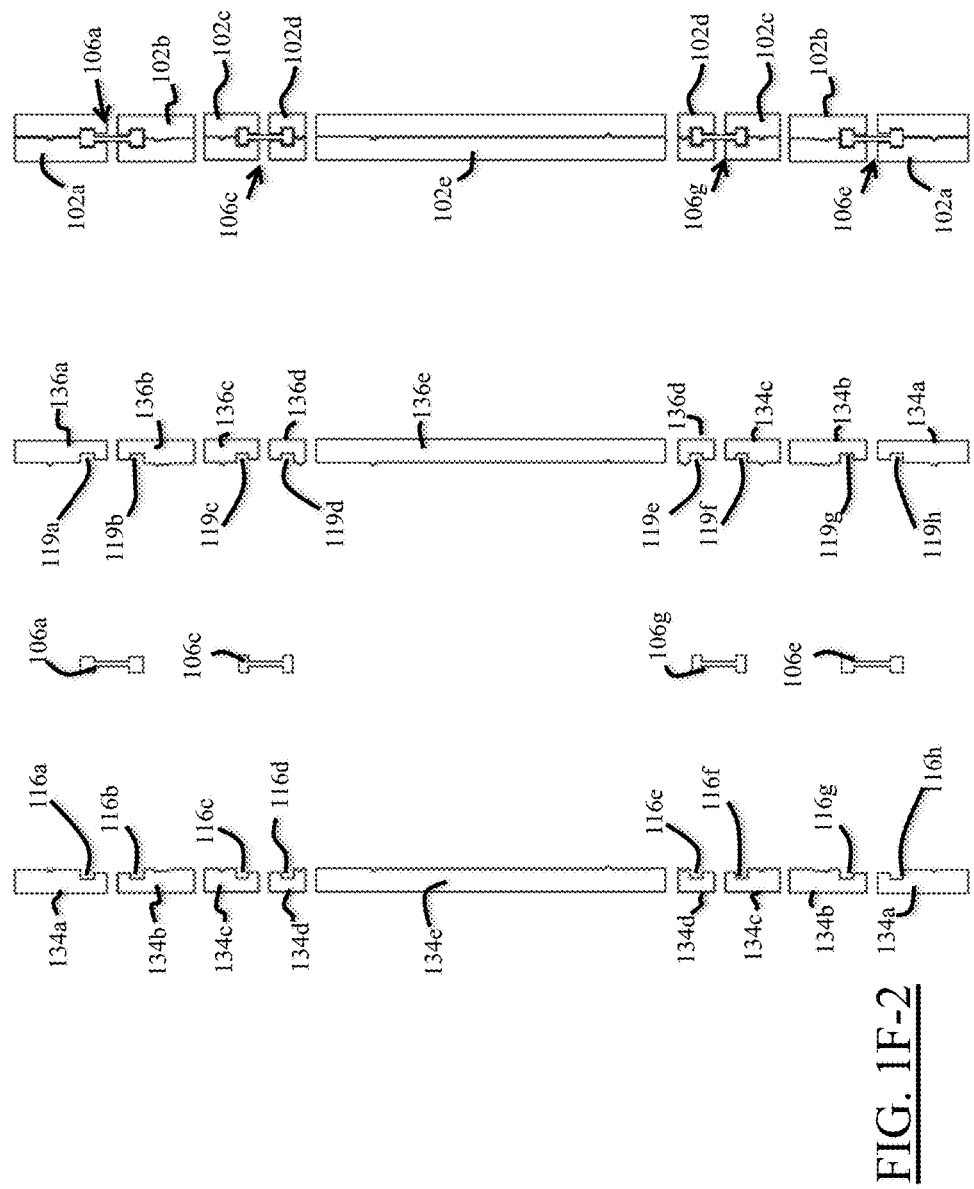

As best illustrated in FIGS. 1F-1 to 1H, each member 102 of the device 100a is comprised of two sections 134 and 136 that are connected together to form a single piece member 102, with the interior (or connecting) facing side of each section 134 and 136 of the single piece member 102 comprised of various recesses 116 and 119 that form an interlocking housing that accommodate and secure the pivot supports 106. Non-limiting, exemplary connection methods for the sections 134 and 136 to form a single piece member 102 may include the use of adhesives, ultrasonically welding of the two sections 134 and 136, or others.

As best illustrated in FIGS. 1F-1 to 1G, a first section 134 of an exemplary member 102 includes one of a protuberance 120 (FIG. 1G) and a complementary groove 122 and a second section 136 of the member 102 includes the other of the groove 122 and the complementary protuberance 120 that interlock when the two sections 134 and 136 are brought together (preferably, when ultrasonically welded, with the weld line 124 shown), securing the pivot support 106 in between the two sections 134 and 136 of each member 102.

As further illustrated in FIGS. 1F-1 to 1H (and FIG. 1H in particular), the pivot support 106 has a first end 112 that is accommodated within a first housing section 116 and 119 in a member, and a second end 114 that is accommodated within a second housing sections 116 and 119 of the next member, with a height 126 of the mid section 130 of the coupler 110 substantially defining the gap distance or span 128 between the coupled members 102. The housings 116 and 119 are comprised of recesses that securely house the respective ends 112 and 114 of the pivot support 106, and include indentations 118 that securely accommodate the middle section 130 of the pivot support 106 (e.g., coupler 110a).

FIGS. 2A to 2F are non-limiting, exemplary illustrations of a device with multi-directional moving members in accordance with another embodiment of the present invention where the movement of the one or more members includes spatial rotations along a combination of principal rotations. The device 100b illustrated in FIGS. 2A to 2F includes similar corresponding or equivalent components, interconnections, functional, and or cooperative relationships as the device 100a that is shown in FIGS. 1A to 1H, and described above. Therefore, for the sake of brevity, clarity, convenience, and to avoid duplication, the general description of FIGS. 2A to 2F will not repeat every corresponding or equivalent component, interconnections, functional, and or cooperative relationships that has already been described above in relation to device 100a that is shown in FIGS. 1A to 1H.

As illustrated in FIGS. 2A to 2F, the device 100b is comprised of members that are associated with one another with pivot axes 104, where a member provides a pivot support 106 that allows spatial rotations of a next member along principal rotations (which are rotations around the x, y, and z axes). As detailed below, the pivot support 106 with first and second ends 112 and 114 is secured within a channel 202 of a member 102.

As illustrated in FIGS. 2A to 2F, the device 100b includes one or more members 102 that have one or more channels 202, where a pivot support 106 with first and second ends 112 and 114 is secured within a channel 202 of the member and the next member. The channel 202 may extend (either partially or fully) along any one or both (interior and or exterior) side of the member and or the next member. The terms "interior" side within the context of FIGS. 2A to 2F refers to the side facing the "interior" center of the device, and the term "exterior" side refers to the side facing the opposite "interior" center of the device.

In the particular, non-limiting, exemplary instance illustrated in FIGS. 2A to 2F, the member 102a has a channel 202a that fully extends along an interior side thereof. The next member 102b has two channels 202b and 202c with the channel 202b fully extending along the exterior side of the member 102b and channel 202c fully extending along the interior side of the member 102b. One or more pivot support 106a/e is provided with a first end 112a/e secured within the channel 202a of the member 102a, and a second end 114a/e secured within the channel 202b of the next member 102b.

The member 102c is also exemplary illustrated as having two channels 202d and 202e with the channel 202d fully extending along the exterior side of the member 102c and channel 202e fully extending along the interior side of the member 102c. One or more pivot support 106b/f is provided with a first end 112b/f secured within the channel 202c of the member 102b, and a second end 114b/f secured within the channel 202d of the member 102c.

The member 102d is exemplary illustrated as having one channel 202f that fully extends along the exterior side of the member 102d. One or more pivot support 106c/g is provided with a first end 112c/g secured within the channel 202e of the member 102c, and a second end 114c/g secured within the channel 202f of the member 102d. As further illustrated in FIGS. 2A to 2F, the finally illustrated member 102e has no channels and its associated pivot axis is comprised of pivot support 106d/h with a first end 112d/h secured within the member 102d, and a second end 114d/h secured within the member 102e.

Figure 2B:
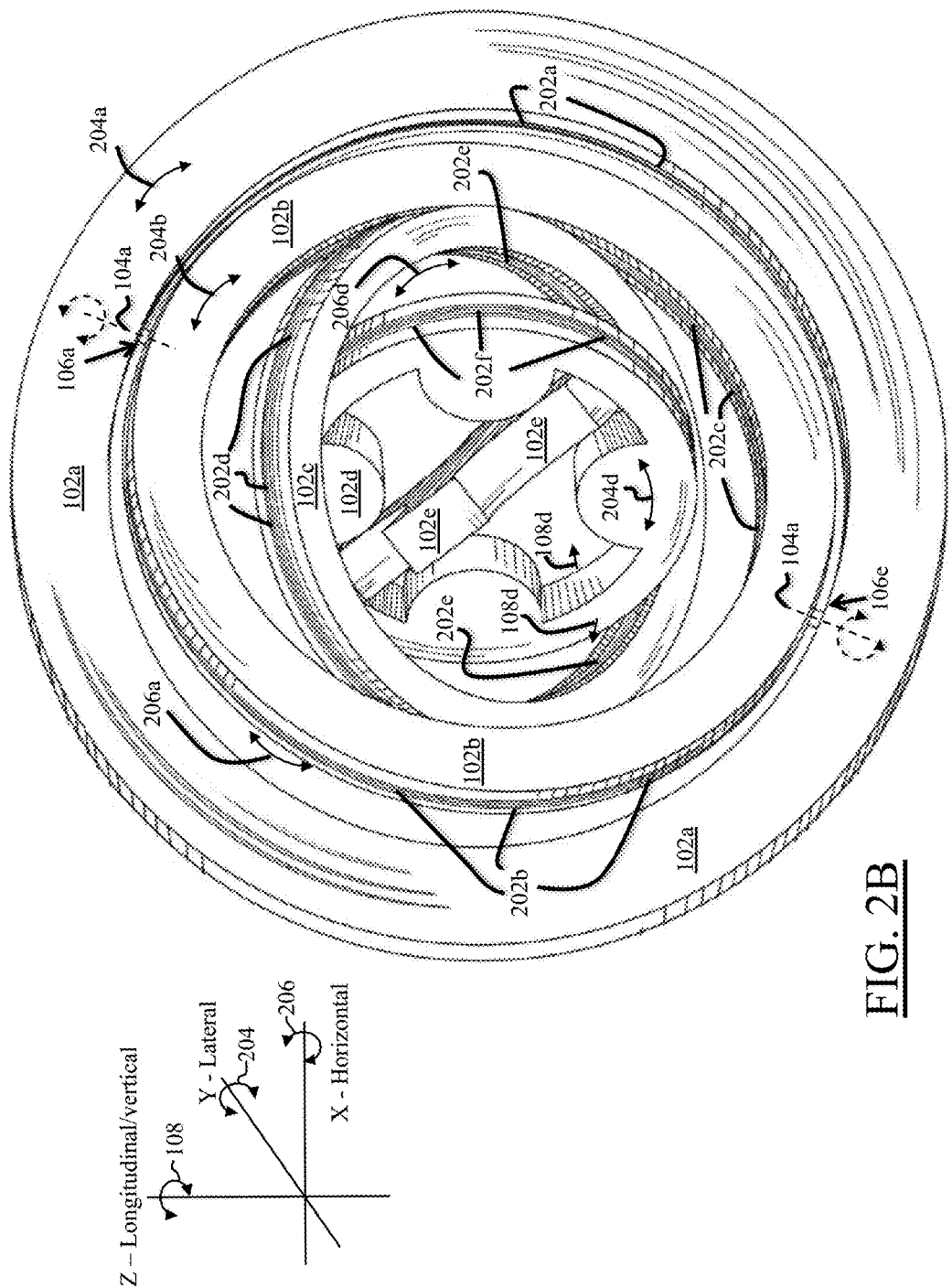
Figure 2C:
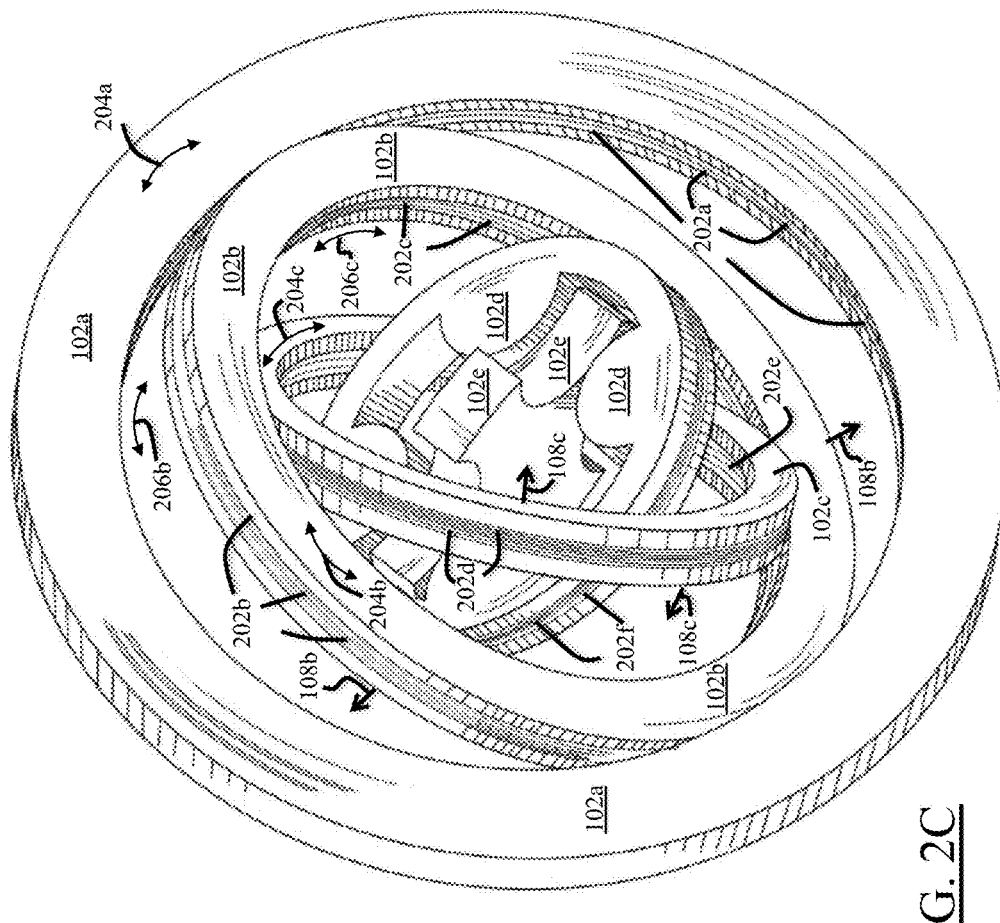
Figure 2C:
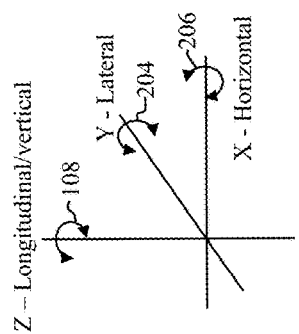

As stated above and best illustrated in FIGS. 2B and 2C, the device 100b is comprised of members 102 that are associated with one another with pivot axes 104, where a member provides a pivot support 106 that allows spatial rotations of a next member along principal rotations (which are rotations around the x, y, and z axes). As detailed above, the pivot support 106 within the context of FIGS. 2A to 2F is comprised of a coupler 110 with a first and second ends 112 and 114 that may be secured within a channel of a member. As detailed below, in the non-limiting instance illustrated in FIGS. 2B and 2C, in addition to the rotations along the reciprocating path 108 illustrated in FIGS. 1A to 1H, the device 100b illustrated in FIGS. 2B and 2C also includes rotations along reciprocating paths 204 and 206 for one or more members 102.

Arbitrarily and without limitations and for discussion purposes only, the respective reciprocating paths 108, 204, and 206 may be exemplarily and without limitation associated with rotations along the respective z, y, and x axis, which define spatial rotations along principal rotations. For example, member 102a provides one or more pivot support 106a/e that allows independent rotation (along reciprocating path 108a) thereof about the pivot axis 104a (which may be associated with rotation around the z-axis). Due to the channel 202a, the member 102a may also rotate along the paths 204a (which may be associated with rotation around the y-axis). Additionally, due to the channel 202b, the member 102a may also rotate along the path 206a (which may be associated with the rotation around the x-axis). Accordingly, member 102a is allowed spatial rotations along all principal rotations.

Member 102b also provides one or more pivot support 106a/e (shared with member 102a) that allows independent rotation (along reciprocating path 108b) about the pivot axis 104a (which may be associated with rotation around the z-axis). Due to the channels 202a and or 202b, the member 102b may also rotate along the paths 204b (which may be associated with rotation around the y-axis). Additionally, due to the channel 202b, the member 102b may also rotate along the path 206b (which may be associated with the rotation around the x-axis). Accordingly, member 102b is also allowed spatial rotations along all principal rotations.

Member 102c also provides one or more pivot support 106b/f that allows independent rotation (along reciprocating path 108c) about the pivot axis 104b (which may be associated with rotation around the z-axis). Due to the channels 202c and or 202d, the member 102c may also rotate along the paths 204c (which may be associated with rotation around the y-axis). Additionally, due to the channel 202d, the member 102c may also rotate along the path 206c (which may be associated with the rotation around the x-axis). Accordingly, member 102c is also allowed spatial rotations along all principal rotations.

Member 102d also provides one or more pivot support 106c/g that allows independent rotation (along reciprocating path 108d) about the pivot axis 104c (which may be associated with rotation around the z-axis). Due to the channels 202e and or 202f, the member 102d may also rotate along the paths 204d (which may be associated with rotation around the y-axis). Additionally, due to the channel 202f, the member 102d may also rotate along the path 206d (which may be associated with the rotation around the x-axis). Accordingly, member 102d is also allowed spatial rotations along all principal rotations. As to the member 102e, in this non-limiting, exemplary instance, the member 102e also provides one or more pivot support 106d/h that allows independent rotation (along reciprocating path 108e) about the pivot axis 104d (which may be associated with rotation around the z-axis).

Figure 2D:
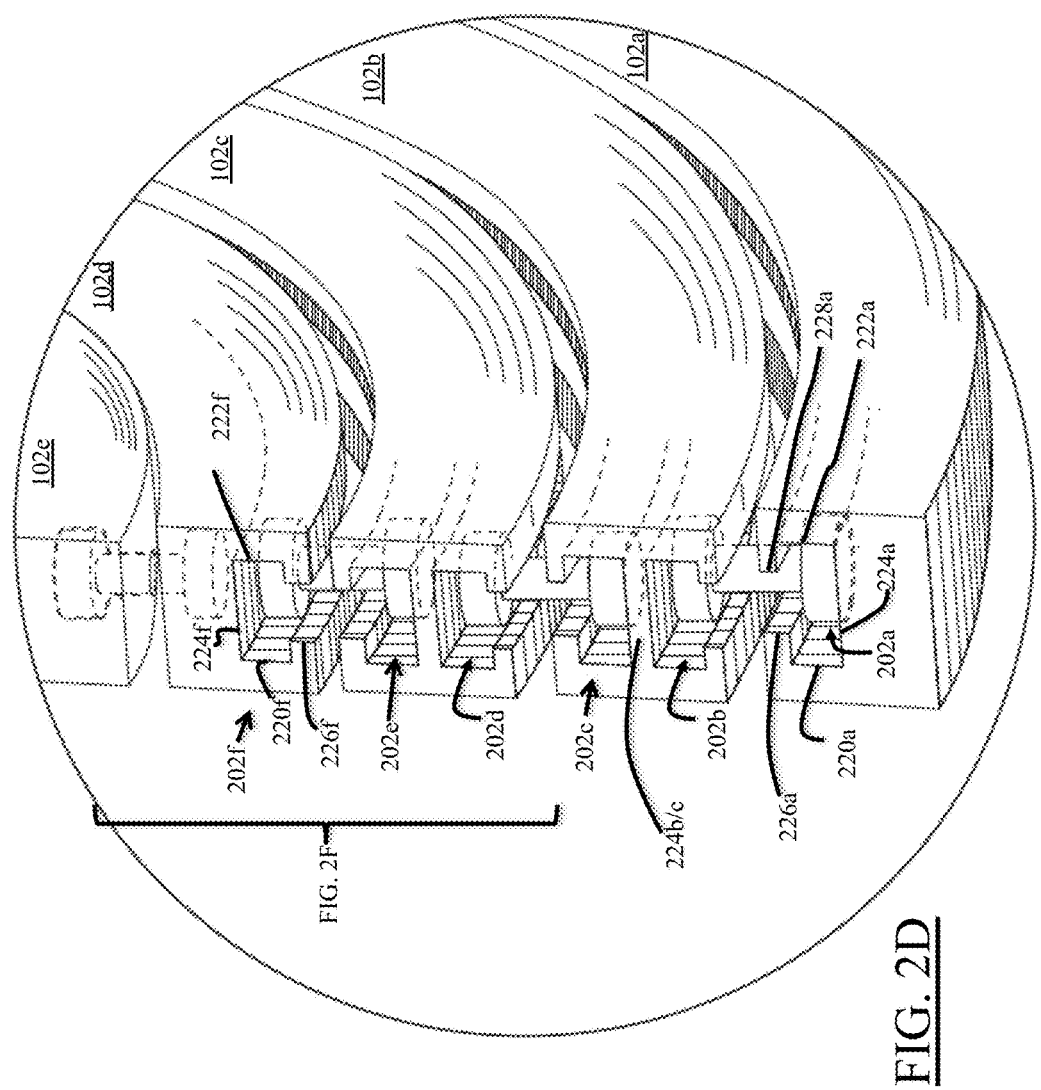

As illustrated in FIG. 2D, the one or more channels 202 are exemplarily illustrated as having a substantially rectangular cross-sectional profile with "dumbbell" type couplers 110a. The channels 202 include substantially vertical lateral walls 220 and 222 that define the length or height of the channels 202 and a base 224 that is substantially perpendicular to the walls 220 and 222, with the base 224 defining a width thereof. The channels 202 further include a channel opening defined by a set of flanges 226 and 228 that perpendicularly extend from the lateral walls 220 and 222. The illustrated profile of the channels extends along any one or both (interior and or exterior) side of a member and or the next member. It should be noted it is only for clarity within FIG. 2D and to avoid confusion that the FIG. 2D has not provided reference numbers for every lateral wall 220 and 222, base 224, and flange 226 of every channel 202.

Figures 2, 3F:
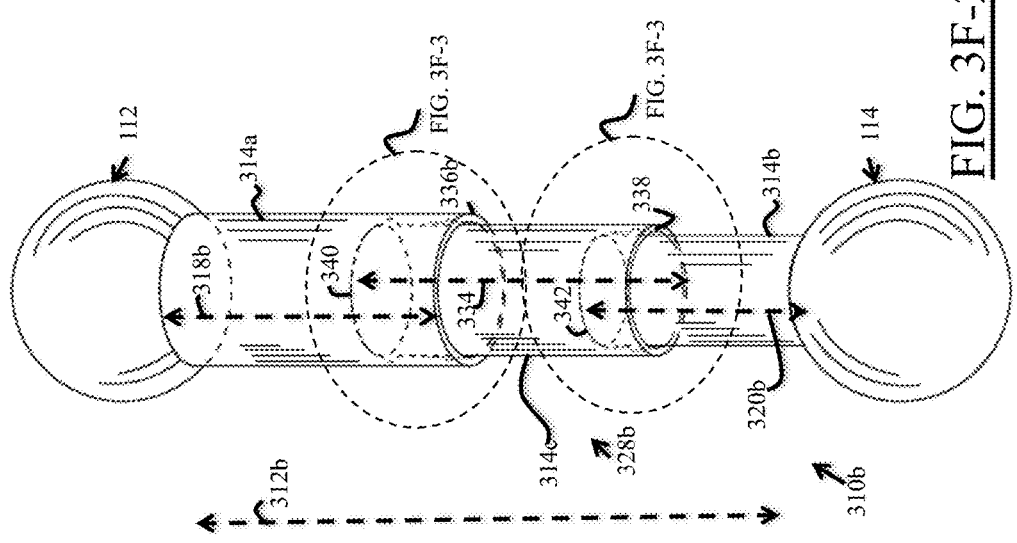
Figures 1, 3F:
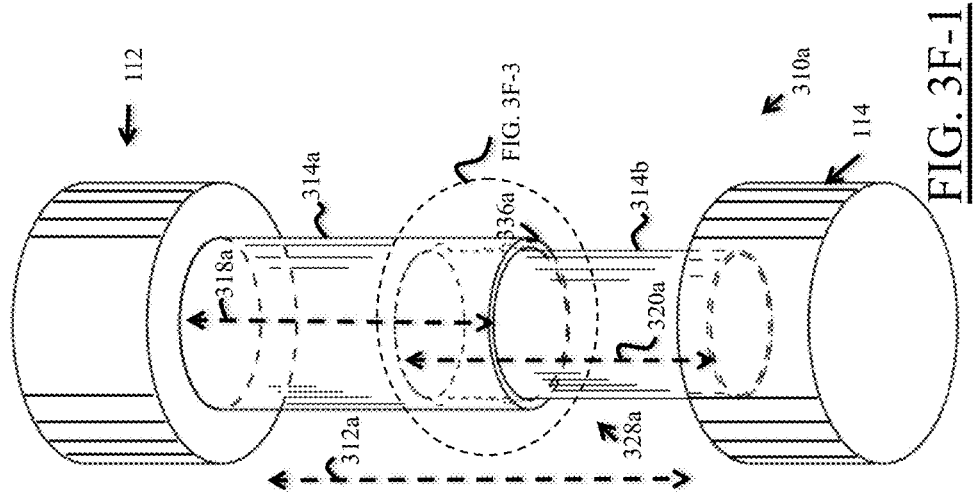
Figures 3, 3F:
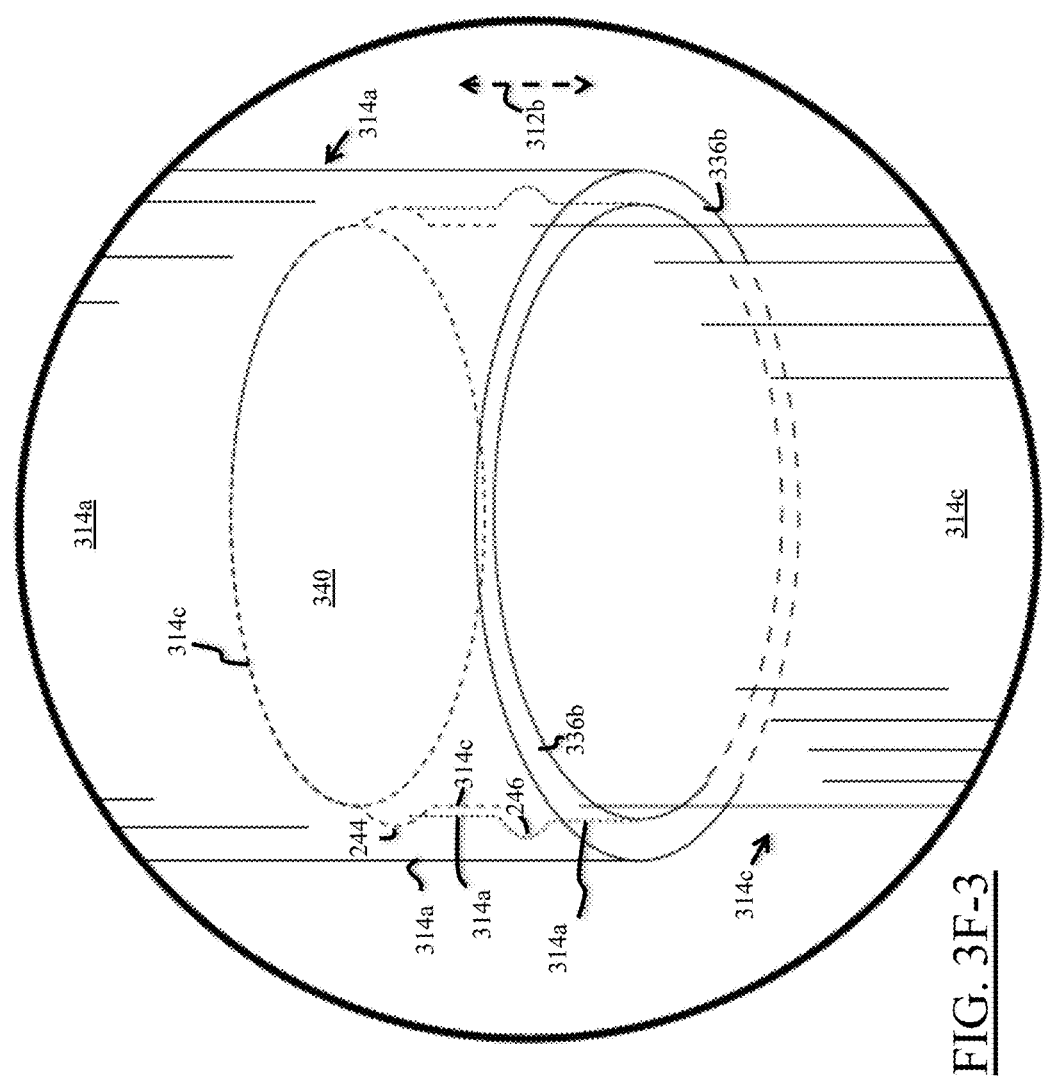
Figure 4A:
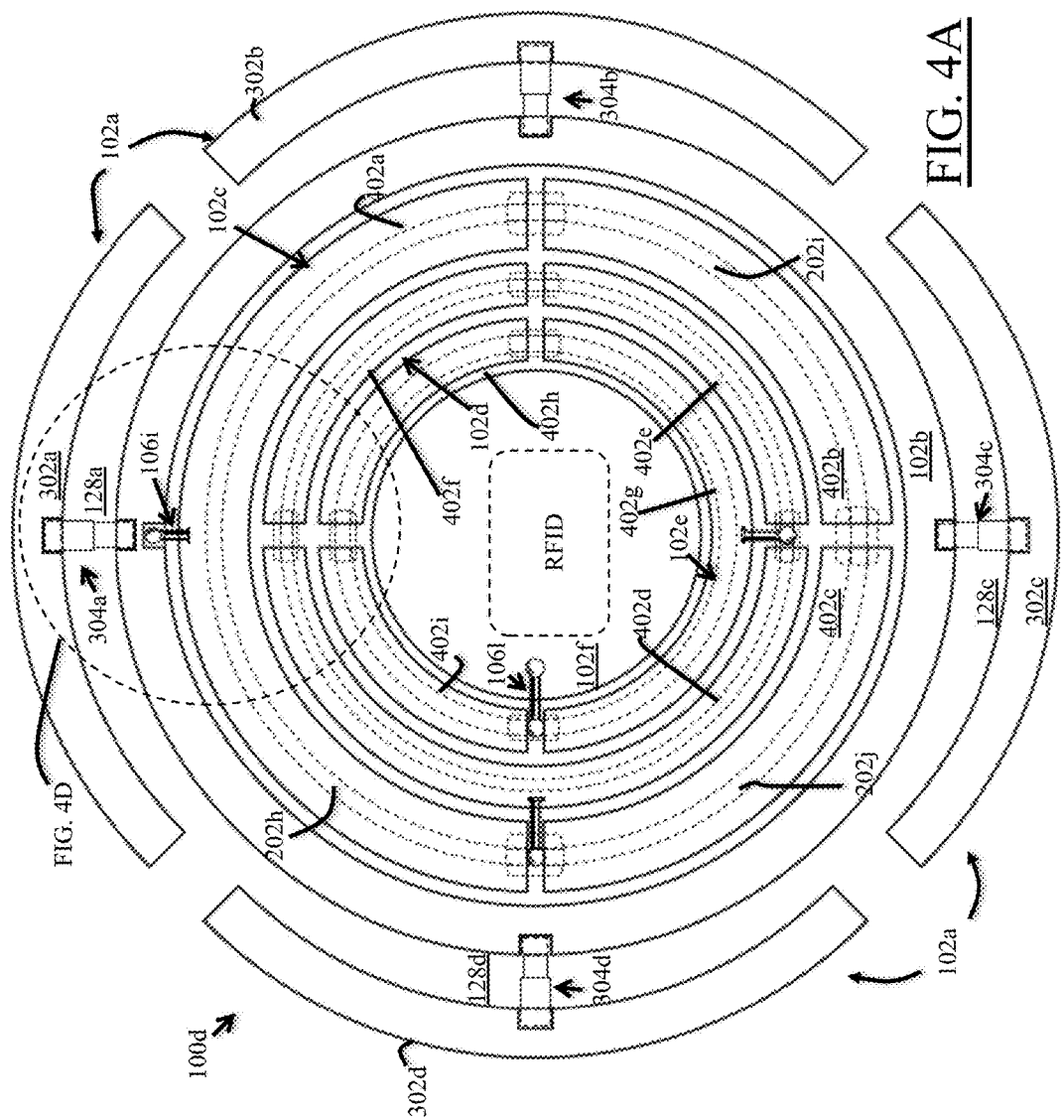
FIGS. 4A to 4D are non-limiting, exemplary illustrations of a further embodiment of a device in accordance with the present invention.
Figures 1, 4B:
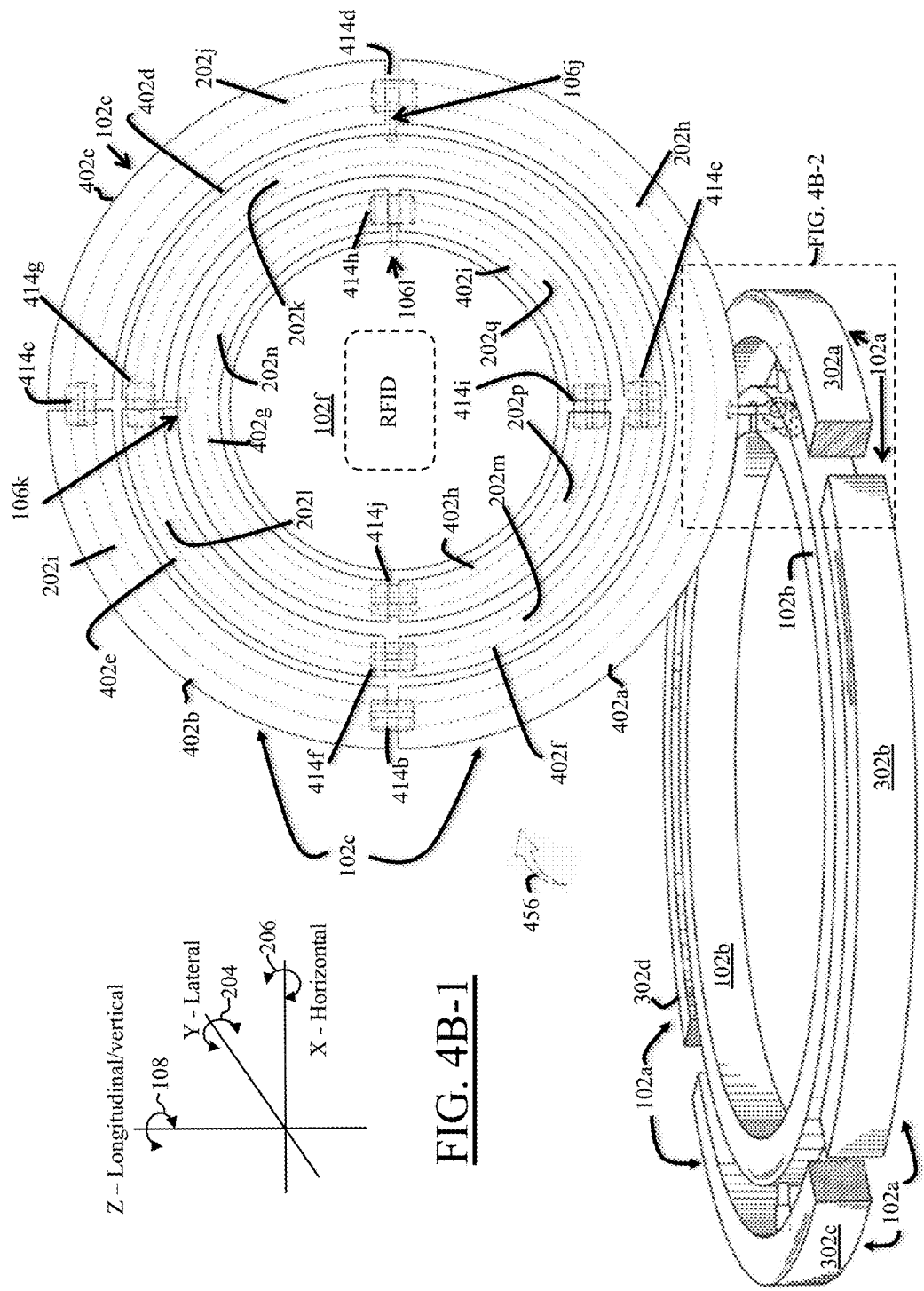
Figures 2, 4B:
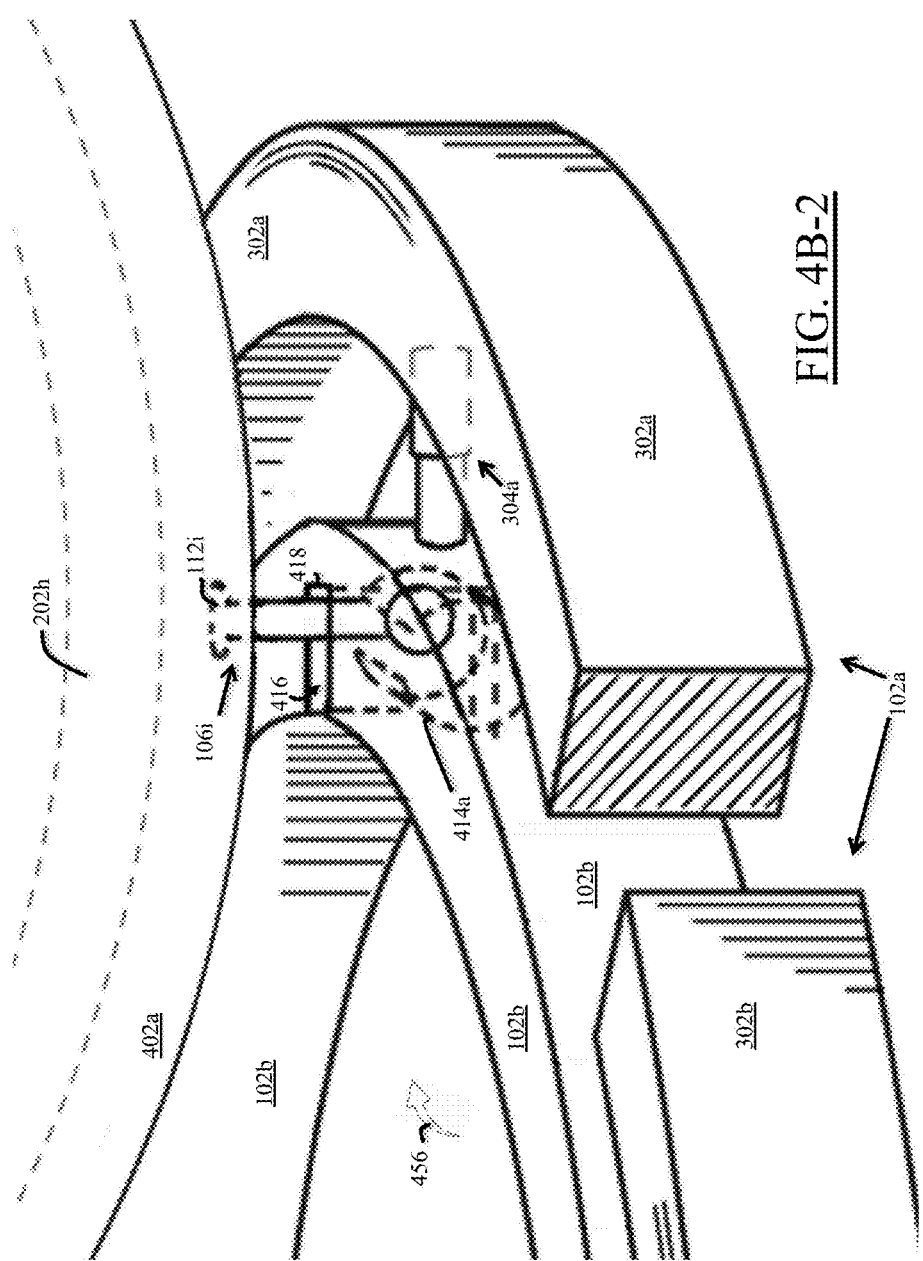
Figures 1, 4C:
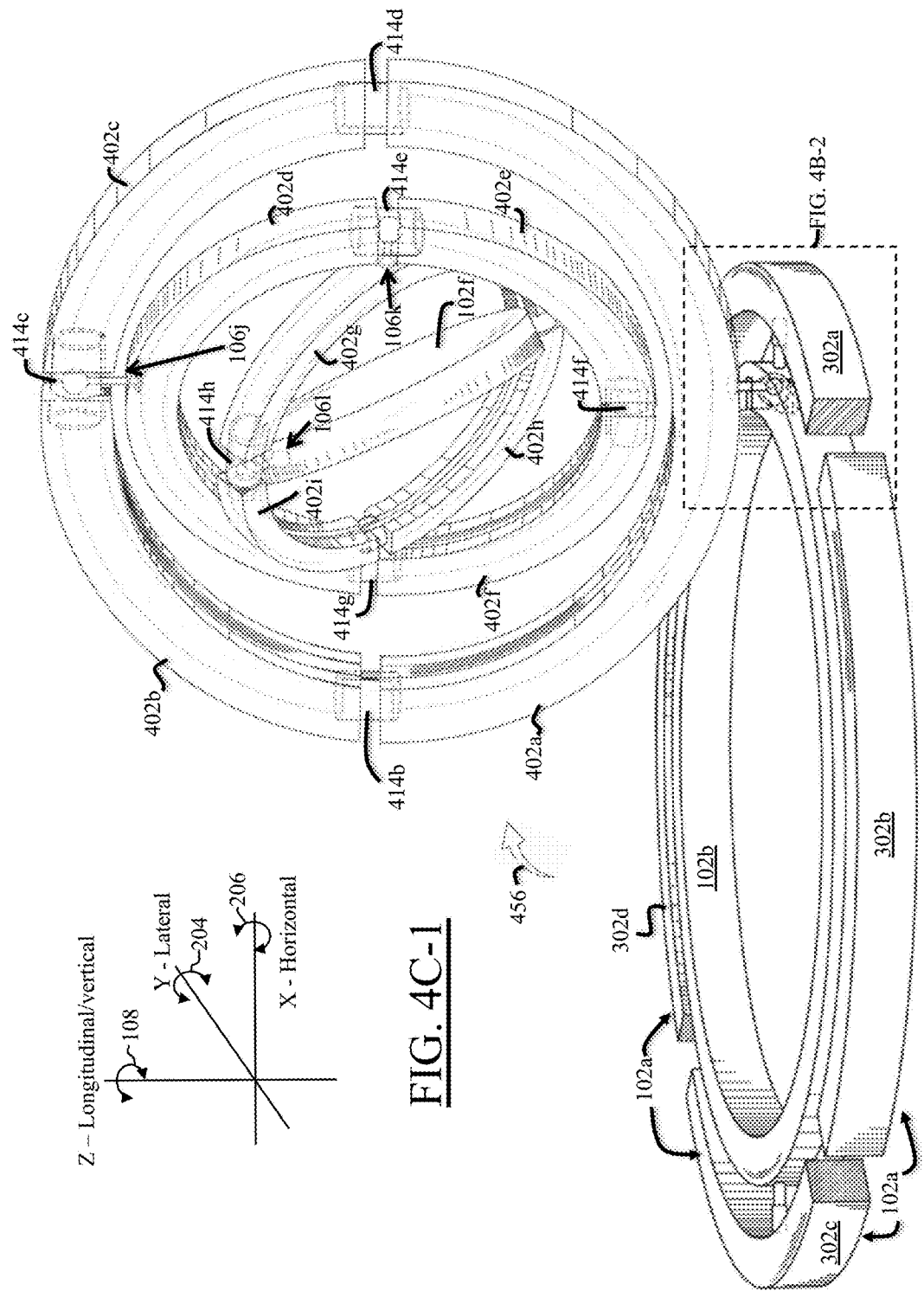
Figures 4, 4C:
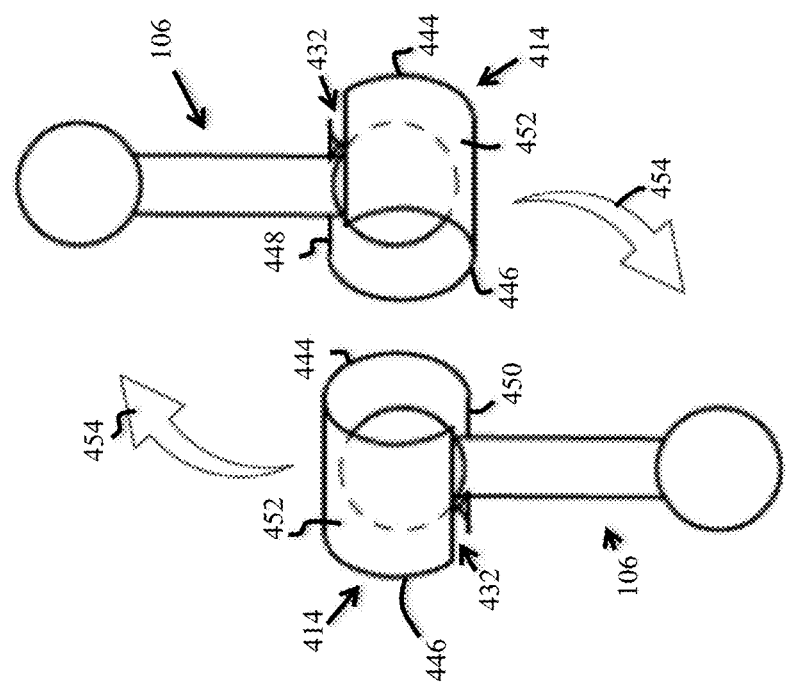
Figure 4D:
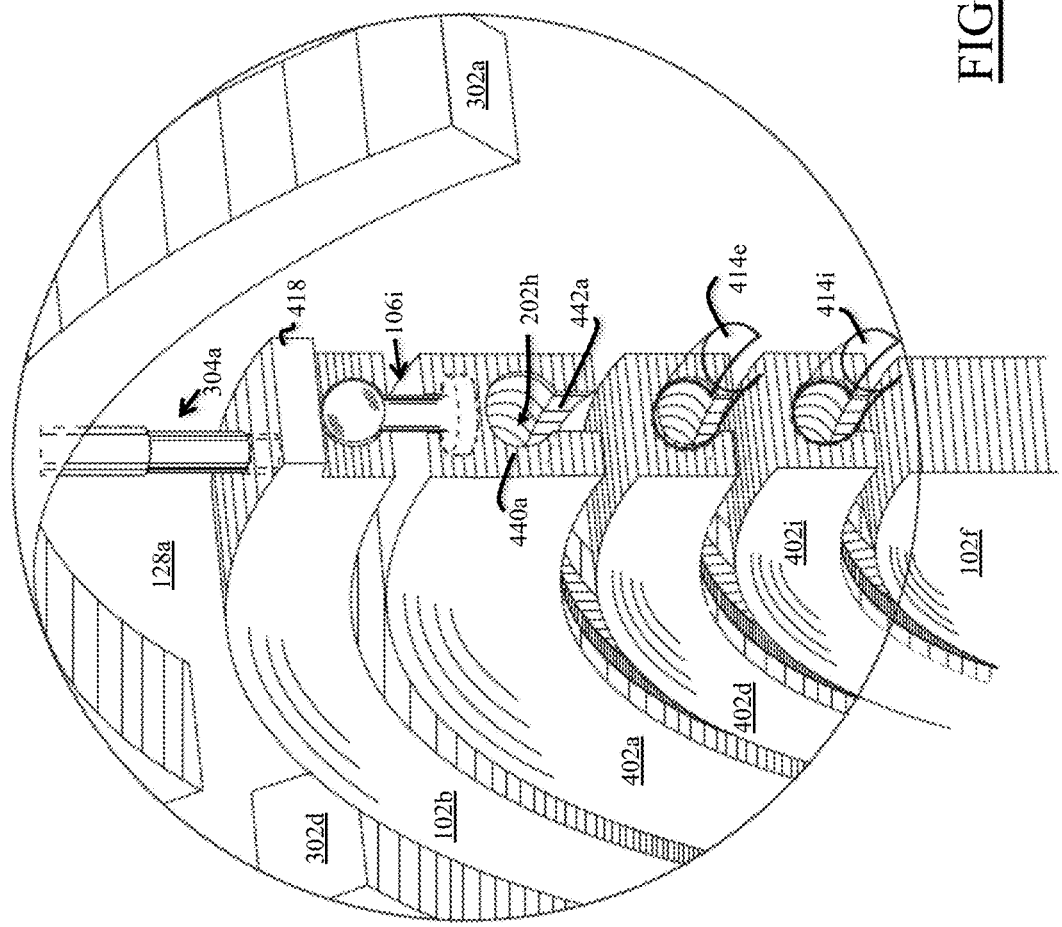

It should further be noted that the one or more channels 202 illustrated throughout the disclosure for this and other embodiments may be configured to have any cross-sectional profile (other non-limiting example of which is illustrated in FIG. 4D) including any polygonal cross-sectional profiles, rounded cross-sectional profiles, or combinations thereof. Further, the exemplarily illustrated dumbbell configured pivot supports need not be limited to the respective first and second ends 112 and 114 having disc like (disc right-cylinder) configurations but may comprise of spherical configurations (FIG. 3F-2), or may comprise of any other configurations with sharp or rounded edges so long as the pivot supports 106 have a first and second ends with sufficient mass (or bulging ends) that is larger than the channel opening so that the pivot supports 106 remain within the channels 202 but may continue to move smoothly along the channels 202 therein. Further, in addition to the rotations of the members 102, the pivot supports 106 may also move along the channels 202 while the members 102 rotate without an affect on the overall operation of the device. In other words, the pivot supports 106 need not remain static at an approximate 90° degrees in relation to one another as illustrate and may in fact move within the channels 202 to any position.

Figures 1, 2E:
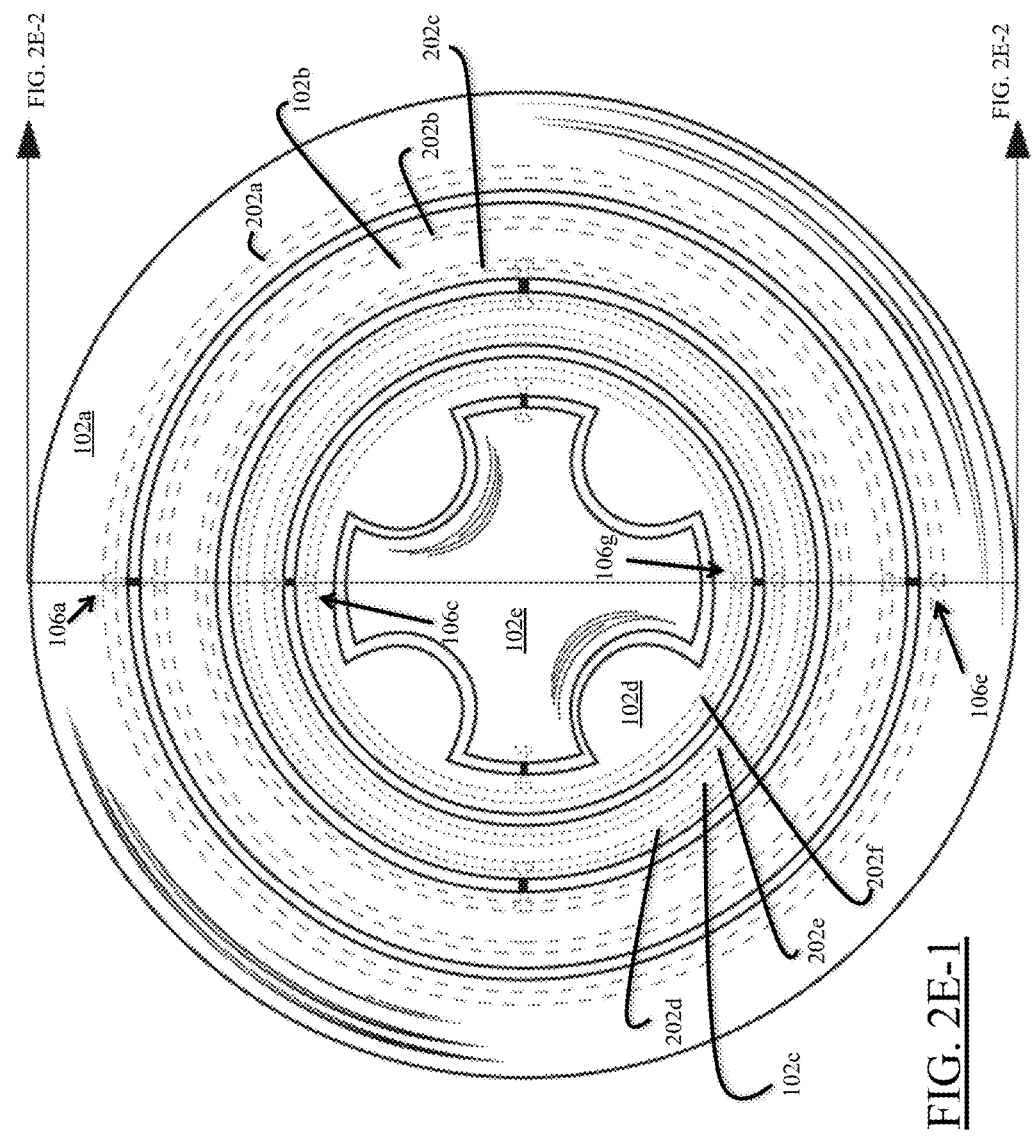
Figures 2, 2E:
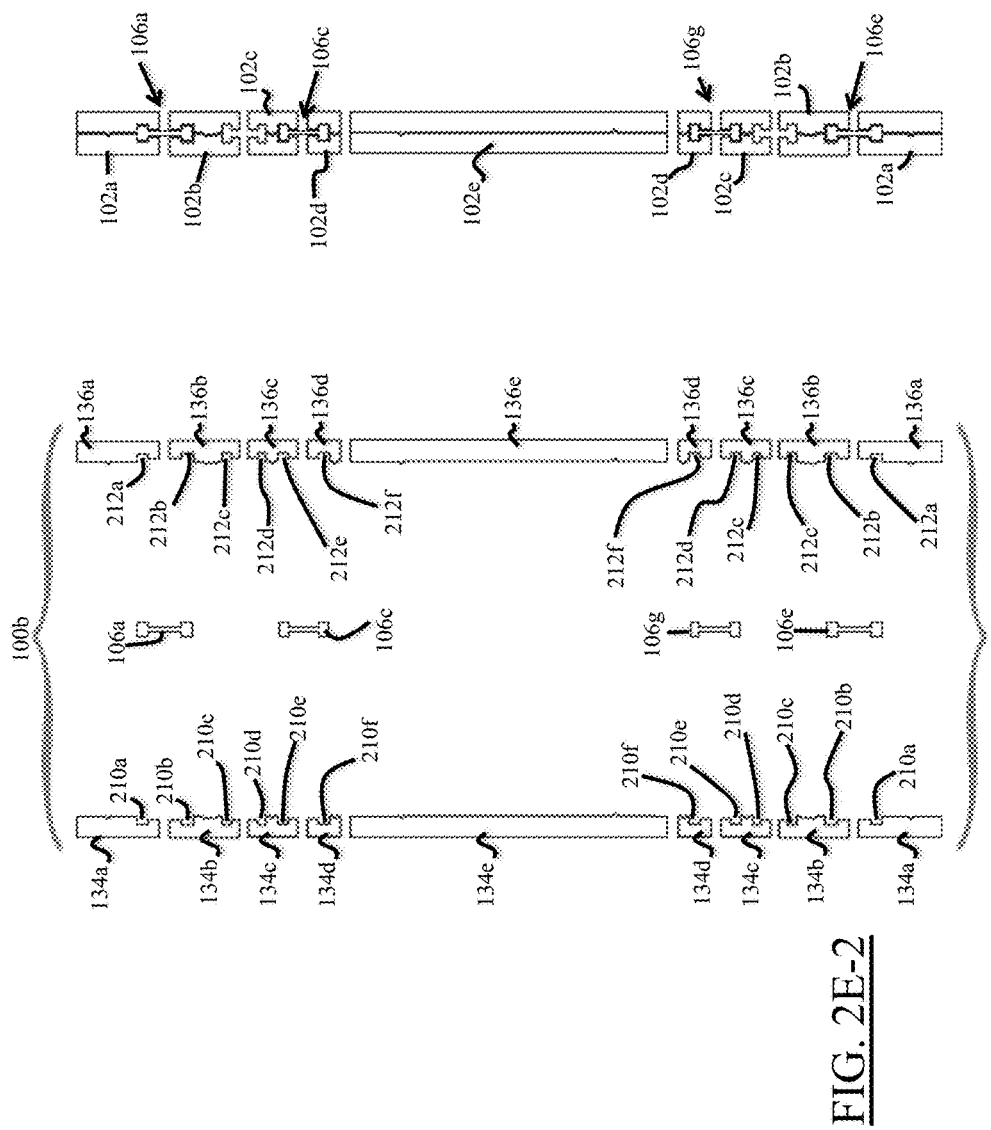
Figures 2, 2E, 3, 4:
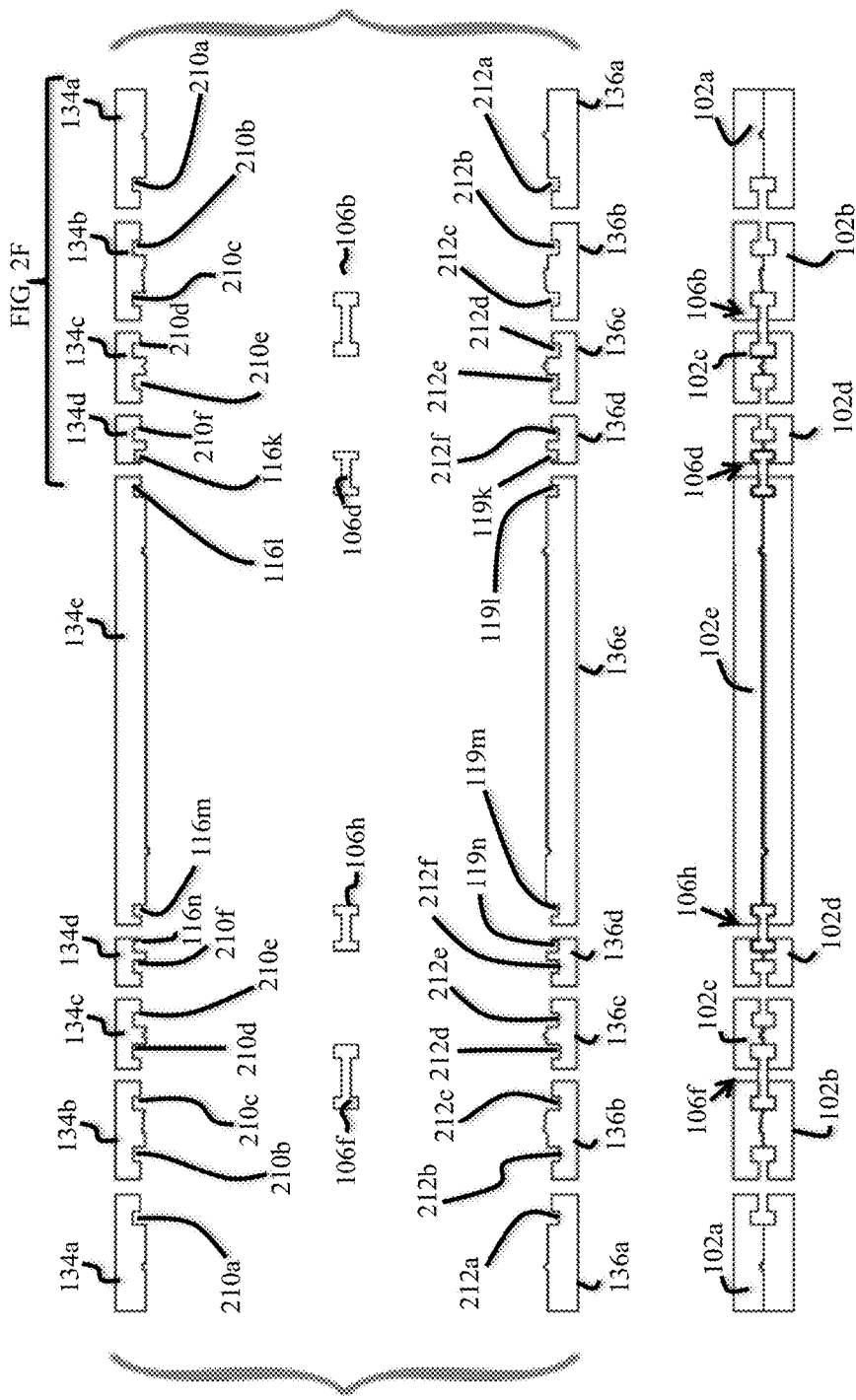
Figure 2F:
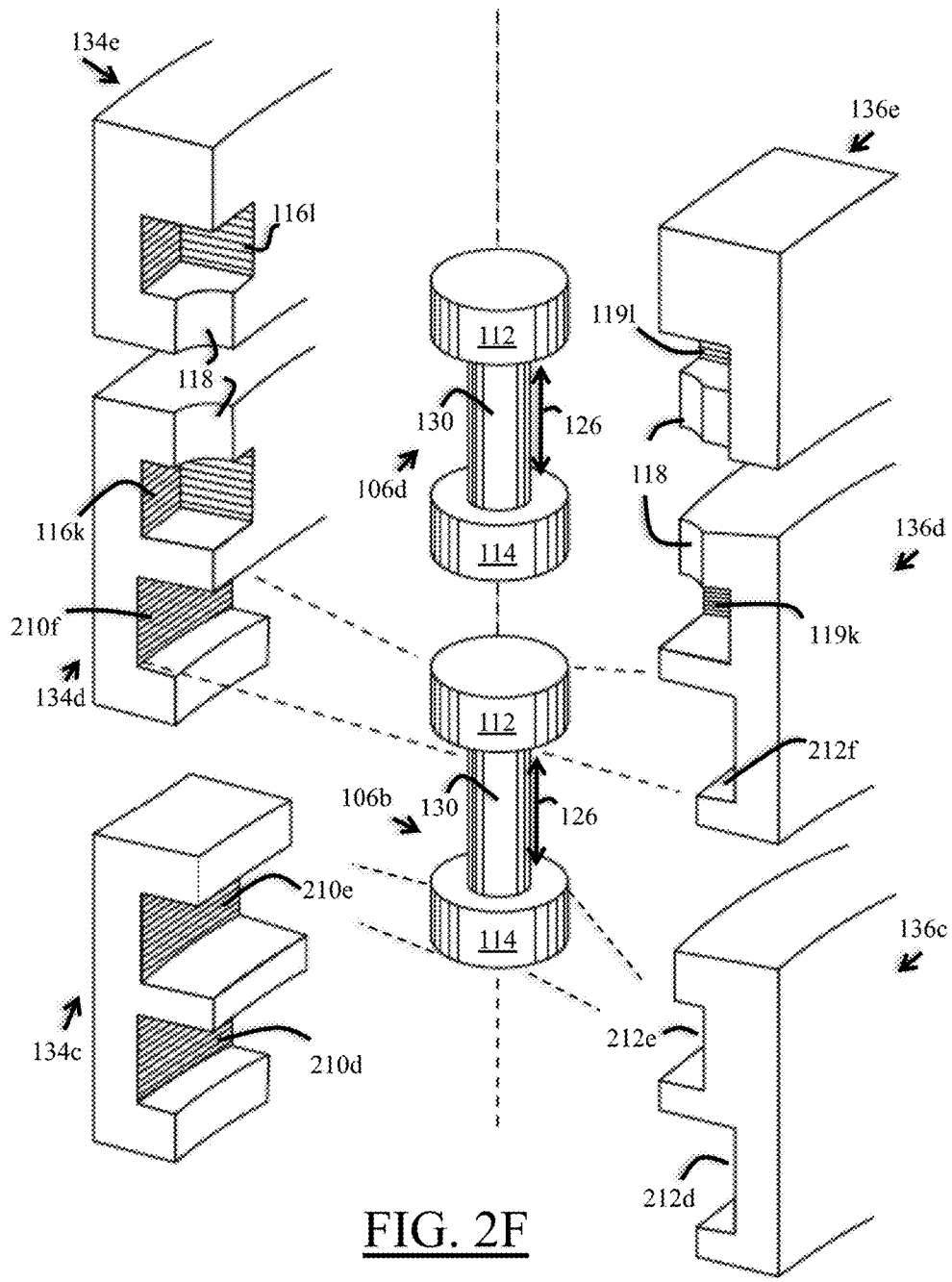

As best illustrated in FIGS. 2E-1 to 2F, each member 102 of the device 100b is comprised of two sections 134 and 136 that are connected together to form a single piece member 102, with the interior (or connecting) facing side of each section 134 and 136 of the single piece member 102 comprised of various recesses 210 and 212 that form the channels 202 that accommodate and secure the various pivot supports 106.

In the non-limiting exemplary instance illustrated in FIGS. 2A to 2F (best shown in FIGS. 2E-3, 2E-4, and 2F), the complementary sections 134d and 136d, and the complementary sections 134e and 136e of the respective members 102d and 102e are connected together to form a single piece member 102, with the interior (or connecting) facing side of each section 134d/e and 136d/e of the single piece member 102 comprised of various recesses 116 and 119 that form an interlocking housings that accommodate and secure the pivot supports 106, and do not form channels 202. As stated above, non-limiting, exemplary connection methods for the sections 134 and 136 to form a single piece member 102 of device 100b may include the use of adhesives, ultrasonically welding of the two sections 134 and 136, or others.

FIG. 2F is a non-limiting, exemplary perspective view of the sections of members shown in FIGS. 2D, 2E-3, and 2E-4, which illustrates the combinational use of both channels and interlocking housings. As illustrated in FIGS. 2A to 2F, the inner most member 102e has no channel and the next outer member 102d only has one channel 202f. The member 102e includes sections 134e and 136e with recesses 116l/m and 119l/m that form the interlocking housings for the pivots supports. The next member 102d includes the sections 134d/136d that include the combination of one channel 202f (channel sections 210f and 212f) and interlocking housing comprised of recesses 116k/n and 119k/n. As illustrated in FIG. 2F, the member 102e (with sections 134e and 136e) has a coupler housing section 116l and 119l that accommodates the first end 112 of the pivot support 106d, and the member 102d (with sections 134d and 136d) has a coupler housing section 116k and 119k that accommodates the second end 114 of the same pivot support 106d. The channel 202f of the member 102*d* is represented by the recesses 210*f* and 212*f* of the respective sections 134*d* and 136*d*, which accommodate the first end 112 of the next pivot support 106*b*, and the channel 202*e* of the member 102*c* is represented by the recesses 210*e* and 212*e* of the respective sections 134*c* and 136*c*. FIG. 2F further illustrates the channel 202*d* by the recesses 210*d* and 212*d* of the same respective sections 134*c* and 136*c* that comprise the member 102*c*.

FIGS. 3A to 3H are non-limiting, exemplary illustrations of a device with multi-directional moving members in accordance with another embodiment of the present invention where the movement of the one or more members includes spatial rotations along a combination of principal rotations and at least one member having an added translational motion. The device 100*c* illustrated in FIGS. 3A to 3H includes similar corresponding or equivalent components, interconnections, functional, and or cooperative relationships as the devices that are shown in FIGS. 1A to 2F, and described above. Therefore, for the sake of brevity, clarity, convenience, and to avoid duplication, the general description of FIGS. 3A to 3H will not repeat every corresponding or equivalent component, interconnections, functional, and or cooperative relationships that has already been described above in relation to devices that are shown in FIGS. 1A to 2F.

As illustrated in FIGS. 3A to 3H, the device 100*c* is comprised of members that are associated with one another with pivot axes 104, where one or more members provide a pivot support 106 that allows spatial rotations of a next member along principal rotations (which are rotations around the x, y, and z axes). Further, at least one adjustable pivot support 304 is also provided that allows both rotational and a translational motion of at least one member. As detailed below, the adjustable pivot support 304 is comprised of an adjustable coupler 310 with a first and second ends 112 and 114 secured within a member 102 or a channel 202 of a member 102 or a combination thereof.

Figure 3A:
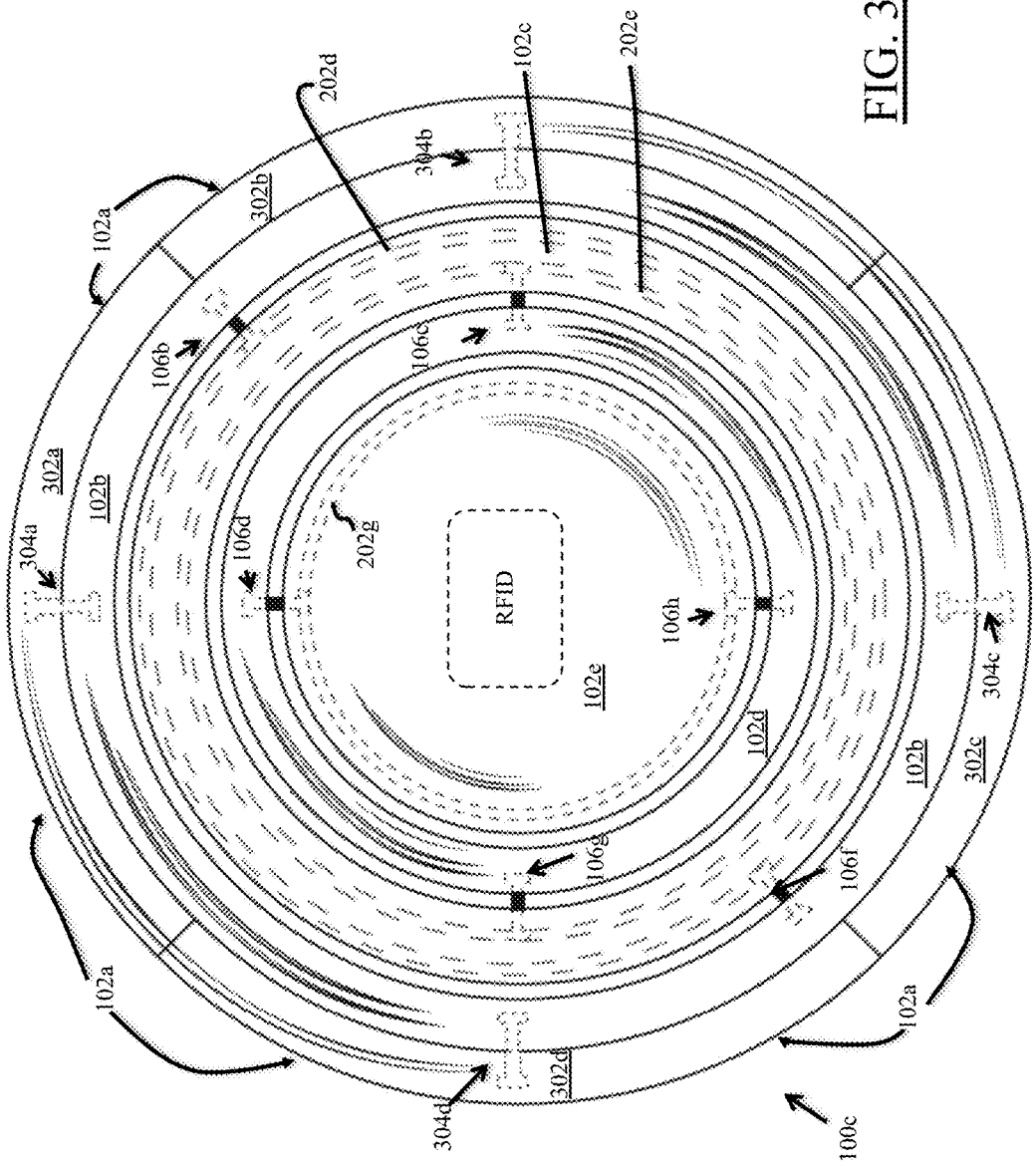
FIGS. 3A to 3H are non-limiting, exemplary illustrations of yet another embodiment of a device in accordance with the present invention.
Figure 3B:
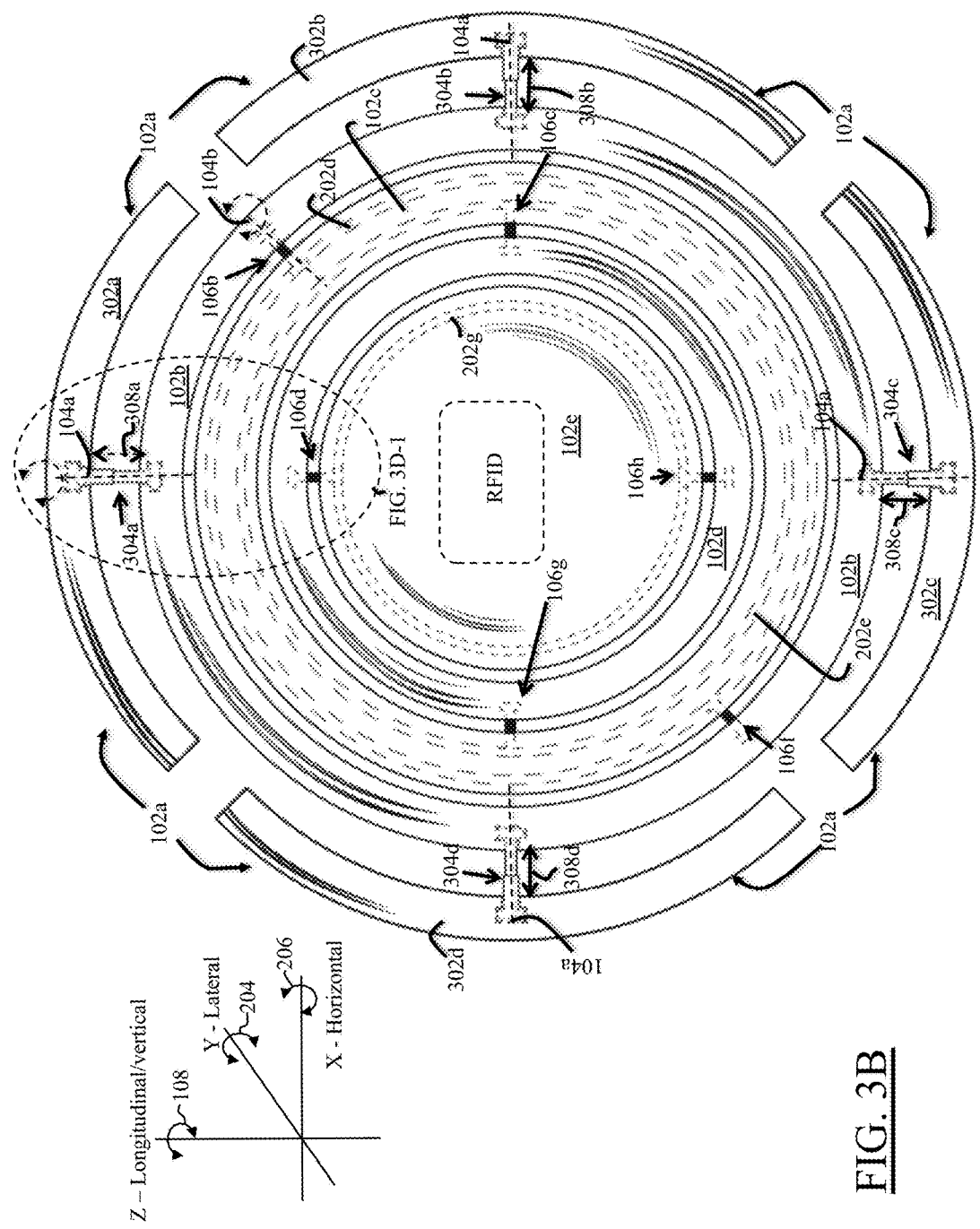
Figures 1, 3C:
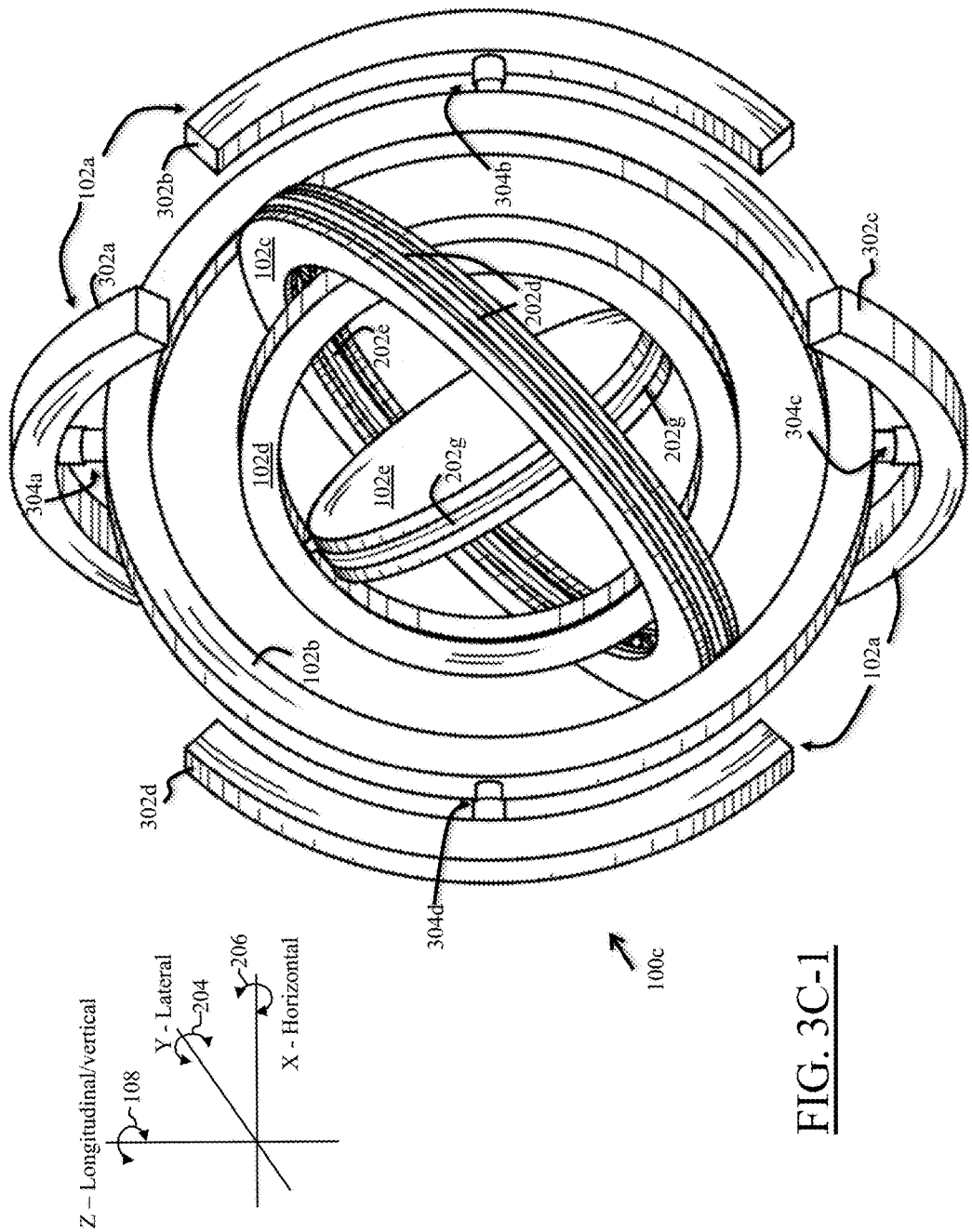
Figures 2, 3C:
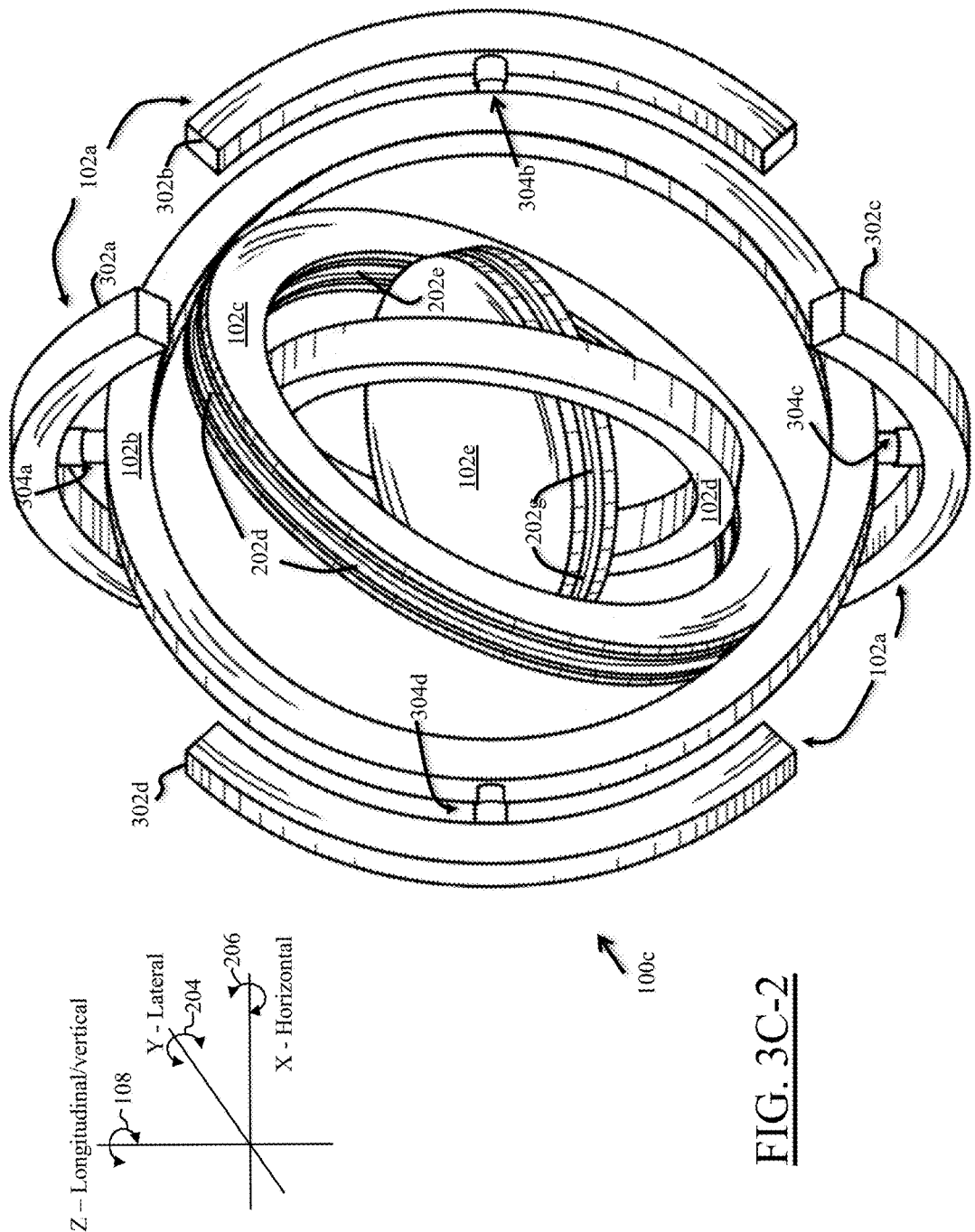
Figures 3, 3C:
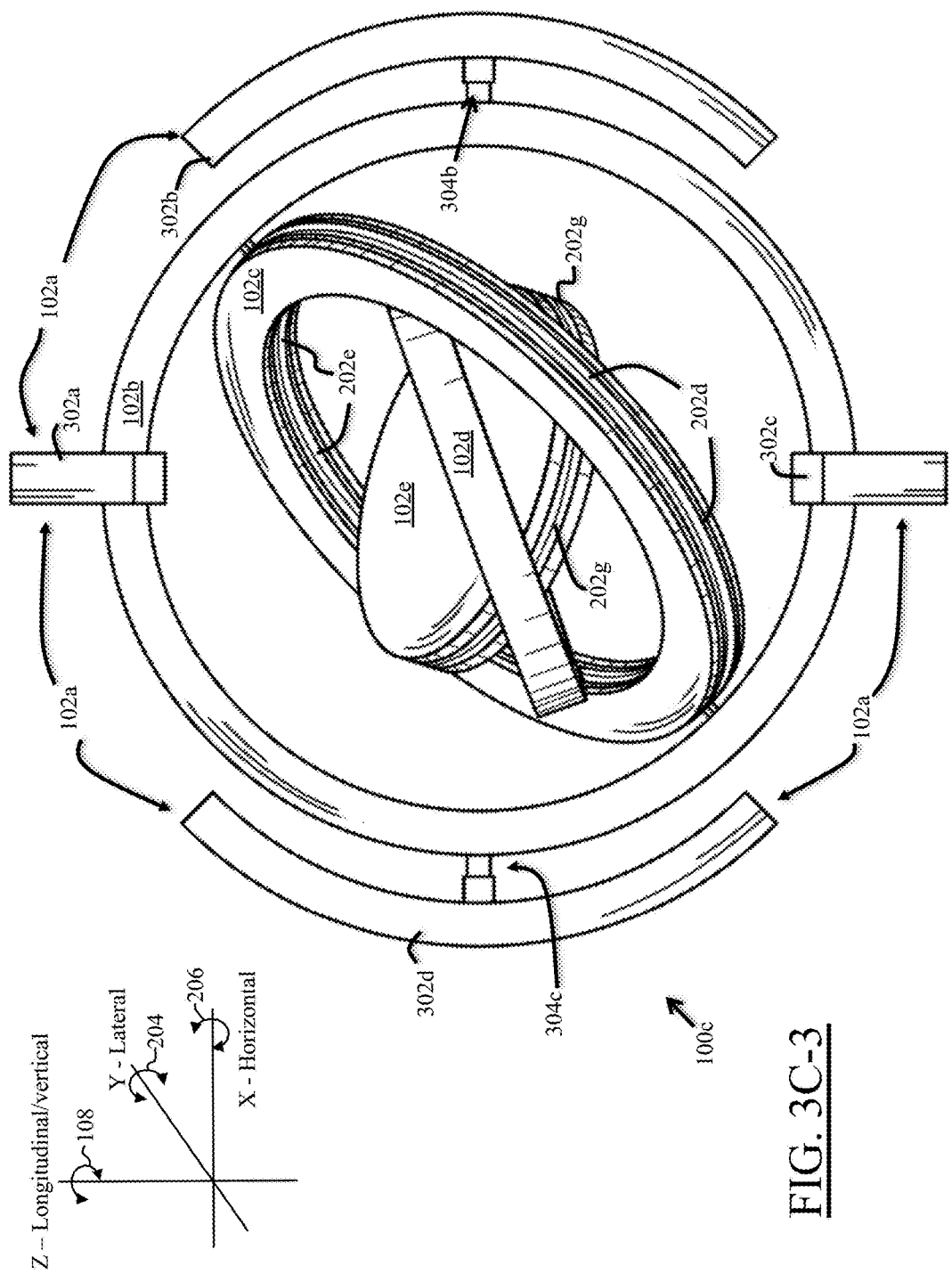
Figures 3, 3C, 4:
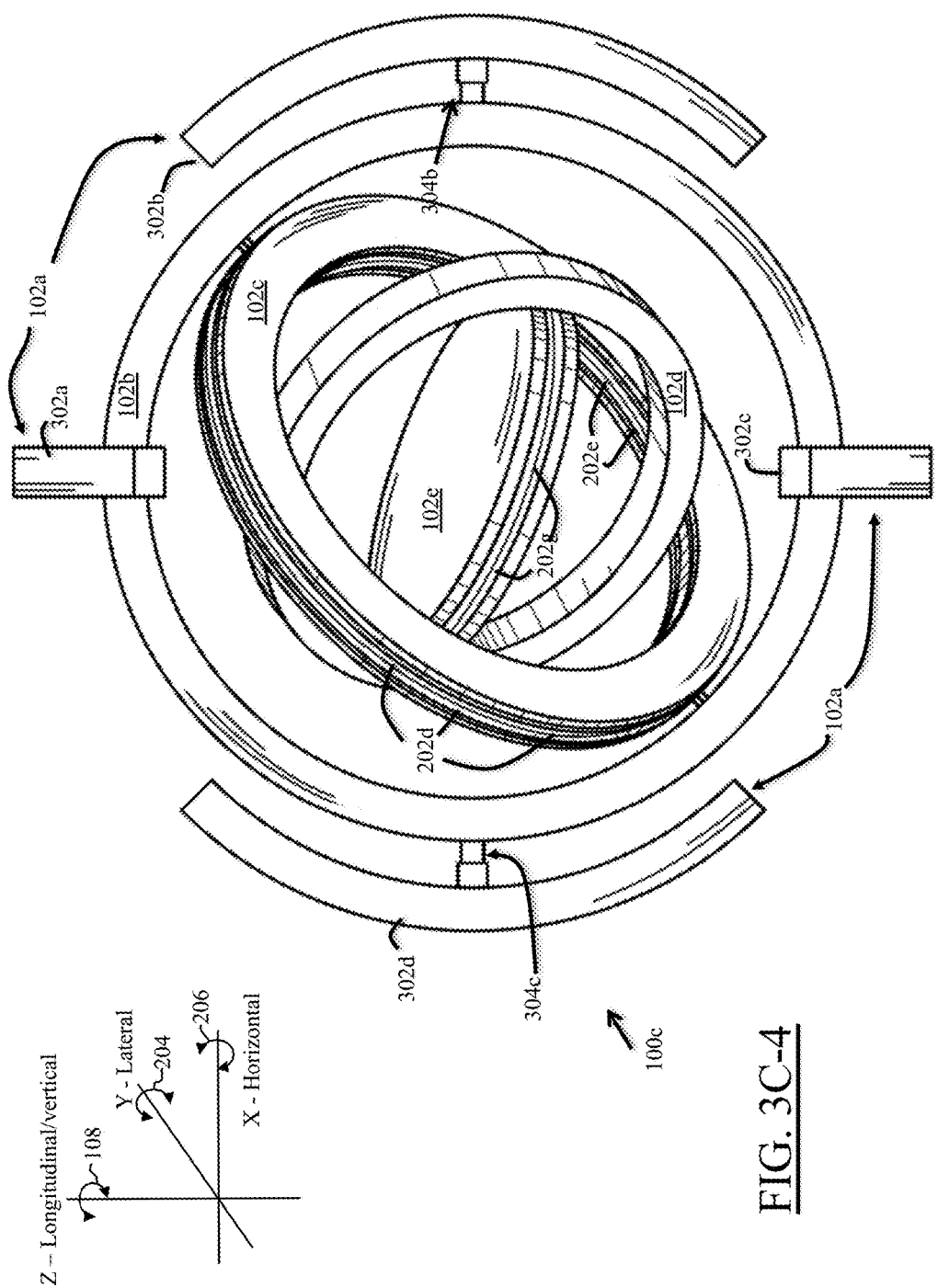
Figures 3, 3C, 4, 5:
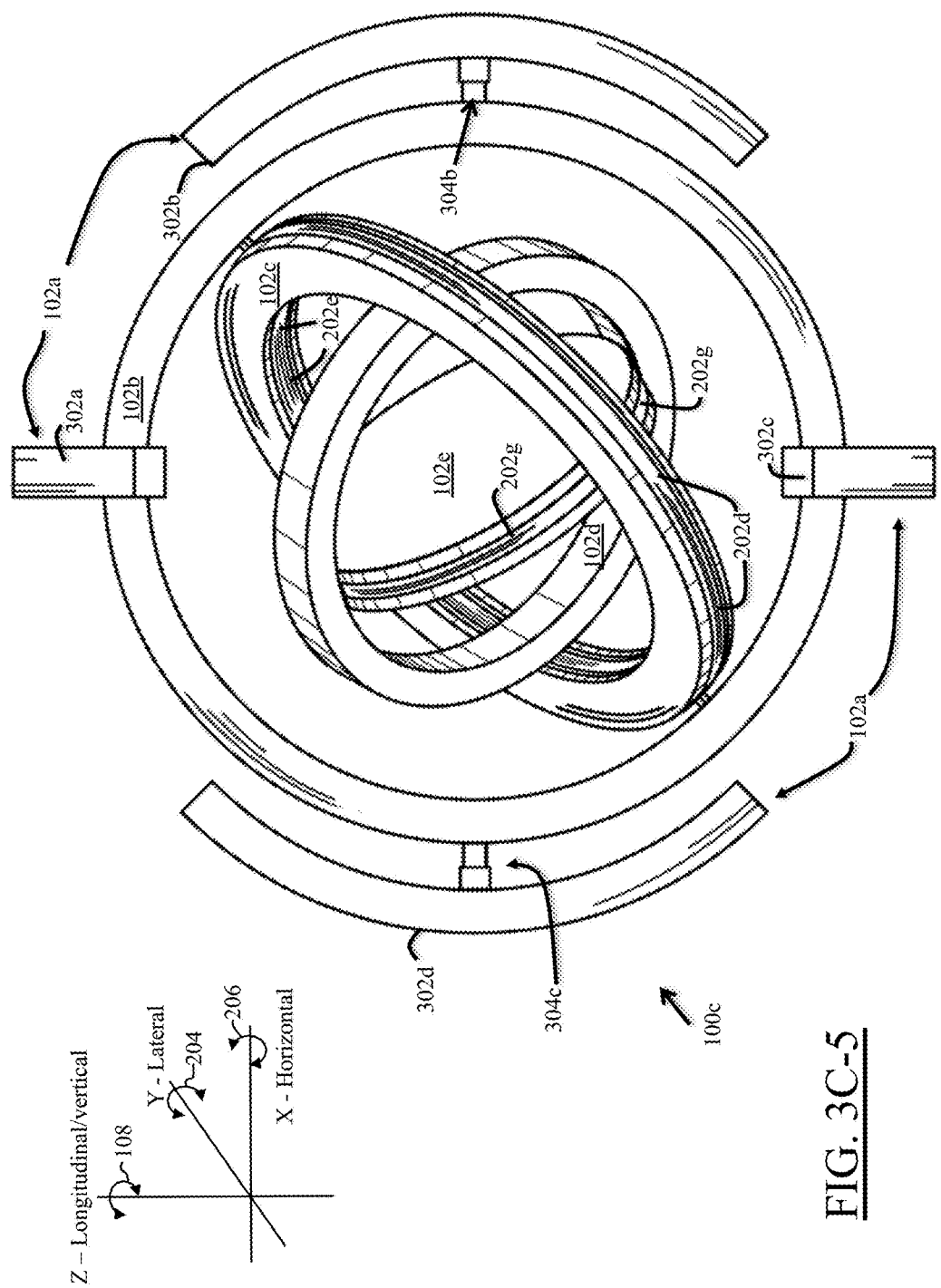
Figures 3, 3C, 4, 5, 6:
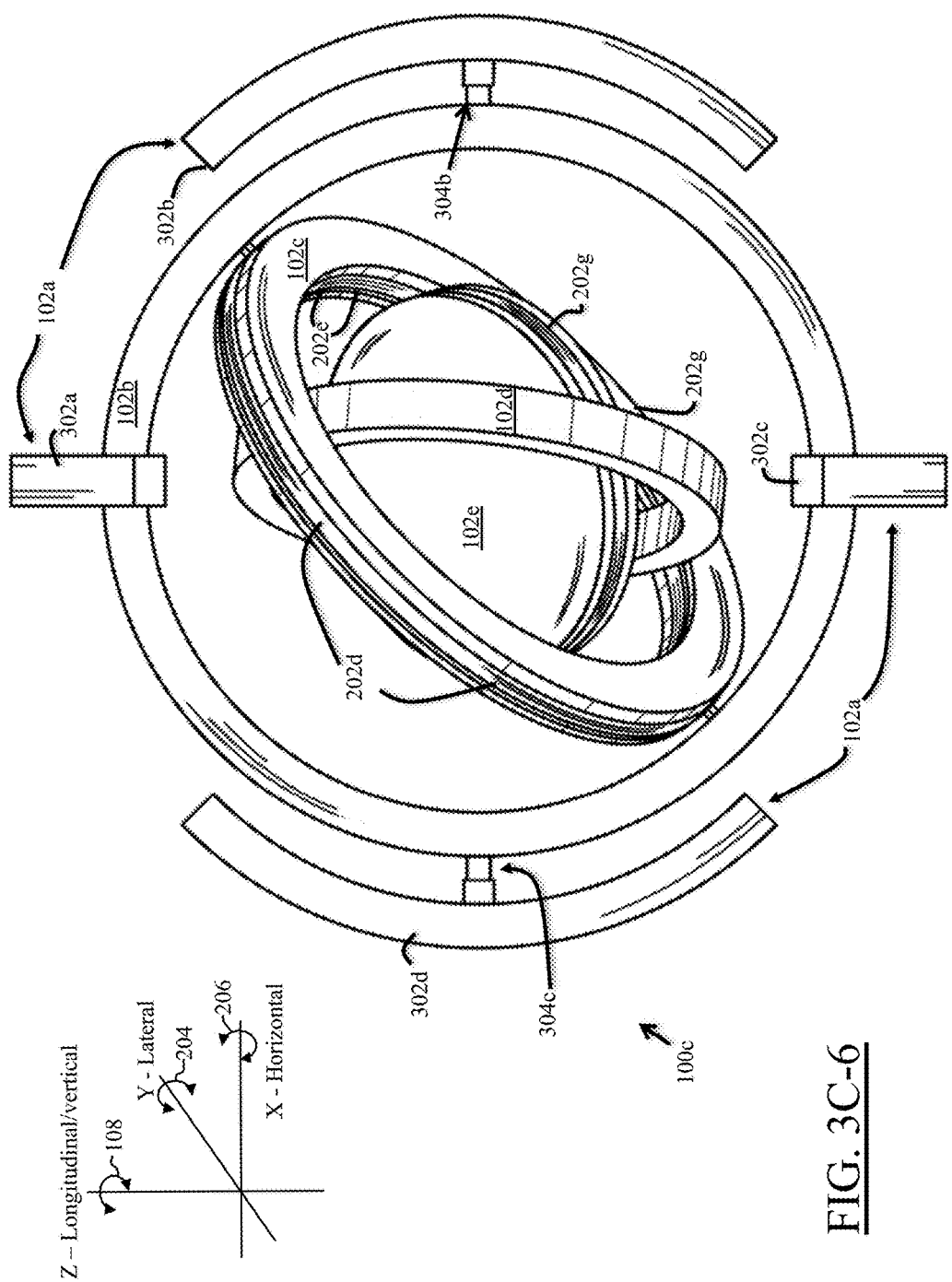

As best illustrated in FIGS. 3A and 3B when viewed together, the adjustable pivot support 304 are capable of extending or contracting along their axis (which is parallel and is the actual pivot axis 104) to expand or collapse along the indicated reciprocating path 308 in order to vary their height. Expansion or collapsing of the adjustable pivot support 304 along path 308 extends or contracts their height to allow for the translational movement of one or more pieces 302 of a member 102. As detailed below, the adjustable pivot support 304 may be spring loaded or telescopic, or may comprise of flexible material such as polymer elastics or other resilient members, etc.

More specifically as illustrated in FIGS. 3A to 3C-6, the non-limiting, exemplary device 100*c* includes one or more members 102 that may comprise of several individual, and separate pieces 302, where a piece 302 of the at least one member 102 independently rotates about an adjustable pivot support 304 along a reciprocating path 108 and also has a translational motion that allows the piece 302 to move toward or away from a next member along the reciprocating path 308. As illustrated, in this non-limiting, exemplary instance, the device 100*c* is comprised of a member 102*a* that is comprised of non-limiting, exemplary four individual pieces 302*a*, 302*b*, 302*c*, and 302*d* that are coupled with a next member 102*b* via respective adjustable pivot support 304*a*, 304*b*, 304*c*, and 304*d*. As indicated above and best illustrated in FIGS. 3A to 3C-6, the adjustable pivot support 304 allow the individual pieces 302 that constitute the member 102*a* to have a translational as well as rotational motions along respective paths 308 and 108.

FIGS. 3A to 3C-6 are non-limiting, exemplary illustrations that randomly show various positions of each member in relation to one another. In the non-limiting, exemplary instances shown in FIGS. 3A to 3C-6, piece 302*a* of the member 102*a* is coupled with the member 102*b* via the adjustable pivot support 304*a* that when expands or contracts, provides translational motion of the piece 302*a* along the reciprocating path 308*a*. Further, the piece 302*a* is also capable of rotating about the pivot axis 104*a* of the adjustable pivot support 304*a* along the path 108*a*.

The piece 302*b* of the member 102*a* is coupled with the member 102*b* via the adjustable pivot support 304*b* that when expands or contracts, provides translational motion of the piece 302*b* along the reciprocating path 308*b*. Further, the piece 302*b* is also capable of rotating about the pivot axis 104*a* of the adjustable pivot support 304*b* along the path 108*a*.

The piece 302*c* of the member 102*a* is coupled with the member 102*b* via the adjustable pivot support 304*c* that when expands or contracts, provides translational motion of the piece 302*c* along the reciprocating path 308*c*. Further, the piece 302*c* is also capable of rotating about the pivot axis 104*a* of the adjustable pivot support 304*c* along the path 108*a*.

The piece 302*d* of the member 102*a* is coupled with the member 102*b* via the adjustable pivot support 304*d* that when expands or contracts, provides translational motion of the piece 302*d* along the reciprocating path 308*d*. Further, the piece 302*d* is also capable of rotating about the pivot axis 104*a* of the adjustable pivot support 304*d* along the path 108*a*.

In addition to sharing the adjustable pivot supports 304 with the member 102*a*, the member 102*b* also provides one or more pivot support 106*b/f* (shared with member 102*c*) that allows independent rotation (along reciprocating path 108*b*) about the pivot axis 104*b* (which may be associated with rotation around the z-axis). Further, due to the channel 202*d* associated with the member 102*c*, the member 102*b* may also rotate along one of the reciprocating paths 204*b* (which may be associate with the rotation around the y-axis, when the z-axis is aligned with the pivot axis 104*b*).

Member 102*c* shares the pivot support 106*b/f* that allows for its independent rotation (along reciprocating path 108*c*) about the pivot axis 104*b* (which may be associated with rotation around the z-axis). Due to the channels 202*d*, the member 102*c* may also rotate along the paths 206*c* (which may be associated with rotation around the x-axis).

Member 102*d* also provides one or more pivot support 106*c/g* that allows independent rotation (along reciprocating path 108*d*) about the pivot axis 104*c* (which may be associated with rotation around the z-axis). Due to the channels 202*e* associated with the member 102*c*, the member 102*d* may also rotate along the paths 206*d* (which may be associated with rotation around the x-axis).

As to the member 102*e*, in this non-limiting, exemplary instance, the member 102*e* also provides one or more pivot support 106*d/h* that allows independent rotation (along reciprocating path 108*e*) about the pivot axis 104*d* (which may be associated with rotation around the z-axis). Further, due to the channel 202*g* associated with the member 102*e*, the member 102*e* may also rotate along the paths 206*e* (which may be associated with rotation around the x-axis). Accordingly, any one of the members 102 may have independent rotations along any one or more principal rotations and or translational motion, depending on channel allocations, types of pivot support used, etc. for a particular member.

Figure 3D:
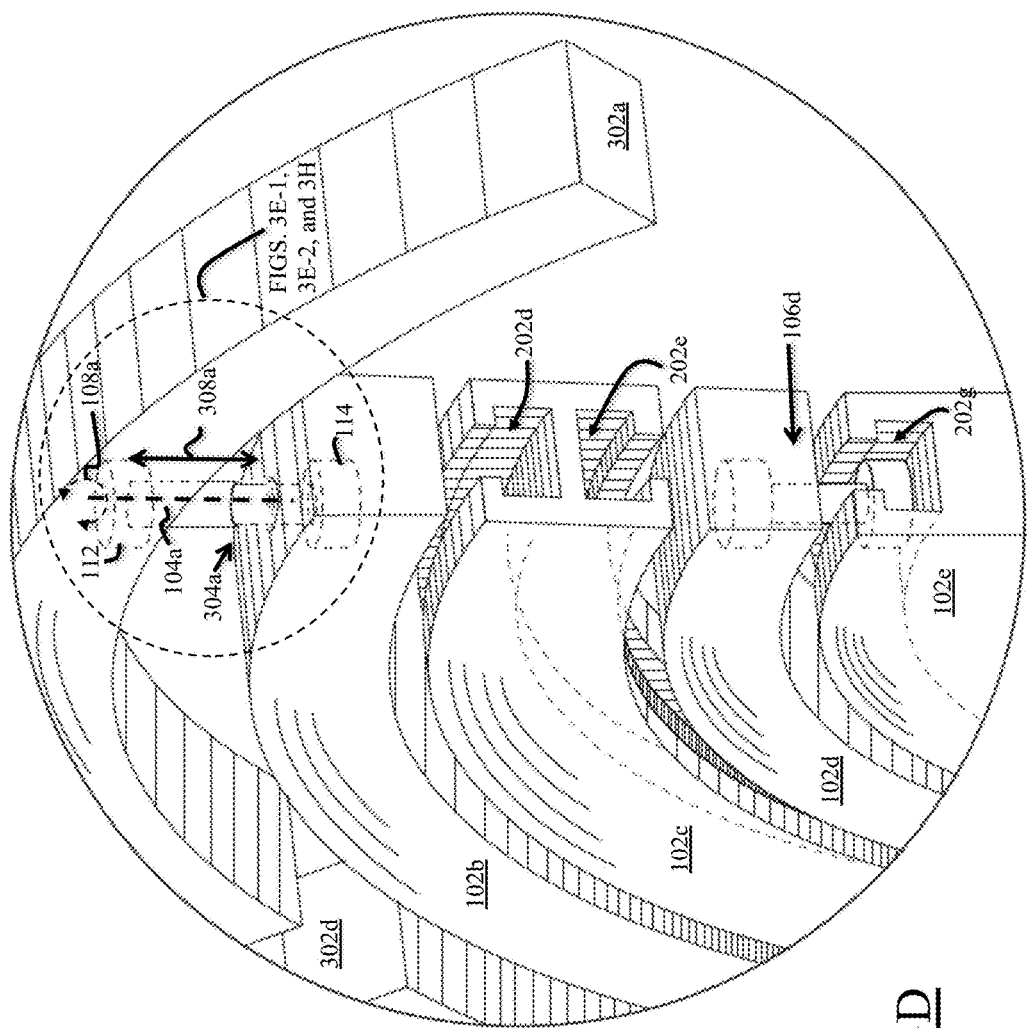
Figures 1, 3E:
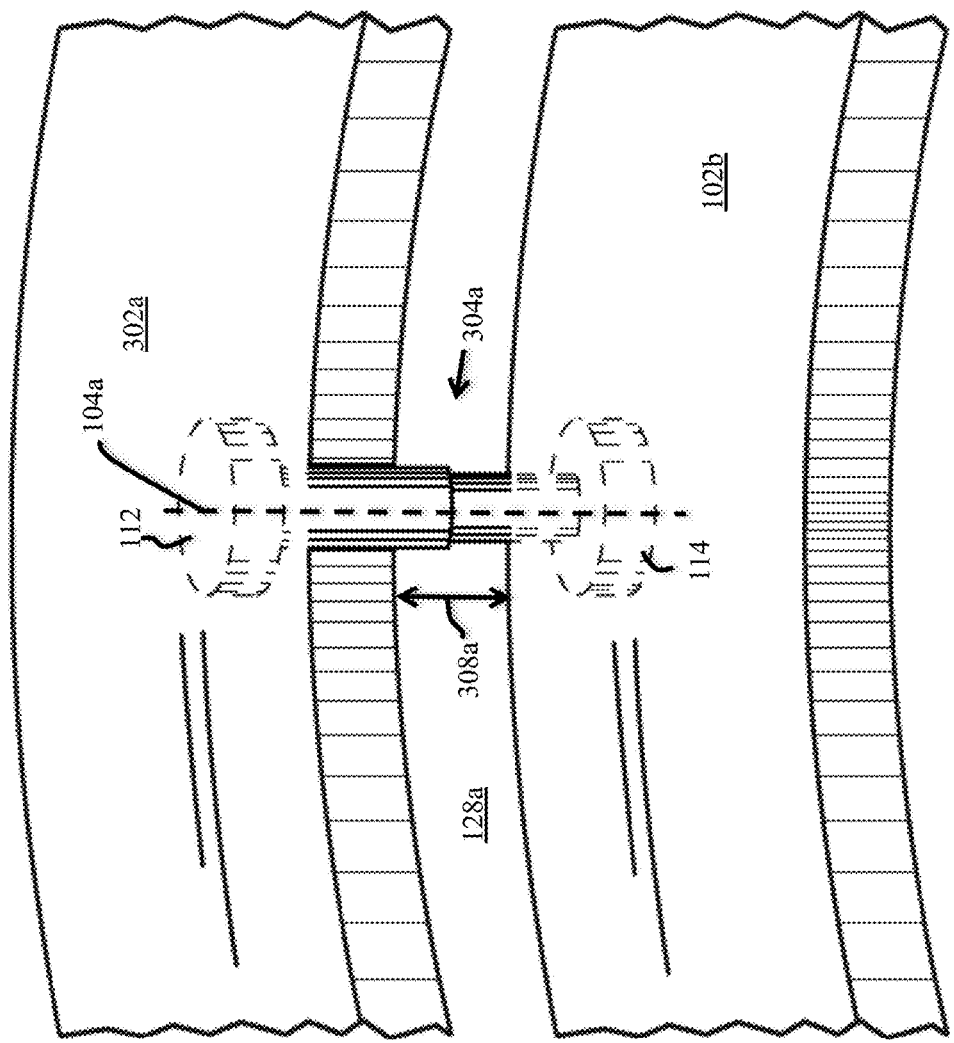
Figures 2, 3E:
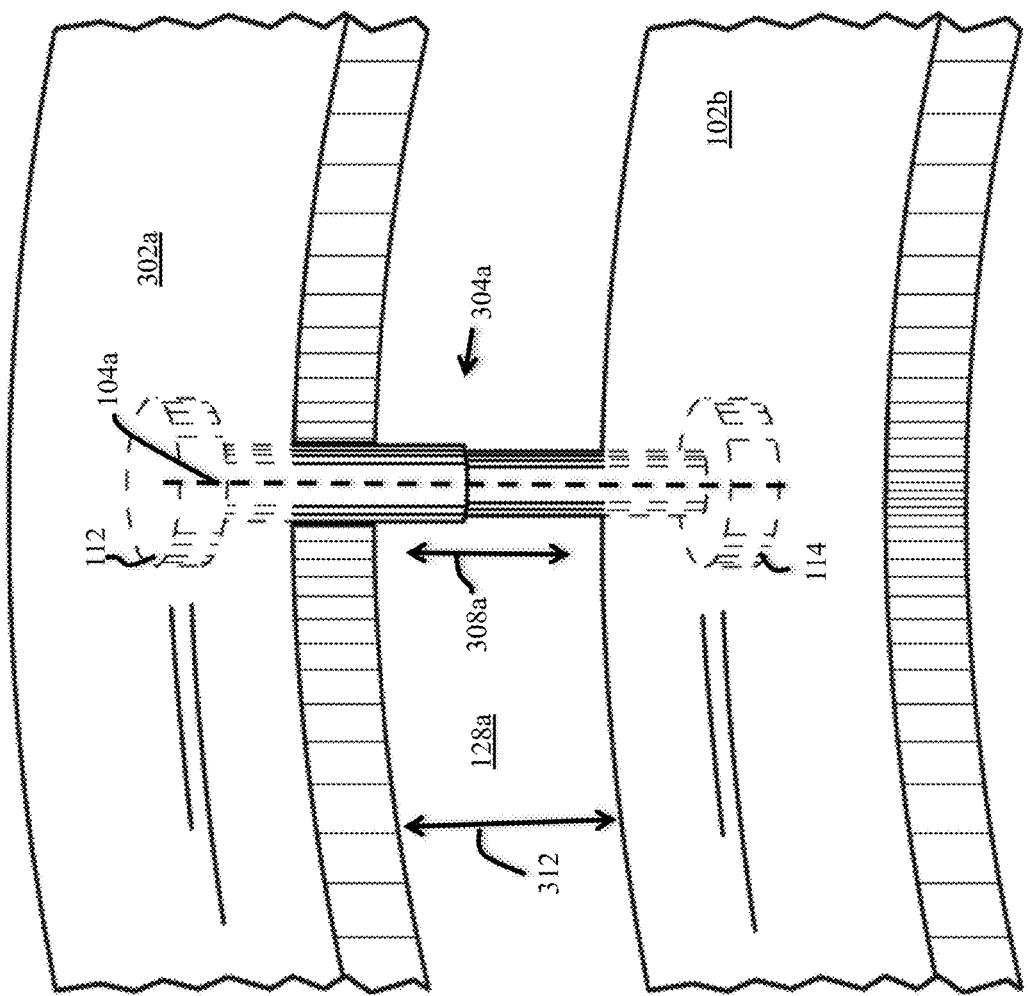

As illustrated in FIG. 3D to 3E-2, the adjustable pivot support 304 has a first and second ends 112 and 114 that are housed within a piece 302 of the member 102a and a next member 102b. The exemplarily illustrated dumbbell configured adjustable couplers 310 need not be limited to the respective first and second ends 112 and 114 having disc like (disc right-cylinder) configurations but may comprise of spherical configurations (FIG. 3F-2), or may comprise of any other configurations with sharp or rounded edges. In fact, if the adjustable pivot supports 304 are not associated with any channels, the ends of the adjustable pivot support 304 may also be configured as couplers 110b illustrated in FIG. 1E. As further illustrated, in general, in a collapsed (non-extended) position shown in FIG. 3E-1, there is naturally a gap 128 between the piece 302 and a next member 102b, which may allow for pivoting of the piece 302 around the pivot axis 104 (e.g., around z-axis) even if the adjustable pivot support 304 is not fully extended. As best illustrated in FIG. 3E-2, in an extended position, the span of the same gap 128 between the piece 302 and a next member 102b expands by length or height 312 in the translational direction 308, providing both a translational as well as rotational motion for the piece 302.

Figures 1, 1F, 2, 3, 4:
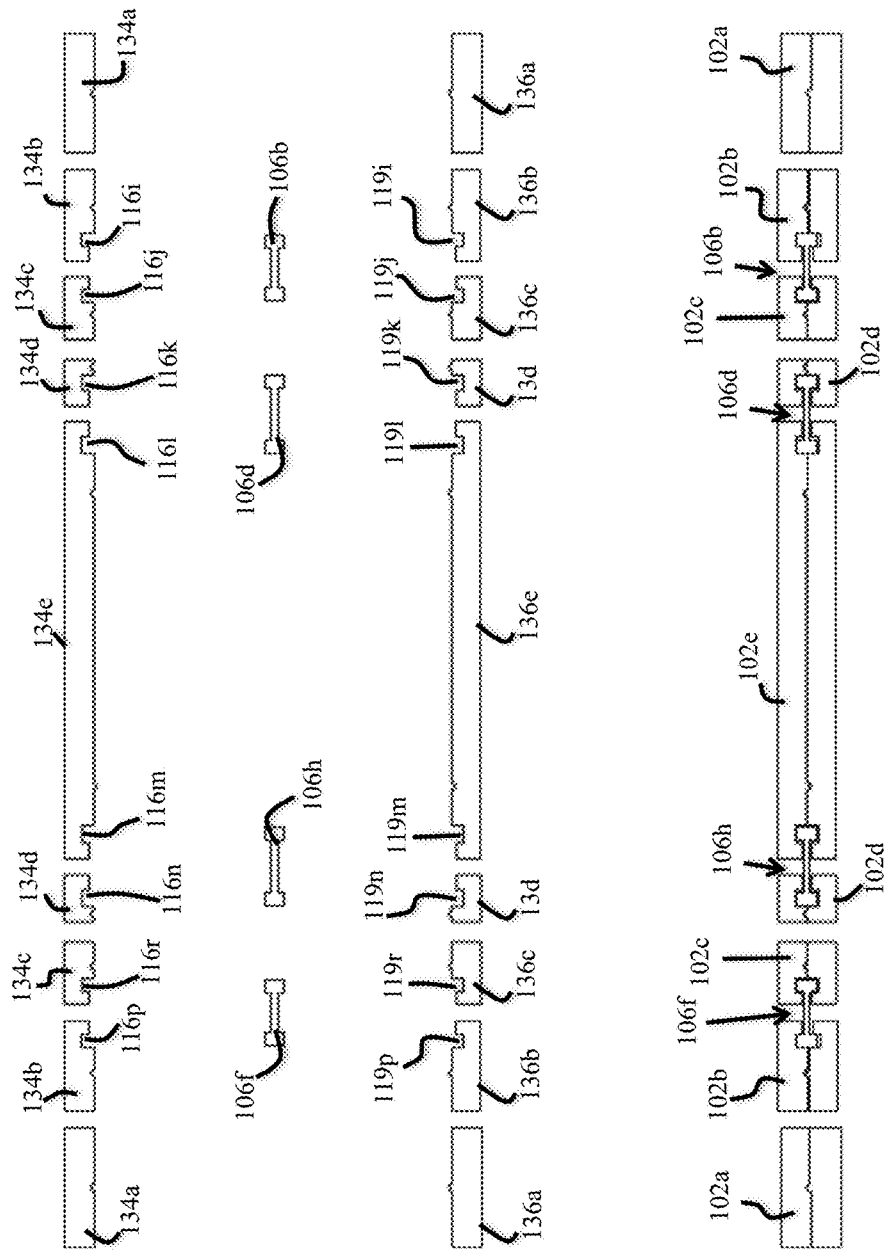

FIGS. 3F-1 to 3F-3 are non-limiting, exemplary detailed illustrations of adjustable pivot supports 304 in accordance with the present invention. As illustrated in FIGS. 3F-1 to 3F-3, the adjustable pivot support 304 in a non-limiting exemplary form of an adjustable coupler 310 is comprised of a first end 112 and a second end 114 that are coupled with an extendable and retractable mid-section 328. In the case of the illustrated adjustable coupler 310a shown in FIG. 3F-1, the first and the second ends 112 and 114 are configured as right-cylindrical disc, and the adjustable coupler 310b shown in FIG. 3F-2 has its first and second ends 112 and 114 as spherical.

As illustrated in FIGS. 3F-1 and 3F-2, the extendable and retractable mid-section 328 of the adjustable coupler 310 is comprised of a plurality of modules 314a, 314b, and 314c that dispose telescopically. Although only two and three modules are illustrated in the respective FIGS. 3F-1 and 3F-2 that constitute a single telescopically extendable and retractable mid-section 328, it should be understood that any number of additional modules (middle modules such as the illustrated module 314c in FIG. 3F-2) may be used, depending on the length or height 312 of the mid-section 328 desired when the adjustable coupler 310 is fully extended.

As illustrated, first end module 314a is exemplarily configured as substantially cylindrical with an open end 336. The module 314a includes a first distal end that is coupled with the first end 112 of the adjustable coupler 110, an intermediate section (or body) that defines the height 318 of the module 314a, and a second distal open end 336 that telescopically receives the next, subsequent module 314. In general, the module 314a has a diameter that is wider than the diameter of the next, subsequent module 314, which enables the module 314a to slide-ably receive the next, subsequent module 314 in a telescopic fashion.

In general, any other next, subsequent modules 314 are constructed similarly to the module 314a, but with reduced diameters. Thus, the next, subsequent modules 314c is also cylindrical in shape, has a second distal open end 338, telescopically receives the next, subsequent module 314b via the second distal open end 338, and itself (i.e., module 314c) is telescopically received within module 314a. More specifically, the module 314c has a diameter that is less than the diameter of the module 314a, but larger than the diameter of the next, subsequent module 314b and therefore, the module 314b is telescopically received within module 314c via the opening 338 when the mid-section 328 of the adjustable coupler 310 is contracted. The distal end 340 of the module 314c may optionally be open or a closed end since no other module is passed through the distal end 340.

The entire mid-section 328 of the adjustable coupler 310 can collapse so that all of the next, subsequent modules 314 with smaller diameters are received within preceding modules with larger diameters, with all being received within the first end module 314a with the largest diameter.

As illustrated in FIGS. 3F-1 and 3F-2, the first end module 314a and the second end module 314b have respective first distal ends that are coupled with the respective first and second end 112 and 114 of the adjustable coupler 110. The second end module 314b has a second distal end 342 that may or may not be comprised of an opening since no other module is slideably inserted or received within the second end module 314b.

As best illustrated in FIG. 3F-3, at least one section of the body (preferably a distal end) of the modules 314 is comprised of interlocking mechanisms for maintaining the plurality of modules in an extended position. In the case of the first and the second end modules 314a and 314b, only a single interlock mechanism per module is provided at their respective second distal ends. It should be noted that the interlock mechanism may be provided along any section of the body of any of the modules 314. The greater the distance between the interlocking mechanisms of one module and the next, subsequent module, the greater the span height 312 of the gap 128 between the member 102a and the next member 102b when the piece 302 of the member 102a move in the translational motion in the reciprocating path 308. Therefore, it would be preferable if the interlocking mechanisms were optionally positioned at the distal ends of the modules.

The interlock mechanism is comprised of a set of complementary interlocking elements with a first interlocking element associated with a module and a second complementary interlocking element associated with a next module that when brought together (as a result of extending the adjustable coupler 310), the first and the second interlocking elements interlock to maintain the adjustable coupler 310 in an extended position. A non-limiting example of a set of complementary interlocking elements is a formed protuberance 244 associated with a module (e.g., 314c) that snaps into and interlocks with a complementary formed groove 246 of a next module (e.g., 314a). The protuberance 244 and the groove 246 are configured to be continuous along the circumference of their respective modules, which allows the piece 302 to also pivot around the pivot axis 104 without unlocking of the interlocking mechanism. It should be noted that instead of the use of interlocking members to maintain the couplers in an extended position, the illustrated couplers may be maintained in the extended position frictionally if the cross-section (e.g., diameter) of one module is larger than the cross-section of a next module.

Figures 1, 3G:
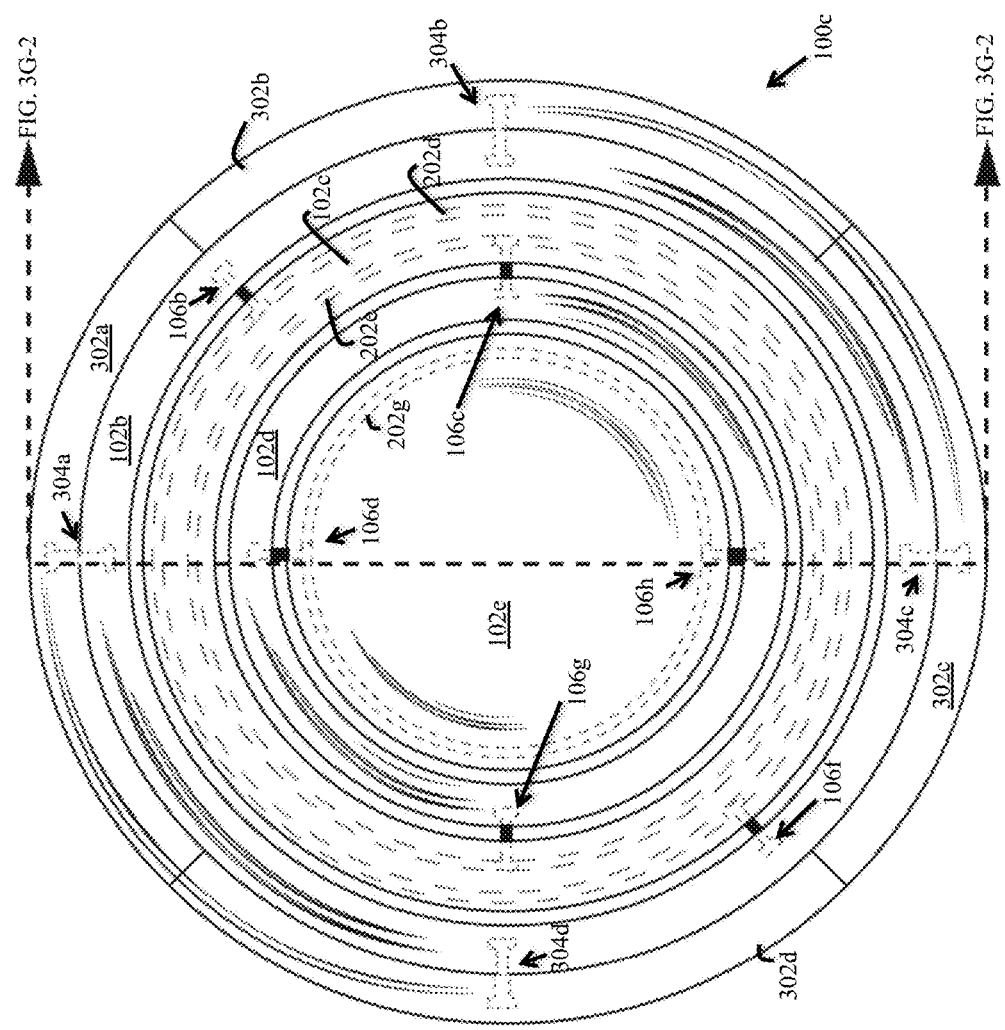
Figures 3, 3G:
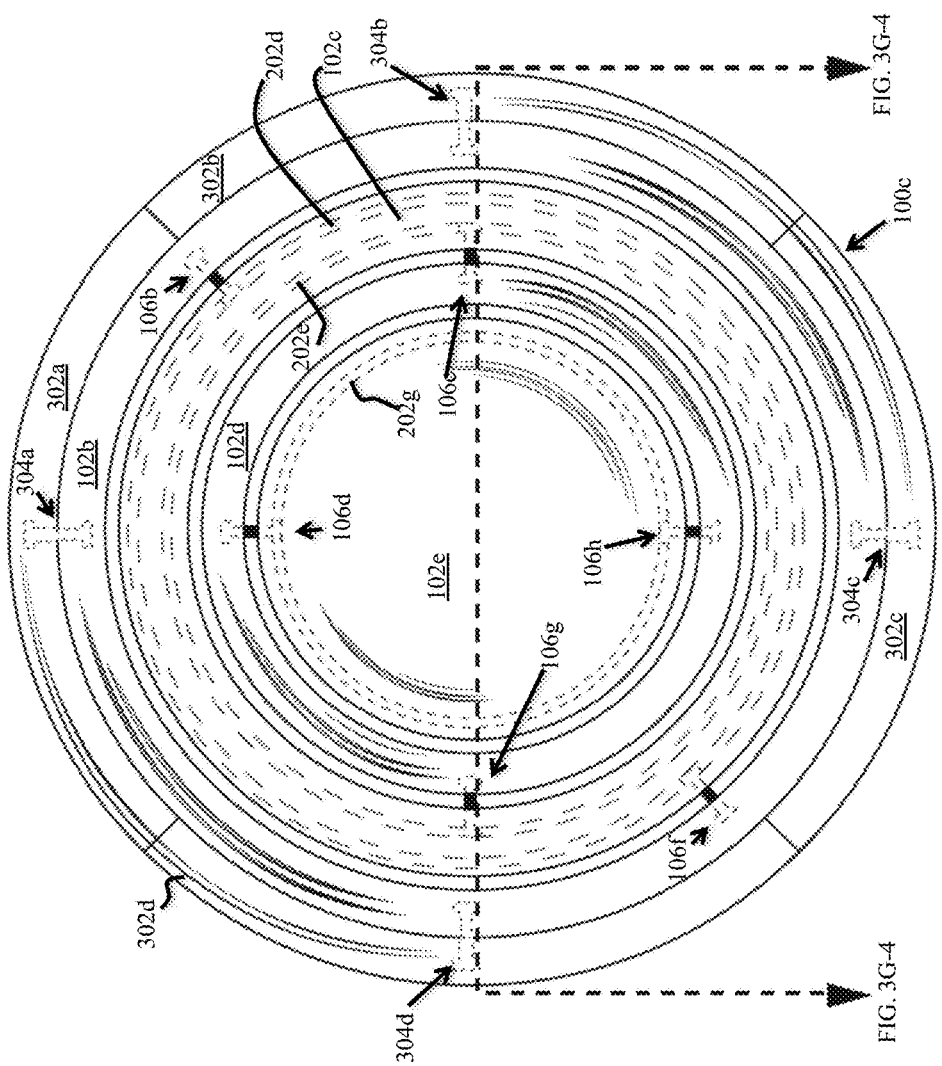
Figures 3, 3G, 4:
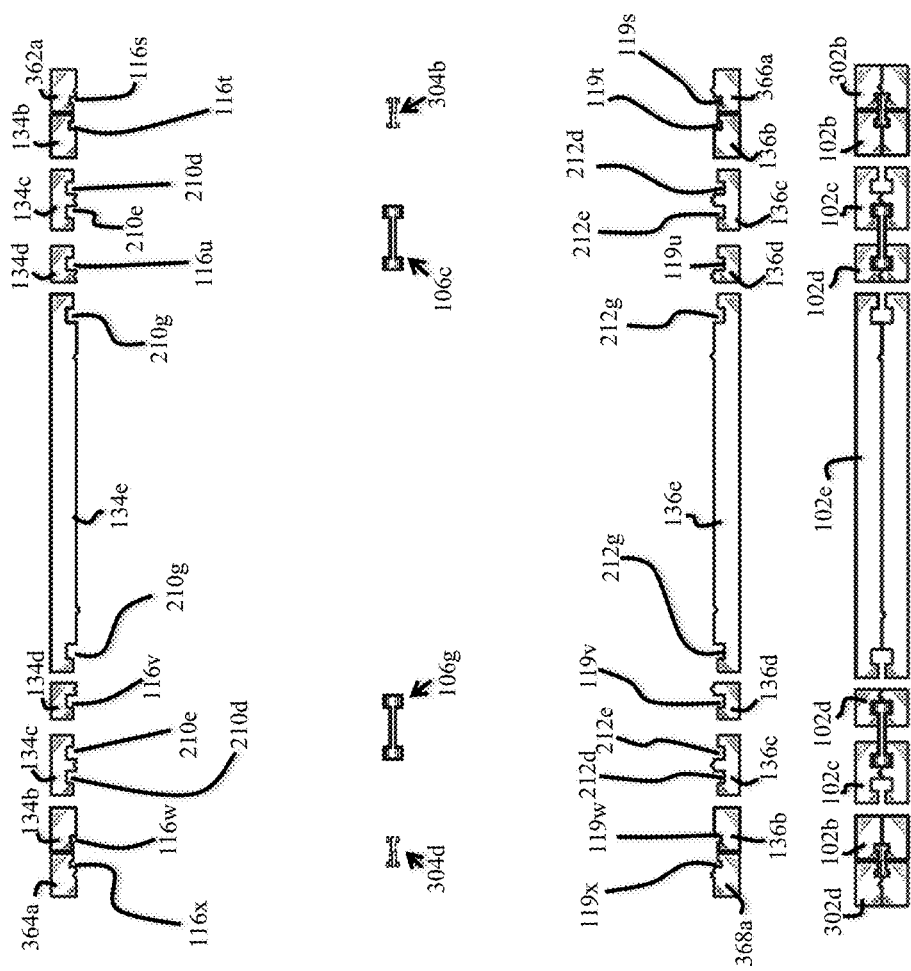
Figures 3, 3G, 4, 5:
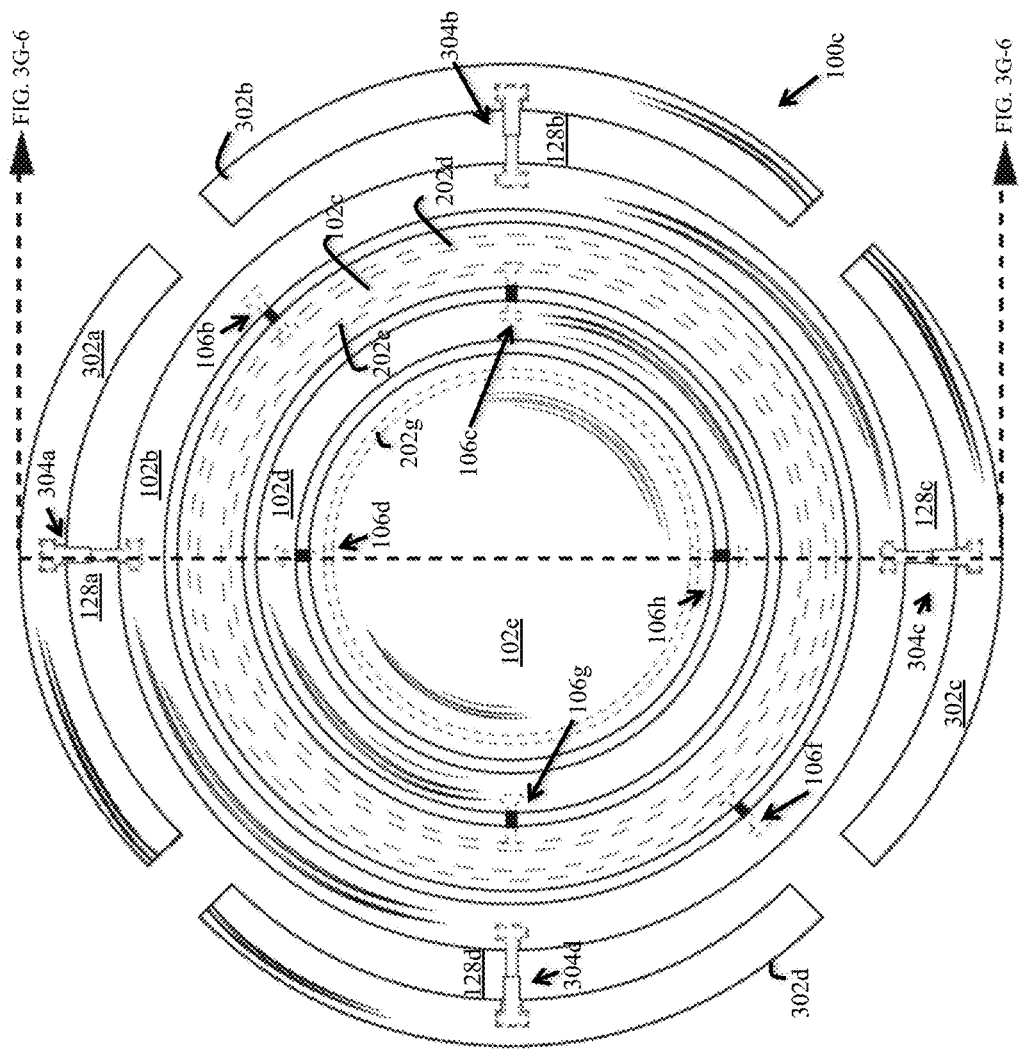
Figures 3, 3G, 4, 5, 6:
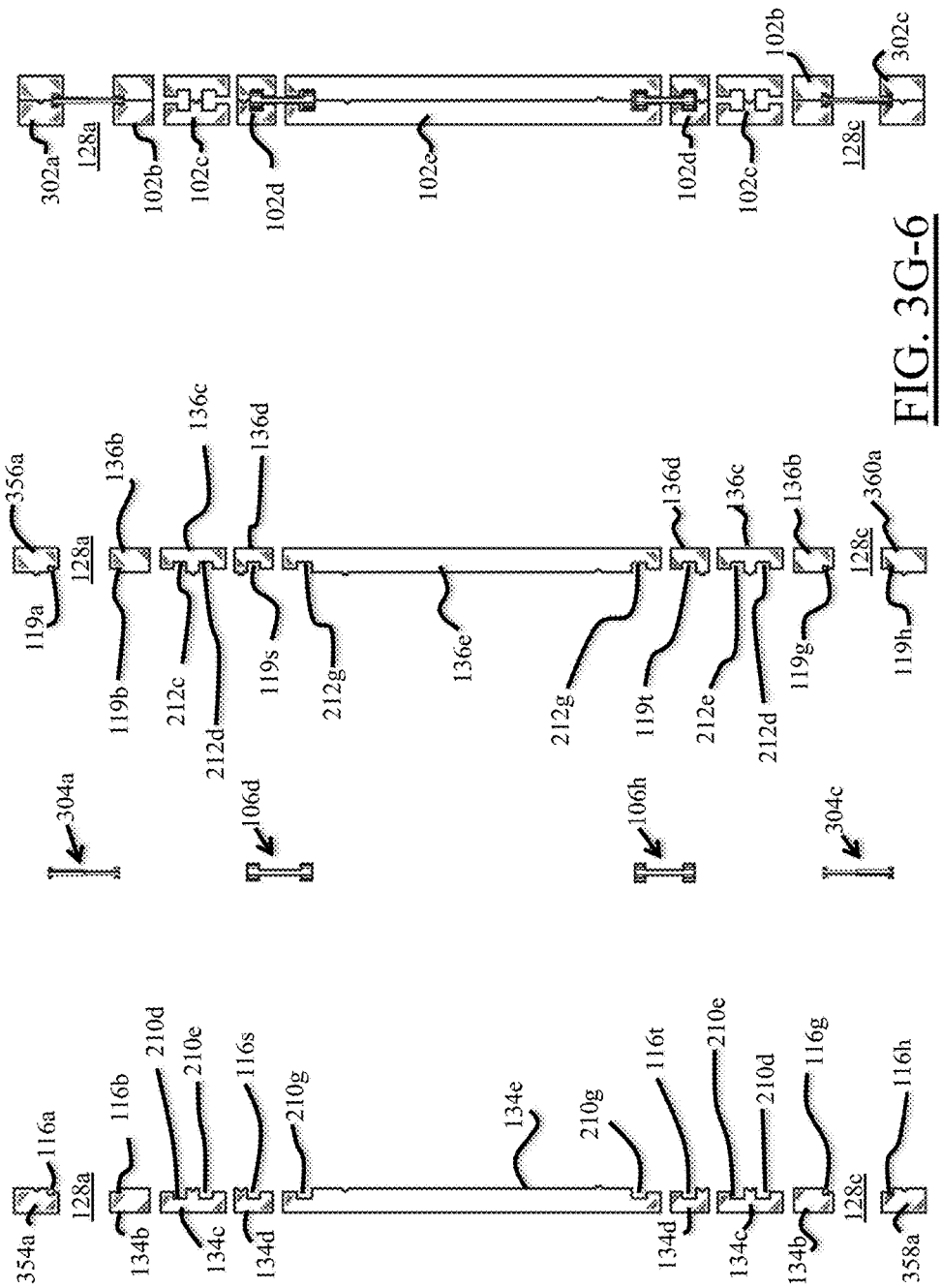
Figures 3, 3G, 4, 5, 6, 7:
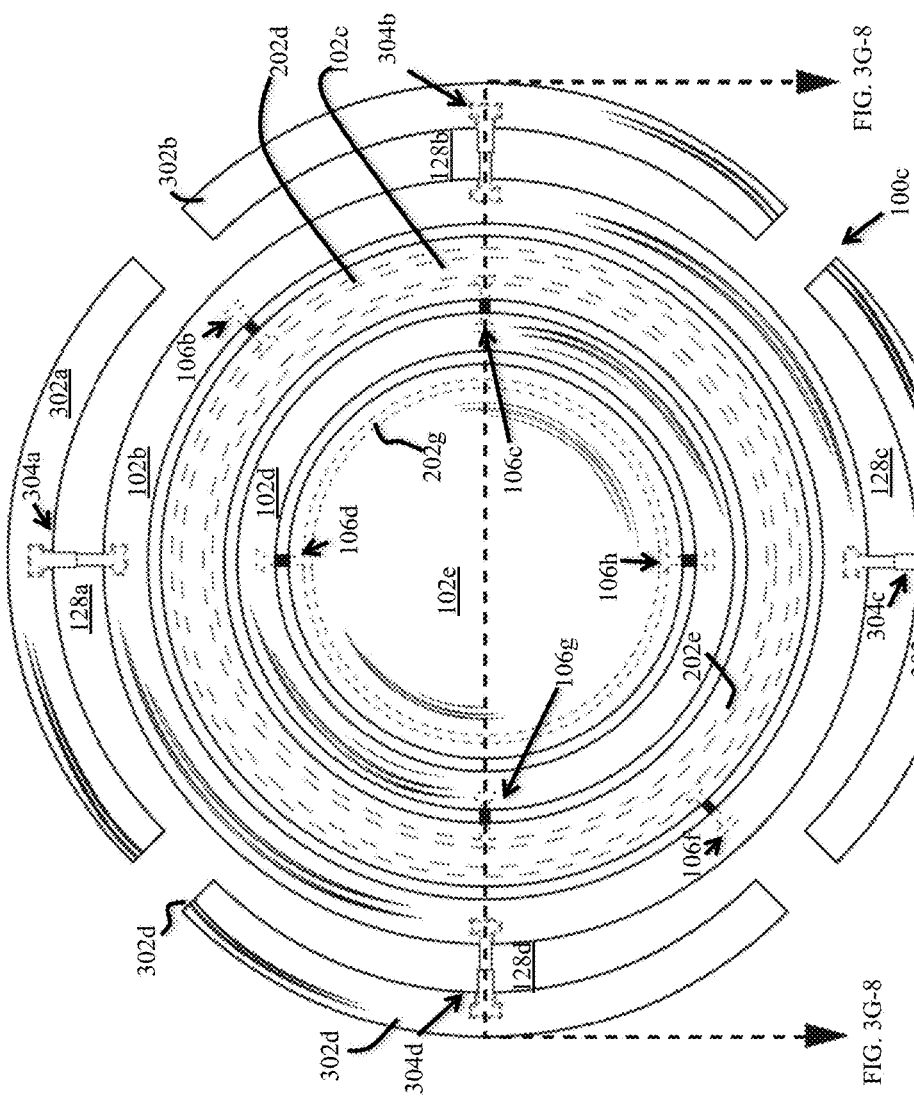
Figures 3, 3G, 4, 5, 6, 7, 8:
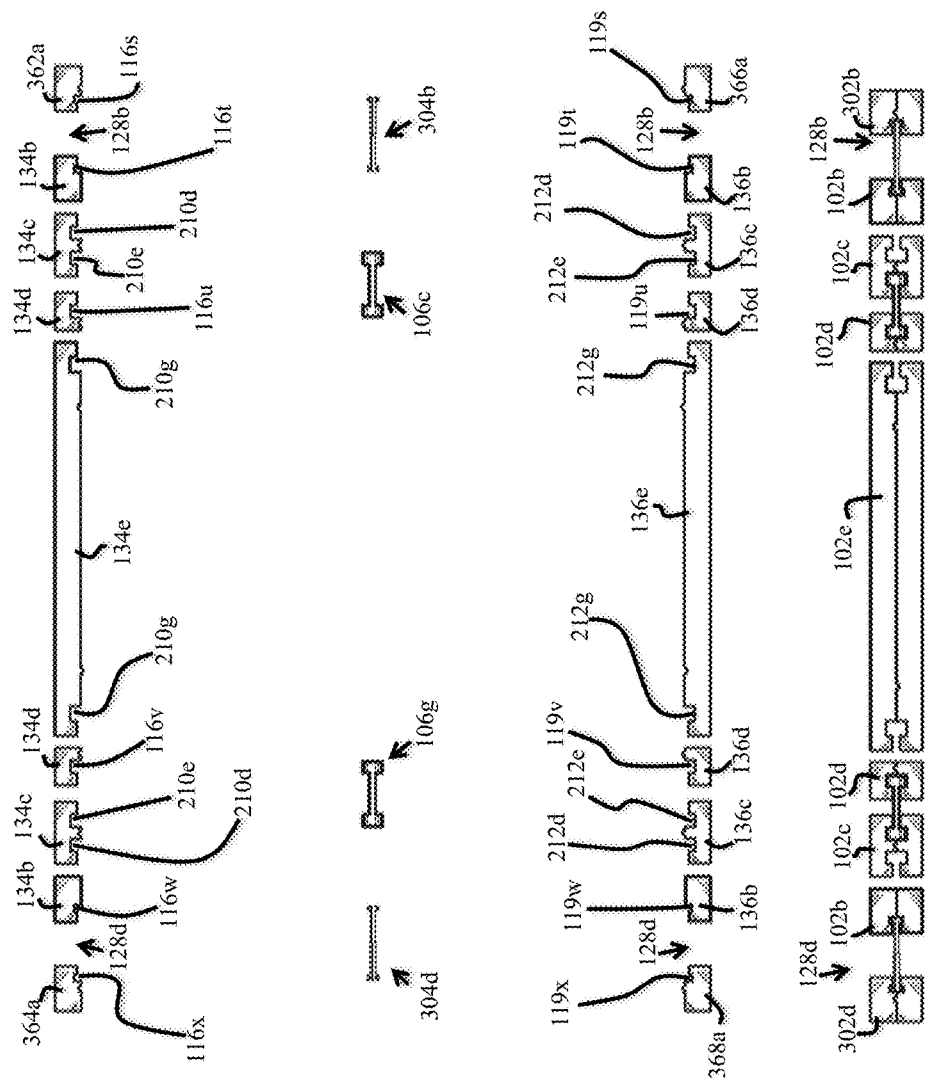
Figure 3H:
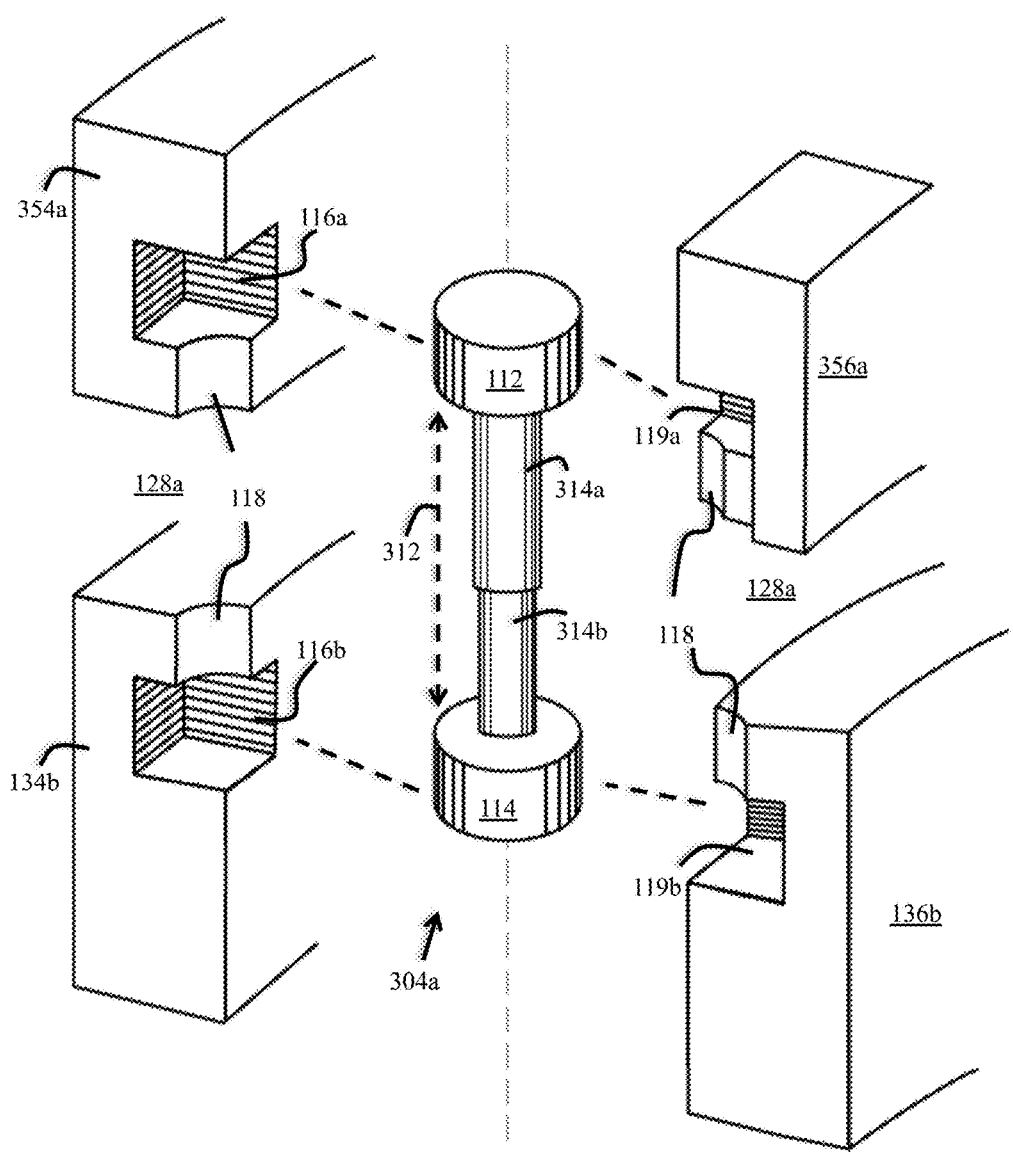

FIGS. 3G-1 to 3G-8 are non-limiting, exemplary illustrations of plan and sectional views of the device 100c illustrated in FIGS. 3A to 3H, with FIGS. 3G-1 to 3G-4 illustrating the device (plan and sectional views) with one or more members at a closed (or collapsed) position with no translational motion and FIGS. 3G-5 to 3G-8 showing the device (plan and sectional views) with one or more members at an open (or expanded) position with translational motion. As illustrated in FIGS. 3G-1 to 3H, each member 102 of the device 100c is comprised of two sections; this also includes the pieces 302 of the member 102a, which are also comprised of two sections.

As illustrated in FIGS. 3G-1 and 3G-2, the piece 302*a* is comprised of sections 354*a* and 356*a*, and the piece 302*c* is comprised of the sections 358*a* and 360*a*. As illustrate, the distal ends of the adjustable pivot support 304*a* is housed within the recesses 116*a/b* and 119*a/b* of the respective sections 354*a*/134*b* and 356*a*/136*b*. As further illustrate, the distal ends of the adjustable pivot support 304*c* is housed within the recesses 116*g/h* and 119*g/h* of the respective sections 358*a*/134*b* and 360*a*/136*b*. The member 102*e* in this non-limiting exemplary illustration includes the recesses 210*g* and 212*g* that are formed on the respective sections 134*e* and 136*e*, which form the channel 202*g*.

As illustrated in FIGS. 3G-3 and 3G-4, the piece 302*b* is comprised of sections 362*a* and 366*a*, and the piece 302*d* is comprised of the sections 364*a* and 368*a*. As illustrate, the distal ends of the adjustable pivot support 304*b* is housed within the recesses 116*s/t* and 119*s/t* of the respective sections 362*a*/134*b* and 366*a*/136*b*. As further illustrate, the distal ends of the adjustable pivot support 304*d* is housed within the recesses 116*w/x* and 119*w/x* of the respective sections 364*a*/134*b* and 368*a*/136*b*. The member 102*e* in this non-limiting exemplary illustration includes the recesses 210*g* and 212*g* that are formed on the respective sections 134*e* and 136*e*, which form the channel 202*g*. FIGS. 3G-5 to 3G-8 are the same views as the FIGS. 3G-1 to 3G-4 with the exception that the pieces 302 of the member 102*a* are expanded, showing the gap 128.

As illustrated in FIGS. 3G-1 to 3H, each piece 302 of the member 102*a* of the device 100*c* is comprised of two sections that are connected together to form a single piece 302, with the interior (or connecting) facing side of each section of the single piece 302 comprised of various recesses 116, 119 that form the interlocking housing that accommodate and secure the various adjustable pivot axis couplers 304. As stated above, non-limiting, exemplary connection methods for the sections to form a single piece 302 of the member 102*a* may include the use of adhesives, ultrasonically welding of the two sections, or others.

FIGS. 4A to 4D are non-limiting, exemplary illustrations of a device with multi-directional moving members in accordance with another embodiment of the present invention where the movement of the one or more members includes spatial rotations along a combination of principal rotations, at least one member having an added translational motion, and at least one member having an added motion that moves one or more members out of the inner alignment plane to a position next to an outer boundary of another one or more members. The device 100*d* illustrated in FIGS. 4A to 4D includes similar corresponding or equivalent components, interconnections, functional, and or cooperative relationships as the devices that are shown in FIGS. 1A to 3H, and described above. Therefore, for the sake of brevity, clarity, convenience, and to avoid duplication, the general description of FIGS. 4A to 4D will not repeat every corresponding or equivalent component, interconnections, functional, and or cooperative relationships that has already been described above in relation to devices that are shown in FIGS. 1A to 3H.

As illustrated in FIGS. 4A to 4D, the device 100*d* is comprised of members that are associated with one another with pivot axes, where one or more members provide a pivot support 106 that allows spatial rotations of a next member along principal rotations (which are rotations around the x, y, and z axes). Additionally, the pivot support 106 further provides added motion that moves out of the inner alignment plane a member to a position next to an outer boundary of another member. Further more, at least one adjustable pivot support 304 is also provided that allows both rotational and a translational motion of at least one member. It should be noted that in this embodiment, some of the pivot supports 106 are illustrated as having a first end 112 that is a flat disc-like structure and a second end 114 that is spherical, and others that have both ends as spherical. Further, in this embodiment, the adjustable pivot supports 304 have ends 112 and 114 that are similar to the ends of the pins illustrated in FIG. 1F. As indicated above, any combinations of pivot supports (adjustable or otherwise), including any combinations of various configurations of pivot support end shapes may be used for any of the embodiments illustrated and described throughout the disclosure.

As illustrated in FIGS. 4A to 4D, the non-limiting, exemplary device 100*d* includes one or more members 102 that may comprise of several individual, and separate pieces 402 that have channels 202. It should be noted that the channeled pieces 402 are similar to the above-described non-channeled pieces 302 except that the channeled pieces 402 include channels 202 and therefore, any one or more pieces 302 may be replaced with pieces 402 or vice versa in any of the embodiments disclosed throughout, depending on the need for a channel 202 for a piece of a member.

As illustrated in FIGS. 4A to 4D, each of the members 102*c*, 102*d*, and 102*e* are comprised of respective channeled pieces 402 that are coupled with one another through a corresponding number of rotating bridge couplers (or "cuffs") 414 (detailed below). In general, the cuffs 414 are positioned and housed between adjacent pieces of the same member, and can pivot (from 0° to 360° degrees) around their central longitudinal axis.

In this non-limiting, exemplary instance, the device 100*d* has a member 102*c* that is comprised of non-limiting, exemplary three individual channeled pieces 402*a*, 402*b*, and 402*c* that are coupled with one another by cuffs 414*b*, 414*c*, and 414*d*. In particular, the channeled piece 402*a* is coupled with channeled piece 402*b* by cuff 414*b* that is inserted into the channels 202*h* and 202*i* of the respective channeled pieces 402*a* and 402*b*. The channeled piece 402*a* is further coupled with the channeled piece 402*c* by cuff 414*d* that is inserted into the respective channels 202*h* and 202*j* of the respective channeled pieces 402*a* and 402*c*. The channel pieces 402*b* and 402*c* are coupled together by the cuff 414*c* that is inserted into the respective channels 202*i* and 202*j* of the respective channeled pieces 402*b* and 402*c*.

The member 102*d* is comprised of non-limiting, exemplary three individual channeled pieces 402*d*, 402*e*, and 402*f* that are coupled with one another by cuffs 414*e*, 414*f*, and 414*g*. In particular, the channeled piece 402*d* is coupled with channeled piece 402*e* by cuff 414*g* that is inserted into the channels 202*k* and 202*l* of the respective channeled pieces 402*d* and 402*e*. The channeled piece 402*d* is further coupled with the channeled piece 402*f* by cuff 414*e* that is inserted into the respective channels 202*k* and 202*m* of the respective channeled pieces 402*d* and 402*f*. The channel pieces 402*e* and 402*f* are coupled together by the cuff 414*f* that is inserted into the respective channels 202*l* and 202*m* of the respective channeled pieces 402*e* and 402*f*.

The member 102*e* is comprised of non-limiting, exemplary three individual channeled pieces 402*g*, 402*h*, and 402*i* that are coupled with one another by cuffs 414*h*, 414*i*, and 414*j*. In particular, the channeled piece 402*g* is coupled with channeled piece 402*h* by cuff 414*j* that is inserted into the channels 202*n* and 202*p* of the respective channeled pieces 402*g* and 402*h*. The channeled piece 402*g* is further coupled with the channeled piece 402*i* by cuff 414*h* that is inserted into the respective channels 202*n* and 202*q* of the respective channeled pieces 402g and 402i. The channel pieces 402h and 402i are coupled together by the cuff 414i that is inserted into the respective channels 202p and 202q of the respective channeled pieces 402h and 402i.

As best illustrated in FIGS. 4B-1 (and 4B-2 in particular), in this non-limiting, exemplary instance, the member 102b includes a physical notch 416 that allows the pivot support 106i to pivot within and be stopped by a wall 418 of the notch 416, which is formed from the body of the member 102b. This way, the pivot support 106i has a total rotation range of 180° degrees (or +/−90° degrees from the inner alignment plane of the device 100d) along reciprocating path 456. Therefore, when the pivot support 106i rotates about its second end 114i in an orientation that is out of the inner alignment plane of the device 100d, all of the inner members (102c, 102d, 102e, and 102f) associated with the pivot support 106i first end 112i are also moved out of the inner alignment plane in unison as shown in FIGS. 4A to 4C-3.

As further illustrated in FIGS. 4A to 4B-2, a pivot support 106j includes a first end 112j that is coupled with the channeled piece 402d of the next member 102d and has a second end 114j that is movably positioned within the cuff 414d (FIG. 4B-1), allowing the pivot support 106j to have both translational motion (via the channels 202h, 202i, and 202j) as well as rotational motion (along principal rotations along paths 108, 204, and 206), including a 360° degrees rotation out of the inner alignment plane of the device 100d that allows member 102d, 102e, and 102f to move to a position next to an outer boundary of member 102c (or simply rotate around 102c, pivoting around the central longitudinal axis of the cuff 414d). FIG. 4C-1 illustrates the same pivot support 106j moved to the next cuff 414c via the channel 202j, with FIGS. 4C-2 and 4C-3 illustrating the same pivot support 106j positioned within the same cuff 414c but rotated 180° degrees out of the inner alignment plane of the device 100d, moving all inner members 102d, 102e, and 102f to a position next to the outer boundary of the member 102c.

It should be noted that in order for a pivot support 106 to be moved via a channel 202 of a channeled piece 402, the pivot support 106 body must be aligned with the polygonal opening 442a (FIG. 4D) of the channel 202 and in order to be positioned within a cuff 414, pivot support 106 must slide through the longitudinally oriented opening or gap 432 (FIG. 4C-4) of the cuff 414. Accordingly, if the pivot support 106 is moved out of the inner alignment plane of the device 100d, it cannot be moved through a channel 202.

It should further be noted that the pivot support 106j (or any other pivot support 106 illustrated in this and all other embodiments throughout the disclosure) may easily be replaced by an adjustable pivot supports 304, which would add a translation motion for the inner members 102d, 102e, and 102f in addition to the described motion of moving out of the inner alignment plane of the device 100d. Accordingly, the device 100d includes all of the movements described above in relation to the previous embodiments and adds the motion that enables one or more members to move out of the alignment plane of the device 100d in unison, rotate by 360° degrees, moving all inner members to a position next to the outer boundary of an outer member. As a further note, although only a single channel is shown per channeled piece 402 (best illustrated in FIG. 4D) for discussion purposes and simplicity of understanding, as with previous embodiments, one or more pieces 402 of a member 102 may include two channels instead of the illustrated one channel.

As further illustrated in FIGS. 4A to 4C-3, only a single pivot support is associated with each member, which enables the out of alignment plane motion described above. The inner member 102d with its associated pivot support 106k, and the next inner member 102e with its associated pivot support 106l function in similar manner to that described in relation to 102c and its associated pivot support 106j. It should be noted that an inner member (such as 102e) may be moved out of the inner alignment plane of the device 100d independent of its outer adjacent members (such as 102d and 102c), but the inner member would not be able to rotate out of the inner alignment plane by a full 360° degrees as it will be blocked by the outer members. However, as illustrated in FIGS. 4C-2 and 4C-3, one or more inner members may move out of the inner alignment plane, one at a time starting with outer members where all of the members are finally and fully expanded out in the reciprocating path 456. Specifically, the outer member 102c may be moved out of the inner alignment plane of the member 102b in the indicated reciprocating path 456, next the member 102d and all of its associated inner members 102e and 102f are moved out of the inner alignment plane of the member 102c in the path 456 (detailed in FIG. 4C-3, with 102d shown in broken lines within the inner alignment plane of 102c, and also shown in solid lines in the outer boundary of member 102c when moved along path 456). The next member 102e and its remaining inner member 102f may also be moved out of the inner alignment plane of the member 102d in the path 456 and finally, the member 102f may be moved out to the outer boundary of the member 102e.

As best illustrated in FIGS. 4C-4 and 4D, device 100d includes the rotating bridge couplers (or "cuffs") 414 that have a substantially cylindrical body 452, a c-shape profile (with a longitudinally oriented opening or gap 432), and include a central longitudinal axis. In general, a first distal end 444 of the cuffs 414 is positioned and housed within a channel of a first piece of a first member and a second distal end 446 of the cuffs 414 is positioned and housed within a next, adjacent channel of a next, adjacent piece of the same member. Simply stated, the cuffs 141 are juxtaposed and housed between adjacent pieces of the same member. The cuffs 414 can pivot (from 0° to 180° or 360° degrees) around their central longitudinal axis (along reciprocating path 454) within their respective housing when urged against the lateral ends 448/450 of the opening 432 of the cuffs 414 by a the stem (or body) of a pivot support (adjustable or otherwise), as best illustrated in FIG. 4C-4.

FIG. 4D is a non-limiting, exemplary partially sectional view, which is taken from the indicated dashed circle on the plan view of the device shown in FIG. 4A in accordance with the present invention. As has been indicated above, the one or more channels 202 illustrated throughout the disclosure for this and other embodiments may be configured to have any cross-sectional profile including any polygonal cross-sectional profiles, rounded cross-sectional profiles, or combinations thereof. As illustrated in FIG. 4D, the channels 202 of the device 100d are configured as a combination of a rounded cross-sectional profile (similar to a rounded, cylindrical tunnel) 440 and have a portion that is a polygonal cross-section 442. The rounded, cylindrical tunnel 440 has the polygonal opening 442, which allow the cuffs 414 to be positioned therein and also allows and the pivot supports 106 to slide through the channel 202 and the cuffs 414, with the rounded cylindrical tunnel 440 allowing one of the first and second ends 112 and 114 to have both a translational as well as rotational move through the tunnel 440 and cuffs 414.

Figure 5C:
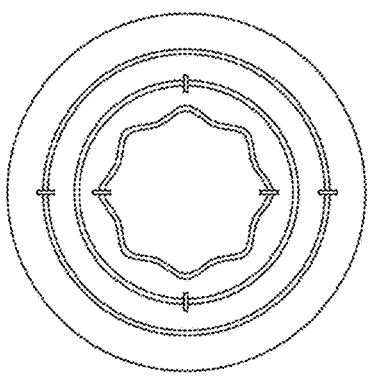
FIGS. 5A to 5Z are non-limiting, exemplary schematic plan view illustrations of a small sampling of different types and configurations of the device shown in FIGS. 1A to 4D in accordance with the present invention.
Figure 5F:
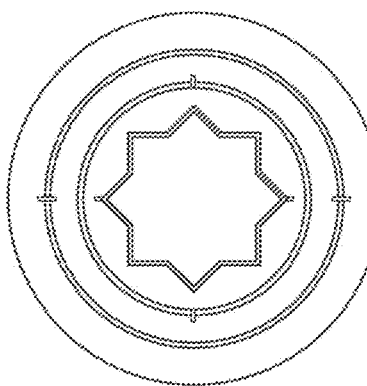
Figure 5B:
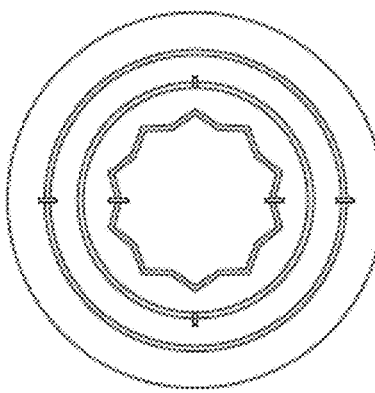
Figure 5E:
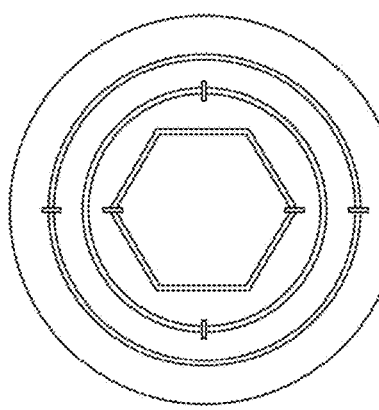
Figure 5A:
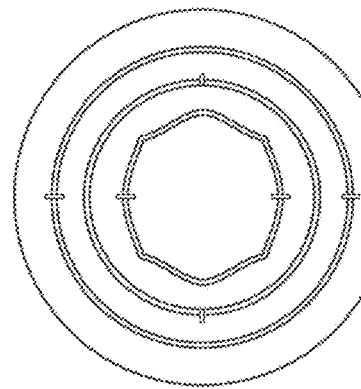
Figure 5D:
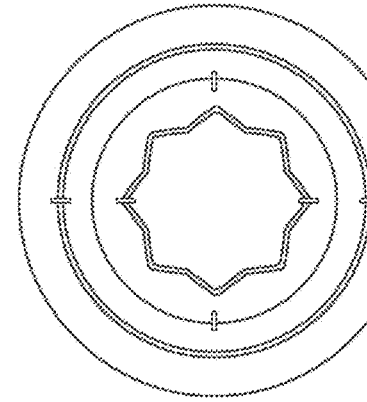
Figure 5I:
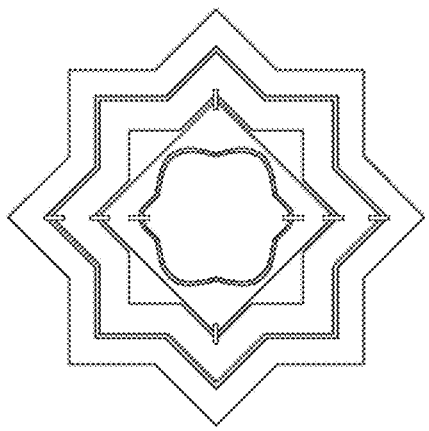
Figure 5L:
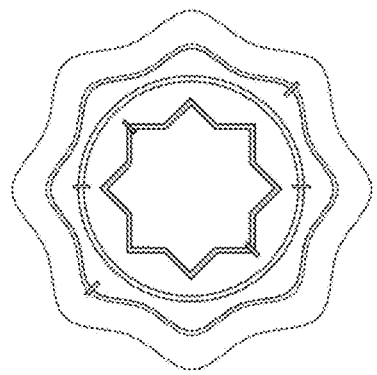
Figure 5H:
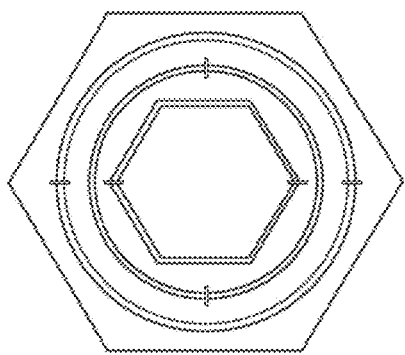
Figure 5K:
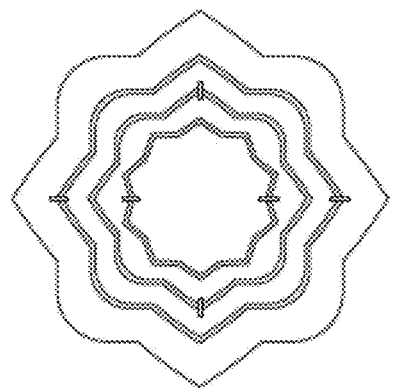
Figure 5G:
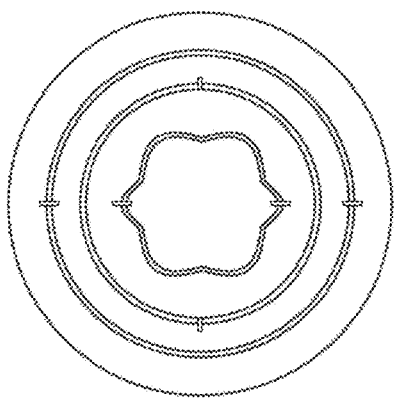
Figure 5J:
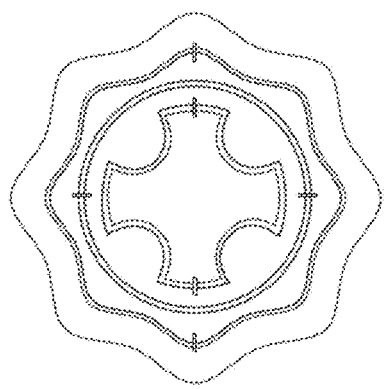
Figure 5O:
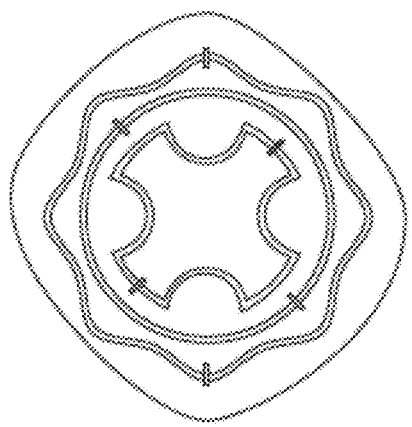
Figure 5Q:
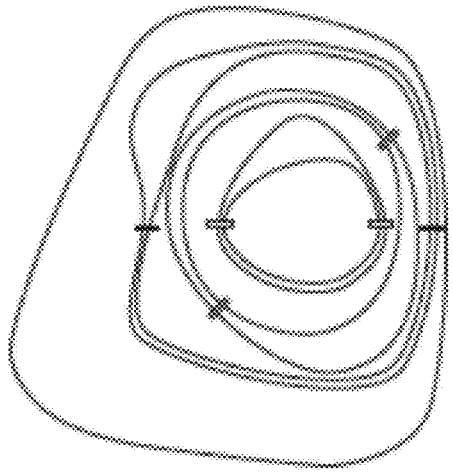
Figure 5N:
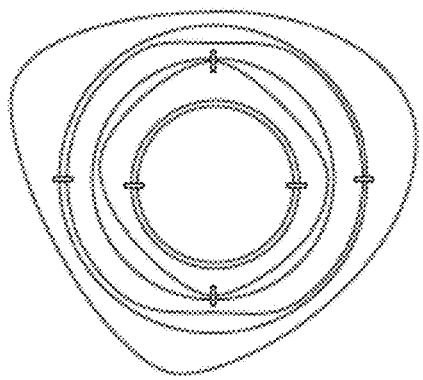
Figure 5M:
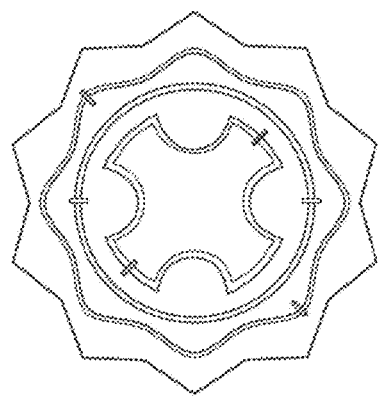
Figure 5P:
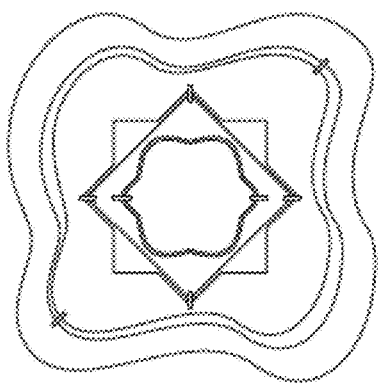
Figure 5R:
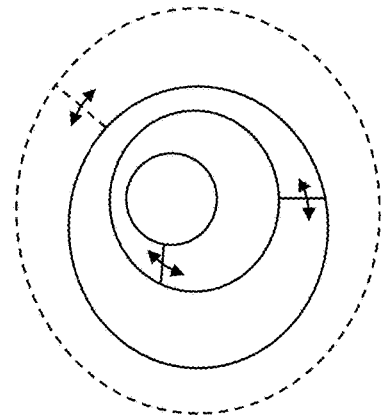
Figure 5S:
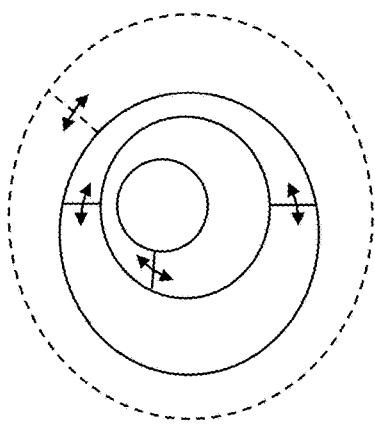
Figure 5T:
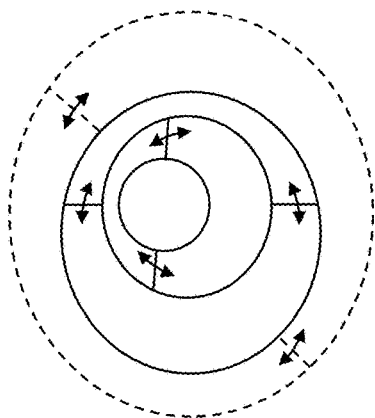
Figure 5U:
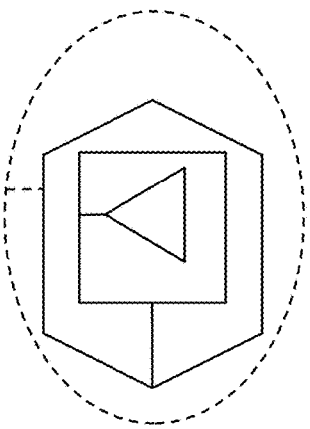
Figure 5V:
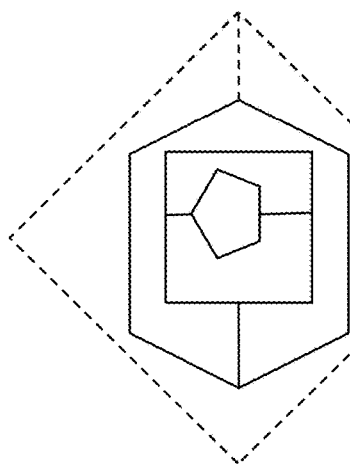
Figure 5W:
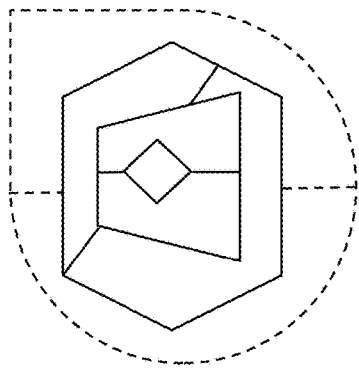
Figure 5Z:
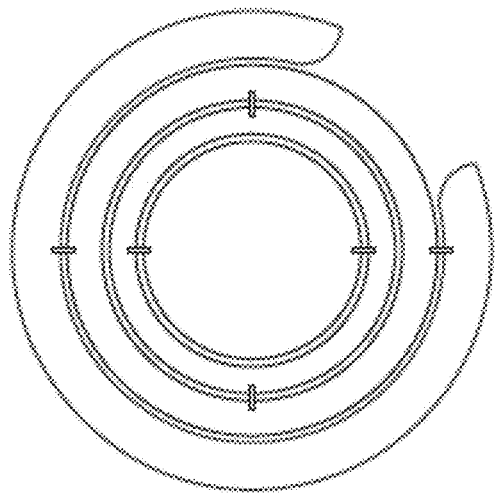
Figure 5Y:
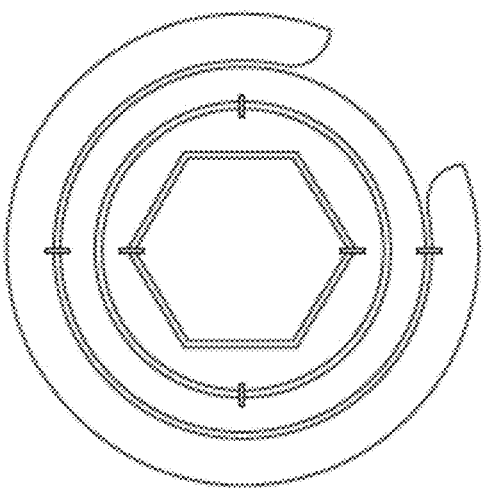
Figure 5X:
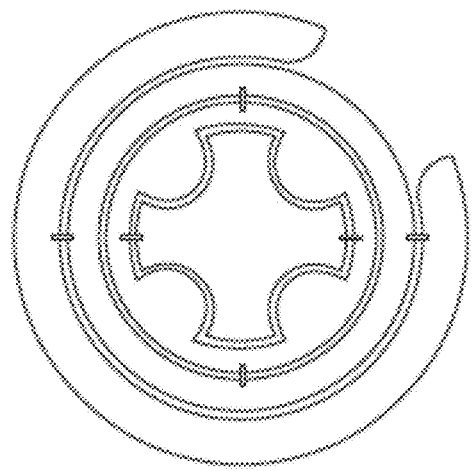

FIGS. 5A to 5Z are non-limiting, exemplary schematic plan view illustrations of a small sampling of different types and configurations of the device shown in FIGS. 1A to 4D in accordance with the present invention. As best illustrated, the plurality of members of a device 100 of the present invention may have varying sizes and dimensions and shapes. Although optional, it is generally more esthetically pleasing if an inner member outer perimeter or periphery (or silhouette) is commensurately complementary to its immediately adjacent outer member interior perimeter or periphery. As illustrated in FIGS. 5X, 5Y, and 5Z, the members need not be continuous enclosed members. In other words, they need not be a fully enclosed circle or fully enclosed polygonal shape. Several half or partial shapes (not closed) such as a crescent shapes or half squares shown in FIGS. 5X, 5Y, and 5Z may be coupled within one another.

As further illustrated in FIGS. 5A to 5Z, in general, inner members have a smaller dimension then a next, outer member. Further, a separation distance between members may equal or vary and be different in span. That is, a separation distance between a member and a next member may be one of equal and different spans from separation distance of the next member and a next, subsequent member. As further illustrated in FIGS. 5R to 5W, the members may form one of a concentric and eccentric arrangement.

As further illustrated in FIGS. 5A to 5Z, a member may be movably coupled to another member by one coupler or, alternatively, a member may be movably coupled to another member by two couplers that are aligned inline along a common axis. In general, if a member is movably coupled with an immediate, adjacent member by one coupler, then the member and the immediate adjacent member can pivot about the coupler. On the other hand, a member may be movably coupled with an immediate, adjacent member by two couplers that are aligned inline along a common axis, enabling the member and the immediate adjacent member to pivot about both couplers. In general, an outer member is movably coupled with a next inner member by one or two coupler. If two couplers are used, then the outer member is movably coupled with a next inner member by first and second outer couplers that are aligned inline along a common axis.

Figure 6I:
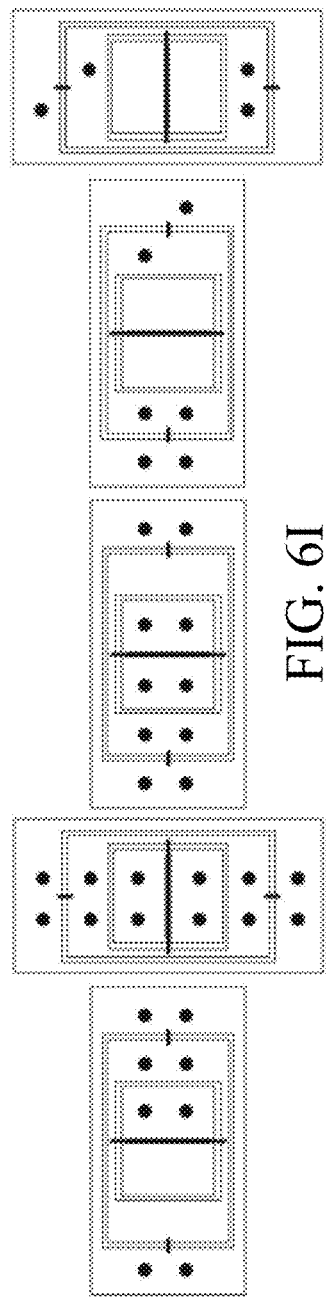
FIGS. 6A to 6S are non-limiting, exemplary schematic illustrations of a small sampling of different types and configurations of the device shown in FIGS. 1A to 5Z with non-limiting, exemplary marking in accordance with the present invention.
Figure 6K:
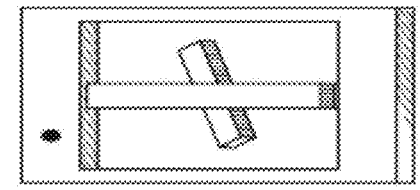
Figure 6K:
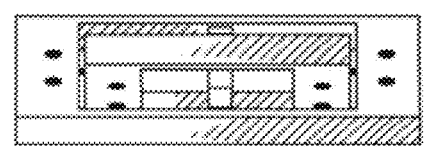
Figure 6J:
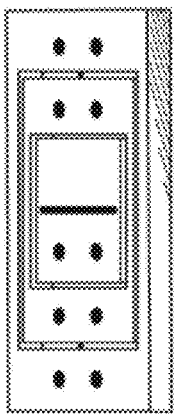
Figure 6J:
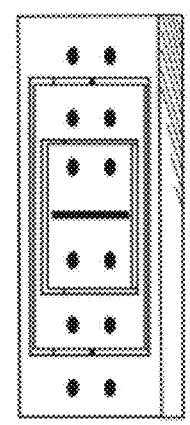
Figure 6L:
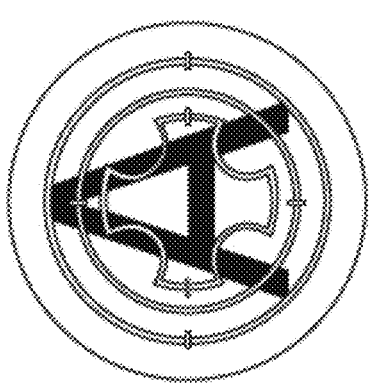
Figure 6M:
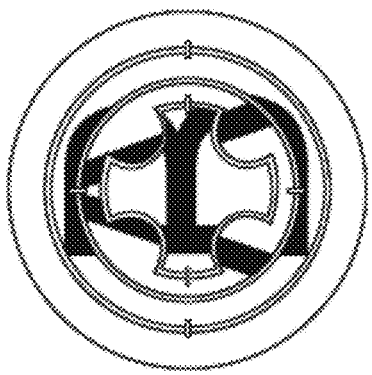
Figure 6N:
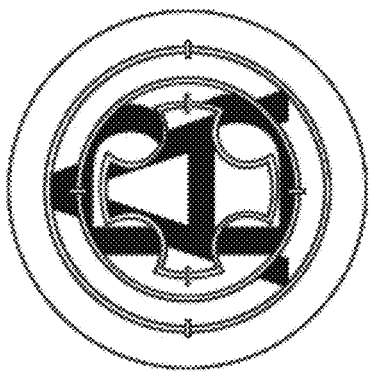
Figure 6O:
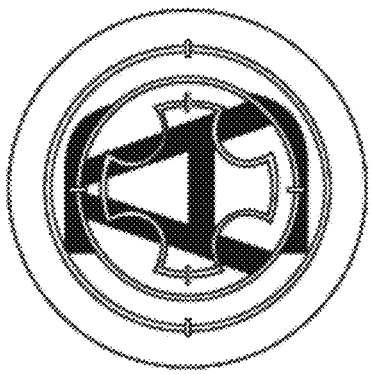
Figure 6P:
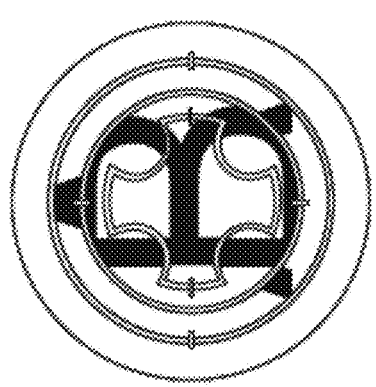
Figure 6Q:
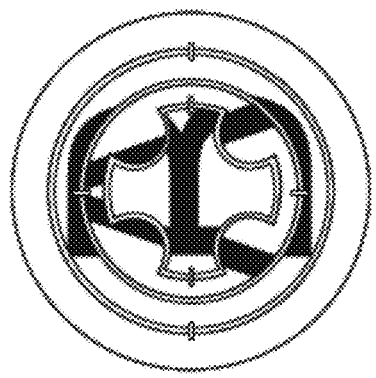
Figure 6R:
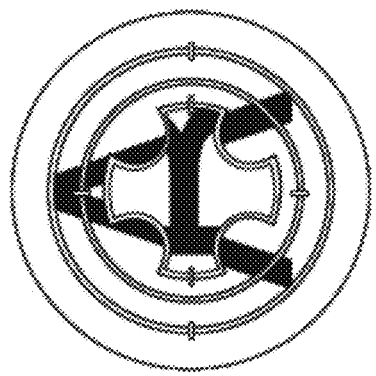
Figure 6S:
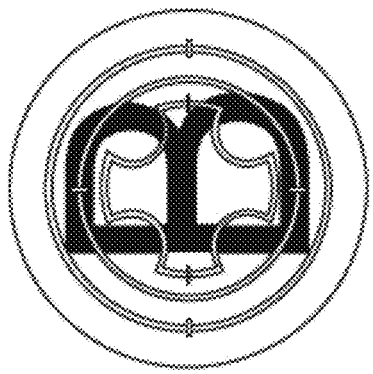

As best illustrated in FIGS. 6A to 6S, any one of the devices disclosed throughout the disclosure may include one or more member with at least one marking or marked or printed subject on at least one side. The marking may comprise of different patterns, texture, color, three-dimensional embossments, recesses, sculptural, etc, which may or may not be deemed as a collector item or associated with a game. It should be noted that the one or more members may also include or comprise of three-dimensional object, printed subject matter, or markings and need not be limiting to a simple two-dimensional print.

The marking may include a variety of different patterns that may be used with any new or old game or educational system such as a domino chip (FIGS. 6I to 6K) that may be used to play domino or, alternatively, since the various members of the device are movable a different type of "domino" game may be played with a more challenging or different rules.

FIGS. 6L to 6S are non-limiting exemplary skill-based game for children that use the device of the present invention that may be used to teach the alphabet, numbers, or flags of various countries while improving their motor skills. Using the device of the present invention, a letter of the alphabet or a flag or a number may be printed on one side of the devices and another alphanumerical value or flag of another country on the opposing side. The child may be presented with the exemplary device with the exemplary printed alphanumerical characters/flags mixed and asked to simply manipulate the device by moving the various members to the correct side until the alphabet character is arranged, displayed, and recognized by the child on one side and the numeric character on the opposite side (or a flag of a country). The movement of the various members of the device by a child's hand (the tactile motion of fingers to move the members of the device) to correctly display the alphanumeric characters/flags improves the child's hand motor skills and teaches the alphabet, the number system, and flags of various countries. The number and type of characters that may be printed onto the device to be arranged correctly is endless. For example, one side of the device may illustrated a profile of a sports figure or a particular animal and the other side may have various statistics of that particular sports figure or data about the animal (e.g., a dinosaur), with the present invention replacing sports or various game cards and becoming a collector item. As another example, one side may have a print of a standard 52-card game, played by the device and the other side of the device have a logo of a casino.

Figure 7A:
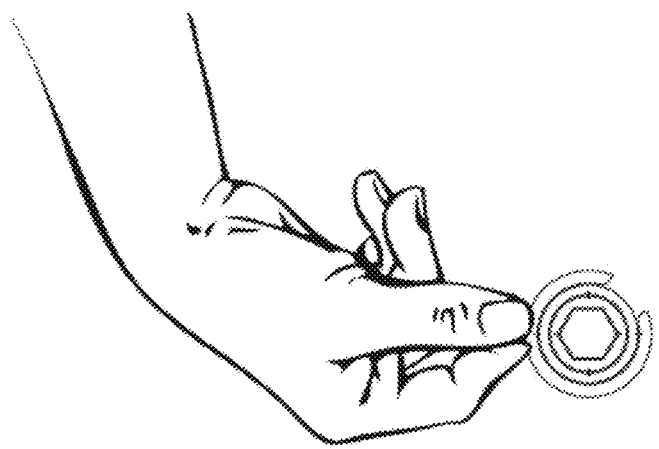
FIGS. 7A to 7D are non-limiting, exemplary schematic illustrations of using the device of FIGS. 1A to 6S as a non-limiting, exemplary game piece in accordance with the present invention.
Figure 7B:
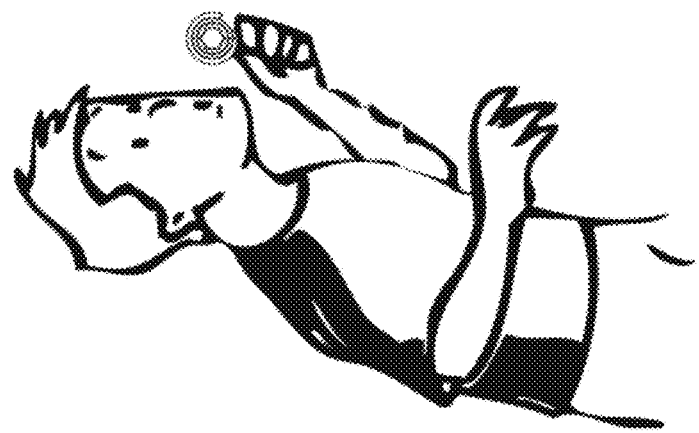
Figure 7D:
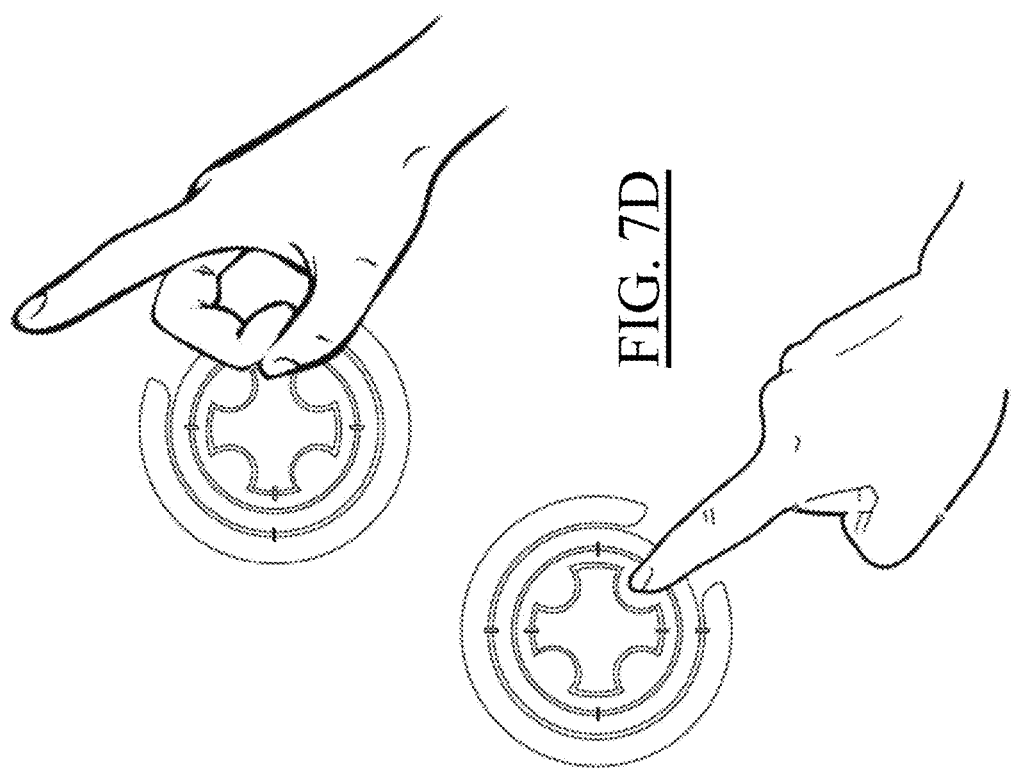
Figure 7C:

FIGS. 7A to 7D provide simple games that may be played using the device of the present invention, with FIG. 7A a user may blow the members to allow all the members of the device to spin, in FIG. 7B the person may simply play game by dropping the device and see how the members move and land. FIG. 7C is an exemplary illustration of a "toss," and FIG. 7D illustrates the user pushing down on a member with a figure to manipulate the member to move, and further illustrates flicking the device.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, any type of material (flexible or rigid) may be used for members, pivot supports (adjustable or otherwise), and any element or component that constitutes the device in accordance with the present invention. As another example, the members need not be rigid to retain their shape, but may have sufficient flexible to be squeezed out of their "default" shape by hand, for example. As a further example, the size or various dimensions of the device in accordance with the present invention may be increased where the larger sized devices may function as a board for another game just as a chessboard is used for playing chess or checkers. All devices 100 disclosed throughout the present invention may include and embed any type of conventional electronics to enable any device 100 to communicate with any other device 100 and or another electronic device such as a gaming device, a laptop, or a mobile device. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A device, comprising:
plurality of members that are associated with one another with pivot axes, where a member of plurality of members provides a pivot support that allows spatial rotations of a next member of plurality of members along principal rotations
the pivot support is comprised of a coupler with first and second ends secured within a channel of the member and the next member, with the channel extending along both sides of at least one member of the plurality of members.

2. The device as set forth in claim 1, wherein:
the channel extends along a side of the member.

3. The device as set forth in claim 1, wherein:
the channel extends along an interior side of the member.

4. The device as set forth in claim 1, wherein:
the channel extends along an exterior side of the next member.

5. The device as set forth in claim 1 wherein:
the channel extends along both interior and exterior sides of the member and next member.

6. The device as set forth in claim 1, wherein:
the pivot support is a coupler with an adjustable height.

7. The device as set forth in claim 1, further including:
an electronic component.

8. The device as set forth in claim 1, further including:
at least one mark on at least one side of the member, with the mark defined within a context of one of a game and a learning system, providing an increased number of permutations and combinations of outcomes of the one of the game and the learning system for an enhance experience.

9. A device, comprising:
members that are associated with one another with pivot axes, where a member provides a pivot support that allows spatial rotations of a next member along principal rotations, with at least one member having a translational motion
the at least one member is comprised of several individual and separate pieces;
the pivot support is a coupler with an adjustable height that allows a piece of the at least one member to extend away from the next member and freely rotate about the pivot support.

10. The device as set forth in claim 9, wherein:
a piece of the at least one member independently rotates about the pivot support and has a translational motion that moves toward or away from a next member.

11. The device as set forth in claim 9, wherein:
the pivot support is comprised of a coupler with a first end secured within a piece of the at least one member and a second end secured within the next member or a piece thereof.

12. The device as set forth in claim 9, wherein:
the pivot support further allows a second rotation of the next member about a second axis.

13. The device as set forth in claim 9, further including:
an electronic component.

14. The device as set forth in claim 9, further including:
at least one mark on at least one side of the member, with the mark defined within a context of one of a game and a learning system, providing an increased number of permutations and combinations of outcomes of the one of the game and the learning system for an enhance experience.

15. A device, comprising:
members that are associated with one another with pivot axes, where a member provides a pivot support that allows first rotation of a next member about a first axis; and
where a next member pivots from an inner alignment plane of the member, rotating to a position next to an outer boundary of the member at least one member is comprised of several individual and separate pieces;
a piece of the at least one member independently rotates about the pivot support;
the pivot support is comprised of a coupler with a first end secured within the piece of the at least one member and a second end secured within the next member.

16. The device as set forth in claim 15, wherein:
the pivot support further allows a second rotation of the next member about a second axis.

17. The device as set forth in claim 16, wherein:
the pivot support includes at least one spherical end accommodated within a rotator cuff.

18. The device as set forth in claim 15, further including:
an electronic component.

19. The device as set forth in claim 15, further including:
at least one mark on at least one side of the member, with the mark defined within a context of one of a game and a learning system, providing an increased number of permutations and combinations of outcomes of the one of the game and the learning system for an enhance experience.

20. A device, comprising:
plurality of members that are associated with one another with pivot axes, where a member of plurality of members provides a pivot support that allows spatial rotations of a next member of plurality of members along principal rotations;
the pivot support is comprised of a coupler with first and second ends secured within a channel of the member and the next member, with the channel extending along both interior and exterior sides of the member and next member.

* * * * *